United States Patent [19]
Nakabayashi et al.

[11] Patent Number: 5,905,866
[45] Date of Patent: May 18, 1999

[54] DATA-UPDATE MONITORING IN COMMUNICATIONS NETWORK

[75] Inventors: Kaoru Nakabayashi; Akihiro Sato; Shingo Yudasaka; Yasushi Hiraoka; Noboru Kitazawa, all of Matsumoto; Takahiro Kobayashi, Suwa, all of Japan

[73] Assignees: A.I. Soft Corporation, Nagano; Seiko Epson Corporation, Tokyo, both of Japan

[21] Appl. No.: 08/846,493

[22] Filed: Apr. 24, 1997

[30] Foreign Application Priority Data

Apr. 30, 1996 [JP] Japan ..................................... 8-132822
Dec. 17, 1996 [JP] Japan ..................................... 8-353960

[51] Int. Cl.⁶ ................................................. G06F 13/00
[52] U.S. Cl. ............................. 395/200.53; 395/200.31; 395/200.55
[58] Field of Search ........................ 395/200.47, 200.48, 395/200.49, 200.55, 200.31, 200.53

[56] References Cited

U.S. PATENT DOCUMENTS

| | | | |
|---|---|---|---|
| 5,604,682 | 2/1997 | McLaughlin et al. | 395/200.49 |
| 5,636,139 | 6/1997 | McLaughlin et al. | 395/200.49 |
| 5,708,780 | 1/1998 | Levergood et al. | 395/200.12 |
| 5,774,666 | 6/1998 | Portuesi | 395/200.48 |
| 5,778,181 | 7/1998 | Hidary et al. | 395/200.48 |
| 5,784,564 | 7/1998 | Camaisa et al. | 395/200.54 |
| 5,796,952 | 8/1998 | Davis et al. | 395/200.54 |

FOREIGN PATENT DOCUMENTS 3-230234 10/1991 Japan.

*Primary Examiner*—Krisna Lim
*Attorney, Agent, or Firm*—Beyer & Weaver, LLP

[57] ABSTRACT

A user I/F unit 200 transmits an instruction given by a user to an access management unit 100 and displays data on a monitor 76. The access management unit 100 transfers requirements to a communication control unit 300 and a data management unit 400 in response to the instruction from the user, transfers data from a communications host to the data management unit 400, and outputs data from a database 410 to the user I/F unit 200. The data management unit 400 writes data into the database 410 and reads storage data from the database 410 in response to the requirement from the access management unit 100. Data transmitted from the communications host are sorted out according to communication services and stored in the database 410. The communication control unit 300 translates the requirement from the access management unit 100 to a menu number representing each communication service available from the communications host or a command and sends the translated requirement to a communication I/F unit 500. This structure enables input data to be sorted out and stored without any overlap.

24 Claims, 70 Drawing Sheets

Fig. 5

Remarks)

| Number | Name of Discussion Groups | Number of Titles | Date of Previous Access | Name of Folders | New Incoming Mark |
|---|---|---|---|---|---|
| 1 | Bulletin Board Service: ... | 186 | 96/02/23 | MES1 | |
| 5 | PANIX: World ... | 5446 | 96/02/28 | MES5 | |
| 6 | WX-WORD : W X - W ... | 970 | 96/02/27 | MES6 | |
| 7 | EasyFax : E a s y ... | 4401 | 96/02/28 | MES7 | + |
| 8 | DISK X II :DISK X II... | 2986 | 96/02/28 | MES8 | |
| 9 | Address Input : P o s t ... | 95 | 96/12/22 | MES9 | |
| 10 | ScriPlayer: S c r i ... | 432 | 96/02/27 | MES10 | |
| 14 | DiskXTools: D i s k ... | 360 | 96/02/26 | MES14 | + |
| 15 | WinStart95: W i n S ... | 320 | 96/02/27 | MES15 | |
| 16 | BoonEditor: B o o n ... | 532 | 96/02/28 | MES16 | + |
| 18 | Communication Software: Easy ... | 241 | 96/02/25 | MES18 | + |
| : | : | : | : | : | : |

Fig. 7

Remarks)

| Number | ID | Date of Registration | TO | CO | Titles | Location of Text (Offset) | New Incoming Mark |
|---|---|---|---|---|---|---|---|
| 524 | ABC12345 | 02/27 | 00508 | 0 | Re: Requirement for Automatic Communication | ... 1024 | + |
| 525 | ABC11111 | 02/27 | 00509 | 0 | Re: New Requirement | ... 1252 | |
| 526 | ABC01234 | 02/27 | 00511 | 0 | Requirement for Timer Operation | ... 1307 | + |
| 527 | ABC22222 | 02/27 | 00513 | 0 | Re: Requirement for Timer Operation | ... 1307 | + |
| : | : | : | : | : | | : | : |

Fig. 10(a)

| Number | ID | Date of Registration | | TO | CO | Titles |
|---|---|---|---|---|---|---|
| 550 | EEE55555 | 03/01 | 4:07 | | 1 | Communication Rate? |
| 551 | FFF66666 | 03/02 | 0:03 | | 0 | Requirement for Transmission of Mail |
| 552 | GGG77777 | 03/02 | 8:28 | | 0 | Switching |
| 553 | HHH88888 | 03/02 | 8:50 | | 0 | Modem Selection |

Fig. 10(b)

| Number | ID | Date of Registration | | TO | CO | Titles |
|---|---|---|---|---|---|---|
| 554 | AAA11111 | 03/02 | 9:05 | 00532 | 4 | Re: New Question and Requirement |
| 555 | BBB22222 | 03/02 | 9:18 | 00526 | 3 | Re: Requirement for Address Book |
| 556 | CCC33333 | 03/02 | 9:42 | | 1 | Automatic Dialing |
| 557 | DDD44444 | 03/02 | 9:50 | | 3 | Specification at the time of Activation |

Fig. 13 (a)

| Number | ID | Date of Registration | Byte | Reference | Name of Data |
|---|---|---|---|---|---|
| 56 | CCC33333 | 95/12/14 | 31744 | 158 J | [Issue on Station Labyrinth] |
| 55 | DDD44444 | 95/11/22 | 29509 | 153 B | DiskXII SETUP Program(DOS/V) |
| 54 | EEE55555 | 95/11/22 | 86232 | 743 B | DiskXII Win95 SETUP Program(PC98) |
| 53 | FFF66666 | 95/10/25 | 111280 | 336 B | WXW11E_F.LZH WX-WORD 1.10E->1.10F |
| 52 | GGG77777 | 95/09/29 | 65019 | 816 B | EF204 .LZH EasyFax 2.03->2.04 |
| : | | | | | |

Fig. 13 (b)

| Number | ID | Date of Registration | Byte | Reference | Name of Data |
|---|---|---|---|---|---|
| 61 | VVV00000 | 96/02/17 | 37014 | 99 B | BOMACTXT.LZH BoonEditor  macro |
| 60 | WWW99999 | 96/02/07 | 373188 | 140 B | B0001101.LZH BoonEditor 1.00.1->1.01 |
| 59 | XXX88888 | 96/02/07 | 405090 | 117 B | B0101.LZH    BoonEditor 1.00->1.01 |
| 58 | YYY77777 | 96/02/06 | 195670 | 197 B | DiskXII(DOS/V) Ver.4.10-->4.11difference |
| 57 | ZZZ66666 | 96/01/24 | 195670 | 197 B | DiskXII(PC98) Ver.4.10-->4.11 difference |
| 56 | CCC33333 | 95/12/14 | 31744 | 205 J | [Issue on Station Labyrinth] |

Fig. 16(a)

| Number | Date and Time of Registration | Titles |
|---|---|---|
| 1 | 03/01 08:53 | Ten patients died at A hospital. |
| 2 | 03/01 08:41 | Crash on a highway. |
| 3 | 03/01 08:33 | B gained the judgment 'Not Guilty'. |
| 4 | 03/01 08:27 | C team won in the Asian Cup. |
| 5 | 03/01 08:11 | |
|  | : | |

Fig. 16(b)

| Number | Date and Time of Registration | Titles |
|---|---|---|
| 1 | 03/01 09:24 | D Corp. went into chain reaction bankruptcy. |
| 2 | 03/01 09:15 | Hi-jack case was solved. |
| 3 | 03/01 09:02 | Domestic air fare was raised. |
| 4 | 03/01 08:53 | Ten patients died at A hospital. |
| 5 | 03/01 08:41 | Crash on a highway. |
| 6 | 03/01 08:33 | B gained the judgment 'Not Guilty'. |

Fig. 20

SPECIFICATION OF PERIODIC ACCESS : BULLETIN BOARD SERVICE

Periodic Access to Specified Folder (*) through Timer Operation or
Automatic Communication (Periodic Access).
Automatic Input of New Unread Titles.

Bulletin Board Service

```
 Join us!
 Correspondence
 Give You / Give Me
 For Sale:  Word Processors
*For Sale:  Personal Computers (Fujitsu)
*For Sale:  Personal Computers (NEC)
*For Sale:  Personal Computers (Apple)
*For Sale:  Personal Computers (IBM compatible)
*For Sale:  Personal Computers (others)
 For Sale:  Miscellaneous
 To Buy
 Teach You / Teach Me
```

[OK]
[CANCEL]
[HELP]

[X] Periodic Access

Interval: At least [◀ 0 ▶] days

Reading Procedure
● Read only Titles.
○ Read Text.

[ ] Restrict by Number of Data.

Up to [◀ 0 ▶]

FLB

Fig. 21

| Name of Services | Name of Folders | Reading Procedure | Interval of Access (days) |
|---|---|---|---|
| E-mail | Receive-Mail Box | Read text. | 0 |
| Information | Information This Week | Read text. | 7 |
| Bulletin Board Service | For Sale: Personal Computers | Read only titles. | 1 |
| Clipping Service | Computer | Read text. | 1 |
| Clipping Service | Internet | Read text. | 1 |
| News Flash | Politics and Economics | Read text. | 1 |
| News Flash | Sports | Read text. | 1 |
| AISOFT Station | Discussion Group - EasyFax | Read only titles. | 1 |
| AISOFT Station | Discussion Group - Communication Software | Read only titles. | 1 |
| AISOFT Station | Library - EasyFax | Read only titles. | 14 |
| AISOFT Station | Library - Communication Software | Read only titles. | 14 |
| EPSON Forum | Discussion Group - Printers | Read only titles. | 7 |
| EPSON Forum | Library - Scanners | Read only titles. | 14 |

Fig. 25

| Name of Services | Name of Folders | Details of Reservation | Title | Number |
|---|---|---|---|---|
| EPSON Forum | Library - Printers | Download. | 105 | |
| EPSON Forum | Discussion Group - Printers | Send a message | | Contents: ⋯ |
| SAISAP Station | Library - Fax Software | Download. | 145 | |
| Bulletin Board Service | For Sale - Personal Computers ↑ (Add) | Read text. | 13 | |
| SAISAP Station | Discussion Group - Communication Software | Send a follow -up message. | 531 | Contents: ⋯ |

Fig. 26

| Name of Services | Name of Folders | Details of Reservation | Title Number | |
|---|---|---|---|---|
| EPSON Forum | Library - Scanners | Download. | 105 | |
| EPSON Forum | Discussion Group - Printers | Send a message. | | Contents:··· |
| AISOFT Station | Library - EasyFax | Download. | 145 | |
| Bulletin Board Service | For Sale - Personal Computers | Read text. | 13 | |
| AISOFT Station | Discussion Group - Communication Software | Send a follow -up message. | 531 | Contents:··· |
| Bulletin Board Service | For Sale - Personal Computers | Read text. | 20 | |
| AISOFT Station | Discussion Group - Communication Software | Obtain unread titles. | | |
| E-mail | Send-Mail Box | Send a mail. | | |

Fig. 27(a)

| Number | User ID | Date of Registration | Reference | Titles |
|---|---|---|---|---|
| 1 | AAA11111 | 3/02 | 1 | 30PIN SIMM Shocking Price! |
| 2 | BBB22222 | 3/02 | 3 | To MO Users |
| 3 | CCC33333 | 3/02 | 5 | ■■■ For Sale: SCSI HDD ■■■ |
| 4 | DDD44444 | 3/02 | 7 | ★ For Sale ★ |
| 5 | EEE55555 | 3/02 | 7 | For Sale: 5 inch FD Drive |
| 6 | FFF66666 | 3/02 | 5 | For Sale: ISDN-TA |
| : | | | | |

Fig. 27(b)

| Number | User ID | Date of Registration | Reference | Titles |
|---|---|---|---|---|
| 1 | PPP00000 | 3/02 | 14 | FAX/DATA MODEM CARD Only 7,000 Yen! |
| 2 | QQQ11111 | 3/02 | 18 | For Sale: ZIP |
| : | | | | |
| 9 | SSS55555 | 3/02 | 10 | For Sale: Software |
| 10 | TTT66666 | 3/02 | 4 | For sale: RAM |

Fig. 27(c)

| Number | User ID | Date of Registration | Reference | Titles |
|---|---|---|---|---|
| 11 | VFF22317 | 3/02 | 9 | ■ Cool Modem! |
| : | | | | |
| 16 | EEE55555 | 3/02 | 16 | For Sale: 5 inch FD Drive |
| 17 | FFF66666 | 3/02 | 10 | For Sale: ISDN-TA |
| 18 | GGG77777 | 3/02 | 25 | For Sale: CD-ROM |
| 19 | HHH88888 | 3/02 | 18 | For Sale: HD |
| 20 | III99999 | 3/02 | 17 | For Sale: Software |

Fig. 29

| Name of Services | Name of Folders | Details of Processing | Title Number |
|---|---|---|---|
| ◎ E-mail | Send-Mail Box | Send a mail. | |
| ○ E-mail | Receive-Mail Box | Read text. | |
| < Information | Information This Week | Read text. | 7 |
| ◎ Bulletin Board Service | For Sale: Personal Computers | Read text. | 13 |
| ◎ Bulletin Board Service | For Sale: Personal Computers | Read text. | 20 |
| × Bulletin Board Service | For Sale: Personal Computers | Read only titles. | |
| ○ Clipping Service | Computer | Read text. | |
| ○ Clipping Service | Internet | Read text. | |
| ○ News Flash | Politics and Economics | Read text. | |
| ○ News Flash | Sports | Read text. | |
| ○ AISOFT Station | Discussion Group - EasyFax | Read only titles. | |
| ◎ AISOFT Station | Discussion Group - Communication Software | Send a follow-up mssage. | 531 Contents: ... |
| ◎ AISOFT Station | Discussion Group - Communication Software | Obtain unread titles. | |
| × AISOFT Station | Discussion Group - Communication Software | Read only titles. | |
| ◎ AISOFT Station | Library - EasyFax | Download. | 145 |
| < AISOFT Station | Library - EasyFax | Read only titles. | 14 |
| < AISOFT Station | Library - Communication Software | Read only titles. | 14 |
| ◎ EPSON Forum | Discussion group - Printers | Send a message. | Contents: ... |
| < EPSON Forum | Discussion group - Printers | Read only titles. | 7 |
| ◎ EPSON Forum | Library - Scanners | Download. | 105 |
| < EPSON Forum | Library - Scanners | Read only titles. | 14 |

Fig. 30

- Log-in operation (ID, Password)
- GO MAIL : Shift to e-mail service
  2. Send Mail : Shift in menu
      Send mail.
  1. Receive Mail : Shift in menu
      Read unread titles (also read text).
- GO BBS : Shift to bulletin board service
  4. For Sale: Personal Computers: Shift in menu
      Read text No. 13
      Read text No. 20
- GO CLIP : Shift to clipping service
  1. Read News : Shift in menu
    1. Computer : Shift in menu
        Read unread titles (also read text).
    2. Internet : Shift in menu
        Read unread titles (also read text).
- GO NEWS : Shift to news flash service
  3. Politics and Economics : Shift in menu
      Read unread titles (also read text).
  9. Sports : Shift in menu
      Read unread titles (also read text).
- GO SAISAP : Shift to AISOFT station
  MES 7 : Shift to Discussion Group – EasyFax
      Read unread titles (read only titles).
  MES 18 : Shift to Discussion Group – Communication Software
      Send a follow-up message to 531.   Contents: ⋯
      Read unread titles (read only titles).
  LIB 7 : Shift to Library – EasyFax
      Download No. 145.
- GO FEPSONX : Shift to EPSON Forum
  MES 8 : Shift to Discussion Group – Printers
      Send a message.   Contents: ⋯
  LIB 9 : Shift to Library – Scanners
      Download No. 105.
- OFF : Log-out operation

Fig. 33 (a)

aisoft.general aisoft.comp.pc98 aisoft.comp.dosv

Fig. 33 (b)

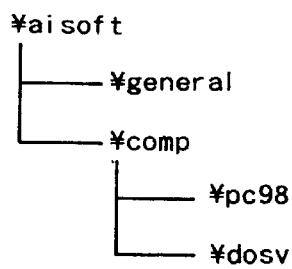

Fig. 34

<HEAD>

<TITLE>This is an example of HTML.</TITLE>

</HEAD>

<BODY>

<A HREF="/epson/index/index.htm"><IMG SRC="/epson/image/haruj.gif"></A><P>   m This is an example of a link to an image.

<A HREF="http://www.aisoft.co.jp/index.htm">Link to aisoft </A>   n

This is an example of a link to an external Web server.

</BODY>

Fig. 35(a)
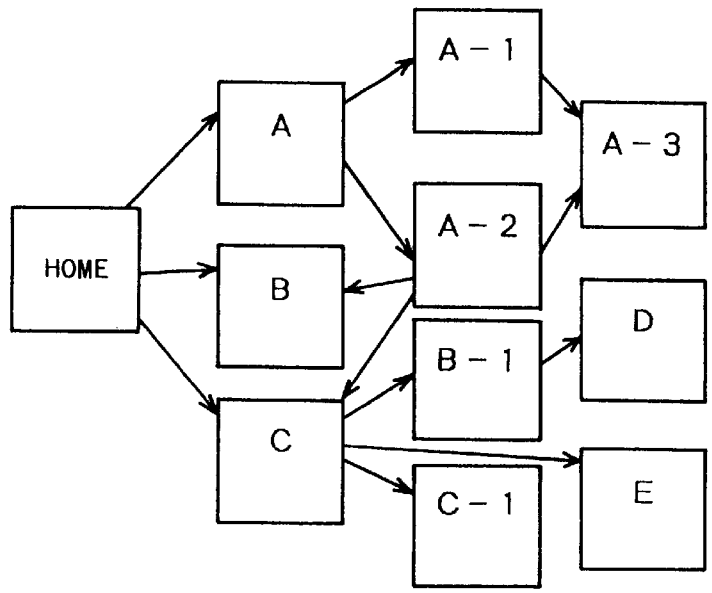
Fig. 35(b)
```
HOME      home¥index.html
A         home¥A.html
A-1       home¥KindA¥A-1.html
A-2       home¥KindA¥A-2.html
A-3       home¥KindA¥KindA-1¥A-3.html
   :
B         home¥B.html
E         home¥E.html
```
Fig. 35(c)
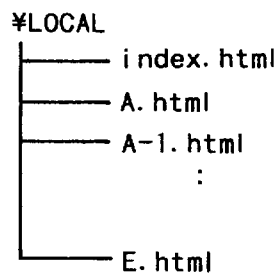
Fig. 35(d)
```
A-2    home¥KindA¥A-2.html
A-3    home¥KindA¥KindA-1¥A-2.html
```

Fig. 36

```
<HEAD>
<TITLE>HTML This is an example of HTML.</TITLE>
</HEAD>
<BODY>

<A HREF="file:///C|/Epson/index/index.htm"><IMG SRC="Epson/image/haruj.gif"></A><P>
This is an example of a link to an image.

<A HREF="file:///C|www.aisoft.co.jp/index.htm"> Link to aisoft </A>
This is an example of a link to an external Web server.

</BODY>
```

Fig. 38(a)

```
A.I.Soft English Home Page
        index
        Company Information
        Products
             :
```

Fig. 38(b)

```
CUSTOMIZE

A.I.Soft Home Page/Products
       SEIKO EPSON Home Page/What's New
             :
```

Fig. 41(a)

USER MANAGEMENT TABLE A

| USER ID | PASSWORD |
|---|---|
|  |  |

Fig. 41(b)

USER MANAGEMENT TABLE B

| USER ID | MONITOR URL | ATTRIBUTES | DATE AND TIME OF LATEST ACCESS |
|---|---|---|---|
|  |  |  |  |

Fig. 41(c)

MONITOR URL DATA

|  | DATE AND TIME OF LATEST CHECK | STATUS | NUMBER OF ERRORS | DATE AND TIME OF LATEST UPDATE |
|---|---|---|---|---|
|  | DATE AND TIME WHEN UPDATE CHECK WAS CARRIED OUT LAST TIME | CURRENT STATE (CHANGED, DELETED, DURING A RETRY AFTER ERROR) |  |  |

Fig. 42(a)

●REGISTRATION OF USER

| MONITOR SERVER | | CLIENT |
|---|---|---|
| | ← | REGISTRATION OF USER<br>NAME OF USER<br>REGISTRATION PASSWORD |
| REGISTRATION OF USER<br>USER ID<br>PASSWORD | → | |
| | | STORE REGISTRATION<br>OF USER |

Fig. 42(b)

●REGISTRATION OF MONITOR URL

| MONITOR SERVER | | CLIENT |
|---|---|---|
| | ← | REGISTRATION OF URL<br>USER ID<br>PASSWORD<br>MONITOR URL |
| REGISTRATION<br>STATUS | → | |

Fig. 42(c)

●INQUIRY OF UPDATE

| MONITOR SERVER | | CLIENT |
|---|---|---|
| | ← | INQUIRY OF UPDATE OF<br>DATA IN URL<br>USER ID<br>PASSWORD |
| OBTAIN MONITOR URL<br>AND DATE AND TIME<br>OF LATEST ACCESS | | |
| UPDATE MONITOR URL<br>CHECK | | |
| LIST OF UPDATE URLs | → | STORE LIST OF UPDATE<br>URLs |
| | | OBTAIN UPDATED<br>DATA IN URL |
| | ← | INFORM SERVER OF DATE<br>AND TIME WHEN OBTAIN<br>UPDATED DATA<br>USER ID<br>PASSWORD<br>MONITOR URL<br>DATE AND TIME |
| UPDATE USER DATA | | |

Fig. 43(A) USER MANAGEMENT TABLE

| USER ID | PASSWORD |
|---|---|
|  |  |

Fig. 43(B) MONITOR URL DATA

| URL | DATE AND TIME OF LATEST CHECK | STATUS | NUMBER OF ERRORS | DATE AND TIME OF LATEST UPDATE |
|---|---|---|---|---|
|  | DATE AND TIME WHEN UPDATE CHECK WAS CARRIED OUT LAST TIME | CURRENT STATE (CHANGED, DELETED, DURING A RETRY AFTER ERROR) |  |  |

Fig. 44

MONITOR URL DATA

| URL | DATE AND TIME OF LATEST CHECK | STATUS | DATE AND TIME OF LATEST ACCESS | DATE AND TIME OF LATEST UPDATE |
|---|---|---|---|---|
|  | DATE AND TIME WHEN UPDATE CHECK WAS CARRIED OUT LAST TIME | CURRENT STATE (CHANGED, DELETED) |  |  |

Fig. 45(a)

● REGISTRATION OF MONITOR URL

| MONITOR SERVER | | CLIENT |
|---|---|---|
| | ← | REGISTRATION OF URL<br>　USER ID<br>　PASSWORD<br>　MONITOR URL |
| REGISTRATION<br>STATUS | → | |
| | | REGISTER IN LOCAL DB |

Fig. 45(b)

● INQUIRY OF UPDATE

| MONITOR SERVER | | CLIENT |
|---|---|---|
| | ← | INQUIRY OF UPDATE OF<br>DATA IN URL<br>　USER ID<br>　PASSWORD<br>　LIST OF MONITOR URLs<br>　LIST OF DATE AND TIME<br>　OF LATEST ACCESS |
| UPDATE MONITOR URL<br>CHECK | | |
| LIST OF UPDATE URLs | → | STORE LIST OF UPDATE<br>URLs IN LOCAL DB |
| | | OBTAIN UPDATED DATA<br>IN URL |

Fig. 49

```
<html>
<head>
<title>New Incoming Information</title>
</head>
<!--------- SetBackGround95/9/11 -->
<body bgcolor="#ffffbb">

<img src="../../image/header.gif"><img src="../../image/null.gif"><img src="../../image/null.gif"><img src=
"../../image/null.gif"><a href="../../infomenu/index.htm"><img src="../../image/index.gif" border=0></a><a href=
"../../index.htm"><img src="../../image/home.gif" border=0></a><br>

<!--------- TitleGraphic -->
<img src="../../image/whatsnew.gif" align="center">
<font size=5>New Incoming Information</font>
<br>

<hr>

<ul>
<li><b> AI News </b><BR>
  <ul>
  <LI>96/11/12  <A HREF="../ainews/news/word25.htm"> Upgrade 'WX-Word for Windows95' to the latest version </A><BR>
  <LI>96/11/07  <A HREF="../ainews/news/df_set.htm"> Release 'DISTANT SUNS FIRST LIGHT Special Set' </A><BR>
  <LI>96/11/06  <A HREF="../ainews/news/dxplorer.htm"> Release 'DiskXplorer for Windows' </A><BR>
              . . . . . . . . .
  <LI>96/08/06  <A HREF="../ainews/news/ippatsu.htm"> Release 'WebWhacker for Macintosh' </A><BR>
```

Fig. 55

| I | NAMES | MEANINGS |
|---|---|---|
| P | Agent ID | ID allocated to each agent |
|   | Invalid Flag | Showing valid or invalid |
| I | Name of Agent | Name given to the agent |
|   | CS Type | Showing whether the data-update monitor operation is carried out by the client or the server |
| I | Monitor Type | Obtain new incoming information / update check |
|   | Check Frequency ID | ID representing the frequency of check |
|   | Frequency of Check (Day) | Information on the day of the week (day) |
|   | Frequency of Check (Week) | Information on the day of the week (week) |
|   | Frequency of Check (Month) | Information on the date (1-31) |
| I | Frequency of Check (for Display) | A series of characters representing the frequency of check |
| I | Date and Time of Latest Check | Date and time when the agent was carried out last time |
|   | Final Status | Status when the agent was carried out last time |
| P | URL ID | ID allocated to the target URL |
| I | Series of URL Characters | A series of characters representing the target URL |

Fig. 56

| I | NAMES | MEANINGS |
|---|---|---|
| P | URL ID | ID allocated to the target URL |
| I | Series of URL Characters | A series of characters representing the target URL |
|   | Final Status | Status when the data-update monitor operation of the target data was carried out last time |
|   | Date and Time of Latest Update | Date and time when the target data were updated last time |
|   | Latest Information ID | ID allocated to the latest information |
|   | Name of User | Name of the user |
|   | Password | Password (a simple code) |
|   | Path Name of Contents | Path name to the reference data A relative path from a basic directory |
|   | Analysis Information | Information for analyzing the target data |

Fig. 57

| I | NAMES | MEANINGS |
|---|---|---|
| P | Latest Information ID | ID allocated to the up-to-date information |
| I | Date and Time of Input | Date and time when the information was obtained |
| I | Agent ID | ID allocated to the agent that obtained the information |
| I | Name of Agent | Name of the agent that obtained the information |
| I | Series of URL characters | A series of URL characters |
|   | URL Title | Title given to the URL page |
| I | Folder ID | Folder ID |
| I | Name of Folder | Name of the folder |
| I | Title | Title of the information (for display) |
|   | Link Destination URL | URL linked with the title |
|   |   |   |
|   | Read Flag | Showing whether the contents have been read or unread |
|   |   |   |
|   | CS Type | Showing whether the new incoming information was obtained by the client or the server |
|   | Information ID | ID allocated to information for each target URL |
|   | Contents of Information | Contents of the information (HTML data) |

Fig. 66

| NAMES IN HTTP | NAMES | MEANINGS |
|---|---|---|
| UserID | User ID | Pre-registered ID allocated to the user |
| Password | Password | Password (simple code) |
| TargetURL | URL to be Checked | A series of characters representing a target URL |
| ProcType | Type of Processing | Operation for obtaining new incoming information / Operation for only update check |
| LastID | Latest information ID | ID allocated to the latest piece of information regarding the target URL |
| LastDate | Date and Time of Latest Input | Date and time when the new incoming information was obtained last time |
| LastCheckDate | Date and Time of Latest Check | Date and time when the target URL was checked last time |
| nFolder | Number of Folders | Number of folders |
|  | Folder Information 1 | ID and a keyword for the first folder |
|  | Folder Information 2 | ID and a keyword for the second folder |
| ClientKind | Type of Client | Model and version of the printer or the PDA |
| OutputInf1 | Processing Information 1 | Data of printing sheets used in the printer |
| OutputInf2 | Processing Information 2 | Contents of an instruction for color correction process |
| OutputInf3 | Processing Information 3 | Contents of an instruction for binary coding process |
| .. | .. | .. |
| Position | Positional Information | Positional information of PDA |
| .. | .. | .. |

Fig. 68

| NAMES | MEANINGS |
|---|---|
| Status | Resulting state of the data-update monitor operation |
|  | The following data are transmitted only when the status represents an update of data. |
| Date and Time of Latest Update | Date and time when the target URL was updated last time |
| Latest Check Information ID | Information ID allocated to the piece of information read out last |
|  | The following data are repeated for every obtained piece of new incoming information. They are valid only when new incoming information is obtained. |
| Input Information ID | Information ID allocated to each piece of new incoming information |
| Type of Information | Difference data or page data |
| Title | Title data (HTML data including link information) |
| Folder ID | ID allocated to the matching folder in the clipping operation |
| Link Destination Body Information | Body information linked with the title (When no body information exists, link information is transmitted) |
| : | : |

DATA-UPDATE MONITORING IN COMMUNICATIONS NETWORK

BACKGROUND OF THE INVENTION

1. Field of the Invention

The present invention relates to a communications terminal connected to a server, in which specific data are stored, via a network, and a data-update monitor server connected to a server, in which specific data are stored, via a network for monitoring update of the specific data and transferring information obtained as the result of monitor to a client, as well as to an information distribution system for sending information obtained as the result of monitoring update of data to every object on a list. The present invention also pertains to a method of obtaining information, a method of transferring requirements, and a method of monitoring a data update, as well as to a recording medium.

2. Description of the Prior Art

There has been an abrupt increase in number of users of value-added communications services, such as personal computer communications services. A general procedure for participating in such a communications service gains an access to a server (communications host) from a communications terminal. Data transmission between the communications terminal and the communications host enables the communications terminal to participate in the communications service supplied by the communications host.

Some of the conventional communications terminals used for this purpose have a function of recording a series of text data (logs) previously transmitted through communication, as well as a function of sending and receiving data to and from the communications host.

The conventional communications terminal, however, simply records the logs. The user should accordingly read the recorded logs all over again in order to find a desired piece of data. The record of such logs increases on every communication of the communications terminal with the communications hqst. It is very difficult for the user to find a desired piece of data among a large number of logs.

A communications terminal proposed to solve this problem has a function of cutting and sorting out the recorded logs after the end of communication. The function of cutting and sorting out the recorded logs given to the communications terminal enables the user to find a desired piece of data relatively readily. In case that data received in a current access are identical with the data transmitted from the communications host in a previous access, however, any proposed communications terminal records the same data twice. Even if the communications terminal has the function of cutting and sorting out the recorded logs, the identical data still exist in the sorted-out logs. This increases wasteful record of data. Overlap of the same data also makes it difficult for the user to find a desired piece of data.

SUMMARY OF THE INVENTION

An object of the present invention is thus to store data transmitted from a server without any overlap in a communications terminal or in another server.

At least part of the above and the other related objects is realized by a communications terminal connected to a server, in which specific data are stored, via a network. The communications terminal comprises: storage means for storing at least part of the specific data as storage data; access means for accessing the server and receiving at least part of the specific data; and difference data specifying means for specifying a non-coincident portion of the received data, which does not coincide with the storage data stored in the storage means, as difference data.

This structure effectively prevents the newly transmitted data that are identical with the storage data from being obtained, so that no identical date will be repeatedly stored.

According to another aspect of the present invention, a communications terminal is connected to a server, which can supply communication services, via a network. The communications terminal comprises: storage means for storing information; access means for accessing the server and receiving information transferred from the server; writing means for writing the received information into the storage means; input means for inputting an instruction to participate in a particular communication service; particular communication service start requiring means for requiring the server to start the particular communication service, based on the input instruction; particular communication service stop requiring means for, when the access means receives title information with respect to the particular communication service transferred from the server and the writing means writes the title information into the storage means, requiring the server to stop the particular communication service; reading means for reading the title information from the storage means; and display means for displaying the title information read from the storage means.

When the user participates in a particular communication service, such as a pay service, this structure enables the user to stop the pay service immediately after receiving only title data. The user can accordingly receive title data regarding the pay service without much communication fee.

According to still another aspect of the present invention, a communications terminal is connected to a server, which can supply a plurality of communication services, via a network. The communications terminal comprises: storage means for storing requirements with respect to the plurality of communication services, which are possibly given to the server; reading means for reading the requirements from the storage means; sorting-out means for sorting out the requirements read from the storage means according to the plurality of communication services; and transfer means for transferring the sorted out requirements to the server.

The requirements transferred to the server are sorted out according to the communication services. The server can thus process the requirements for the same communication service at one time. This shortens the time of communication with the server and thereby improves the communication efficiency.

According to still another aspect of the present invention, a communications terminal is connected to a server via a network. The communications terminal comprises: storage means for storing information; access means for accessing the server and receiving information transferred from the server; and writing means for sorting out the received information according to a specified criterion and writing the sorted-out information into the storage means, in the course of access.

All the received pieces of information are classified prior to storage. The user can thus readily utilize the storage information. The classification is implemented in the course of access. This enables the user to utilize the input information immediately after the end of the access.

According to still another aspect of the present invention, a communications terminal is connected to a server via a network. The communications terminal comprises: storage means for storing information; access means for accessing the server and receiving information transferred from the server; writing means for writing the received information into the storage means; reading means for reading the written information from the storage means; and transfer requiring means for, when a certain piece of information which the reading means tries to read out does not exist in the storage means, requiring the server to transfer the certain piece of information.

This structure enables the client to obtain a certain piece of information that does not exist in the storage means.

The present invention is also directed to a data-update monitor server connected to a server via a network for monitoring update of specific data stored in the server via the network and transferring information obtained as a result of the update monitor to a client. The data-update monitor server comprises: storage means for storing the specific data; access means for accessing the server based on information that represents an address of the specific data and is given by the client; update checking means for, when the access means accesses the server, checking update of the specific data; difference data specifying means for, when it is determined that the specific data have been updated as a result of the update check by the update checking means, specifying a non-coincident portion of updated specific data transmitted from the server and received by the access means, which does not coincident with the non-updated specific data stored in the storage means, as difference data; and transfer means for transferring specific information included in the specified difference data to the client.

The data-update monitor server performs the operation of checking update of specific data and the operation of specifying difference data, instead of the client. This significantly saves the labor of the client.

According to another aspect of the present invention, a data-update monitor server is connected to a server via a network for monitoring update of specific data stored in the server via the network and transferring information obtained as a result of the update monitor to a client. The data-update monitor server comprises: access means for accessing the server based on information representing an address of the specific data; update checking means for, when the access means accesses the server, checking update of the specific data; and transfer means for transferring a result of the update check by the update checking means to the client.

The data-update monitor server performs the operation of checking update of specific data, instead of the client. This significantly saves the labor of the client.

The present invention is further directed to an information distribution system comprises a data-update monitor server connected to a server, in which specific data are stored, via a network and a distribution apparatus that can access the data-update monitor server. The data-update monitor server comprises: storage means for storing the specific data; access means for accessing the server based on information representing an address of the specific data; update checking means for, when the access means accesses the server, checking update of the specific data; difference data specifying means for, when it is determined that the specific data have been updated as a result of the update check by the update checking means, specifying a non-coincident portion of updated specific data transmitted from the server and received by the access means, which does not coincident with the non-updated specific data stored in the storage means, as difference data; and transfer means for transferring specific information included in the difference data specified by the difference data specifying means to the distribution apparatus, in response to an access from the distribution apparatus. The distribution apparatus comprises: information receiving means for accessing the data-update monitor server and receiving the specific information transferred from the data-update monitor server; and information distribution means for distributing the received specific information to a specified object of distribution.

This structure enables specific information included in difference data to be automatically distributed to objects of distribution. The users specified as the objects of distribution are accordingly not required to access the data-update monitor server and receive information.

The preset invention is also directed to a method of obtaining information from a server, in which specific data are stored. The method comprises the steps of: (a) providing storage means for storing at least part of the specific data as storage data; (b) accessing the server via a network and receiving at least part of the specific data; and (c) specifying a non-coincident portion of the data received in the step (b), which does not coincide with the storage data stored in the storage means, as difference data.

The preset invention is further directed to a method of obtaining information from a server that can supply communication services. The method comprises the steps of: (a) providing storage means for storing information; (b) requiring the server to start a particular communication service in response to an instruction to participate in the particular communication service; (c) requiring the server to stop the particular communication service when title information with respect to the particular communication service transferred from the server is received and written into the storage means; and (d) reading the title information from the storage means and displaying the title information.

The preset invention is further directed to a method of transferring a requirement to a server that can supply a plurality of communication services. The method comprises the steps of: (a) providing storage means for storing requirements with respect to the plurality of communication services, which are possibly given to the server; (b) reading the requirements from the storage means; (c) sorting out the requirements read from the storage means according to the plurality of communication services; and (d) transferring the requirements sorted out in the step (c) to the server.

The preset invention is also directed to a method of obtaining information from a server. The method comprises the steps of: (a) providing storage means for storing information; (b) accessing the server and receiving information transferred from the server; and (c) sorting out the received information according to a specified criterion and writing the sorted-out information into the storage means, in the course of access.

The preset invention is further directed to a method of obtaining information from a server. The method comprises the steps of: (a) providing storage means for storing information; (b) accessing the server and receiving information transferred from the server; (c) writing the information received in the step (b) into the storage means; (d) reading the information written in the step (c) from the storage means; and (e) when a certain piece of information which is tried to read out in the step (d) does not exist in the storage means, requiring the server to transfer the certain piece of information.

The preset invention is also directed to a method of monitoring update of data stored in a server and transferring information obtained as a result of the update monitor to a client. The method comprises the steps of: (a) providing storage means for storing the specific data; (b) accessing the server based on information that represents an address of the specific data and is given by the client; (c) checking update of the specific data; (d) when it is determined that the specific data have been updated as a result of the update check in the step (c), specifying a non-coincident portion of updated specific data transmitted from the server, which does not coincident with the non-updated specific data stored in the storage means, as difference data; and (e) transferring specific information included in the difference data specified in the step (d) to the client.

The preset invention is further directed to a method of monitoring update of data stored in a server and transferring information obtained as a result of the update monitor to a client. The method comprises the steps of: (a) accessing the server based on information representing an address of the specific data; (b) checking update of the specific data; and (c) transferring a result of the update check in the step (b) to the client.

The preset invention is also directed to a computer program product for use in a communications terminal connected to a server, in which specific data are stored, via a network, the communications terminal comprising a computer processor and storage means for storing data. The computer program product comprises: a computer-readable medium; first program code means for causing the computer processor to previously write at least part of the specific data as storage data into the storage means; second program code means for causing the computer processor to access the server and receive at least part of the specific data; and third program code means for causing the computer processor to specify a non-coincident portion of the received data, which does not coincide with the storage data stored in the storage means, as difference data; and wherein each of the program code means is recorded on the computer-readable medium.

The preset invention is further directed to a computer program product for use in a communications terminal connected to a server, which can supply communication services, via a network, the communications terminal comprising a computer processor, storage means for storing information, display means for displaying information and input means for inputting an instruction. The computer program product comprises: a computer-readable medium; first program code means for causing the computer processor to access the server and receive information transferred from the server; second program code means for causing the computer processor to write the received information into the storage means; third program code means for, when an instruction is input by the input means to participate in a particular communication service supplied by the server, causing the computer processor to require the server to start the particular communication service based on the instruction; fourth program code means for, when the computer processor receives title information with respect to the particular communication service transferred from the server and writes the title information into the storage means, causing the computer processor to require the server to stop the particular communication service; and fifth program code means for causing the computer processor to read the title information from the storage means and to enable the display means to display the title information; and wherein each of the program code means is recorded on the computer-readable medium.

The preset invention is also directed to a computer program product for use in a communications terminal connected to a server, which can supply a plurality of communication services, via a network, the communications terminal comprising a computer processor and storage means for storing information. The computer program product comprises: a computer-readable medium; first program code means for causing the computer processor to write requirements with respect to the plurality of communication services, which are possibly given to the server, into the storage means; second program code means for causing the computer processor to read the requirements from the storage means; third program code means for causing the computer processor to sort out the requirements read from the storage means according to the plurality of communication services; and fourth program code means for causing the computer processor to transfer the sorted out requirements to the server; and wherein each of the program code means is recorded on the computer-readable medium.

The preset invention is also directed to a computer program product for use in a communications terminal connected to a server via a network, the communications terminal comprising a computer processor and storage means for storing information. The computer program product comprises: a computer-readable medium; first program code means for causing the computer processor to access the server and receive information transferred from the server; and second program code means for causing the computer processor to sort out the received information according to a specified criterion and to write the sorted-out information into the storage means, in the course of access; and wherein each of the program code means is recorded on the computer-readable medium.

The preset invention is further directed to a computer program product for use in a communications terminal connected to a server via a network, the communications terminal comprising a computer processor and storage means for storing information. The computer program product comprises: a computer-readable medium; first program code means for causing the computer processor to access the server and receive information transferred from the server; second program code means for causing the computer processor to write the received information into the storage means; third program code means for causing the computer processor to read the written information from the storage means; and fourth program code means for, when a certain piece of information which the computer processor tries to read out does not exist in the storage means, causing the computer processor to require the server to transfer the certain piece of information; and wherein each of the program code means is recorded on the computer-readable medium.

The preset invention is also directed to a computer program product for use in a data-update monitor server connected to a server, in which specific data are stored, via a network, the data-update monitor server comprising a computer processor and storage means for storing the specific data. The computer program product comprises: a computer-readable medium; first program code means for causing the computer processor to previously write the specific data into the storage means; second program code means for causing the computer processor to access the server based on information that represents an address of the specific data and is given by the client; third program code means for, when the computer processor accesses the server, causing the computer processor to check update of the specific data; fourth program code means for, when it is determined that the specific data have been updated as a result of the update check by the computer processor, causing the computer processor to specify a non-coincident portion of updated specific data transmitted from the server and received by the computer processor, which does not coincident with the non-updated specific data stored in the storage means, as difference data; and fifth program code means for causing the computer processor to transfer specific information included in the specified difference data to the client; and wherein each of the program code means is recorded on the computer-readable medium.

The preset invention is further directed to a computer program product for use in a data-update monitor server connected to a server, in which specific data are stored, via a network, the data-update monitor server comprising a computer processor. The computer program product comprises: a computer-readable medium; first program code means for causing the computer processor to access the server based on information representing an address of the specific data; second program code means for, when the computer processor accesses the server, causing the computer processor to check update of the specific data; and third program code means for causing the computer processor to transfer a result of the update check by the computer processor to the client.

These and other objects, features, aspects, and advantages of the present invention will become more apparent from the following detailed description of the preferred embodiments with the accompanying drawings.

BRIEF DESCRIPTION OF THE DRAWINGS

FIG. 5 shows the contents of an index file on a list of discussion groups (folder list index file) as an example;

FIG. 7 shows the contents of an index file on a discussion group as an example;

FIGS. 10(a) and 10(b) show a concrete procedure of the title updating operation for the discussion group;

FIGS. 13(a) and 13(b) show a concrete procedure of the title updating operation for the library;

FIGS. 16(a) and 16(b) show a concrete procedure of the title updating operation for the news service;

FIG. 20 shows a periodic access specification window displayed on the monitor 76 as an example;

FIG. 21 shows the contents of specification stored in the periodic access file 620 as an example;

FIG. 25 shows addition of a reservation;

FIG. 26 shows the contents of reservation stored in the reserve file 610 as an example;

FIG. 27(a), FIGS. 27(b) and 27(c) show a procedure of reading text in the bulletin board service;

FIG. 29 shows the contents of access sorted out by the routine of improving the efficiency of access shown in the flowchart of FIG. 28;

FIG. 30 shows a communication history of automatic communication carried out according to the contents of access shown in FIG. 29;

FIGS. 33(a) and 33(b) show hierarchical structure of news groups;

FIG. 34 shows hypertext data written in HTML as an example;

FIGS. 35(a), 35(b), 35(c) and 35(d) show links of pages by hypertext data and structure of files;

FIG. 36 shows hypertext data rewritten prior to being registered into the database 410;

FIGS. 38(a) and 38(b) show a flat display of pages on the screen;

FIGS. 41(a), 41(b) and 41(c) show the outlines of management data in case that the monitor URL for each user is managed by the data-update monitor server 1000;

FIGS. 42(a), 42(b) and 42(c) show the outlines of transactions between the data-update monitor server 1000 and the client 2000 in case that the monitor URL for each user is managed by the data-update monitor server 1000;

FIGS. 43(a) and 43(b) show the outlines of management data in case that the monitor URL for each user is managed by each client 2000;

9

Figure 46:
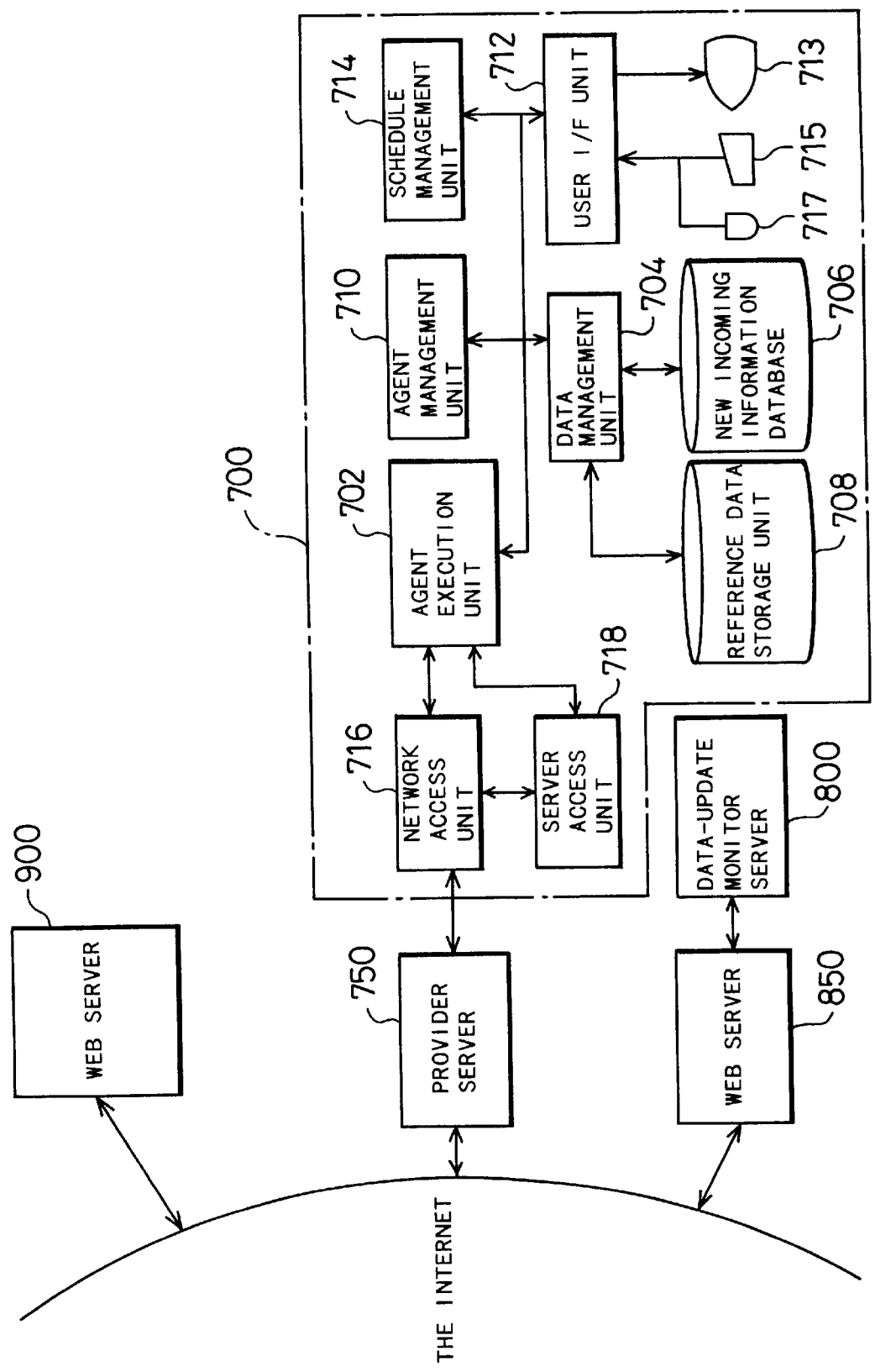
Figure 47:
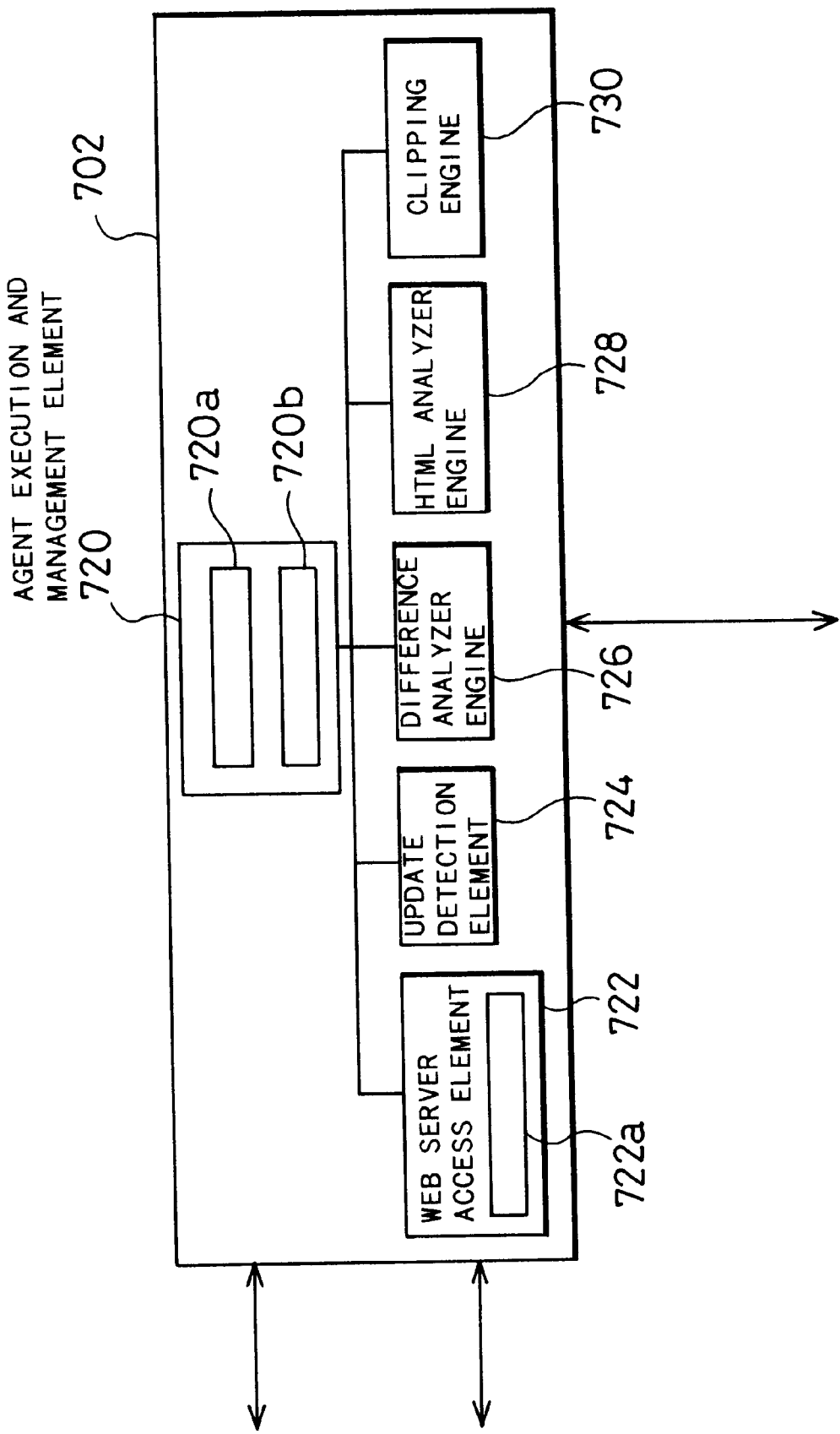
Figure 48:
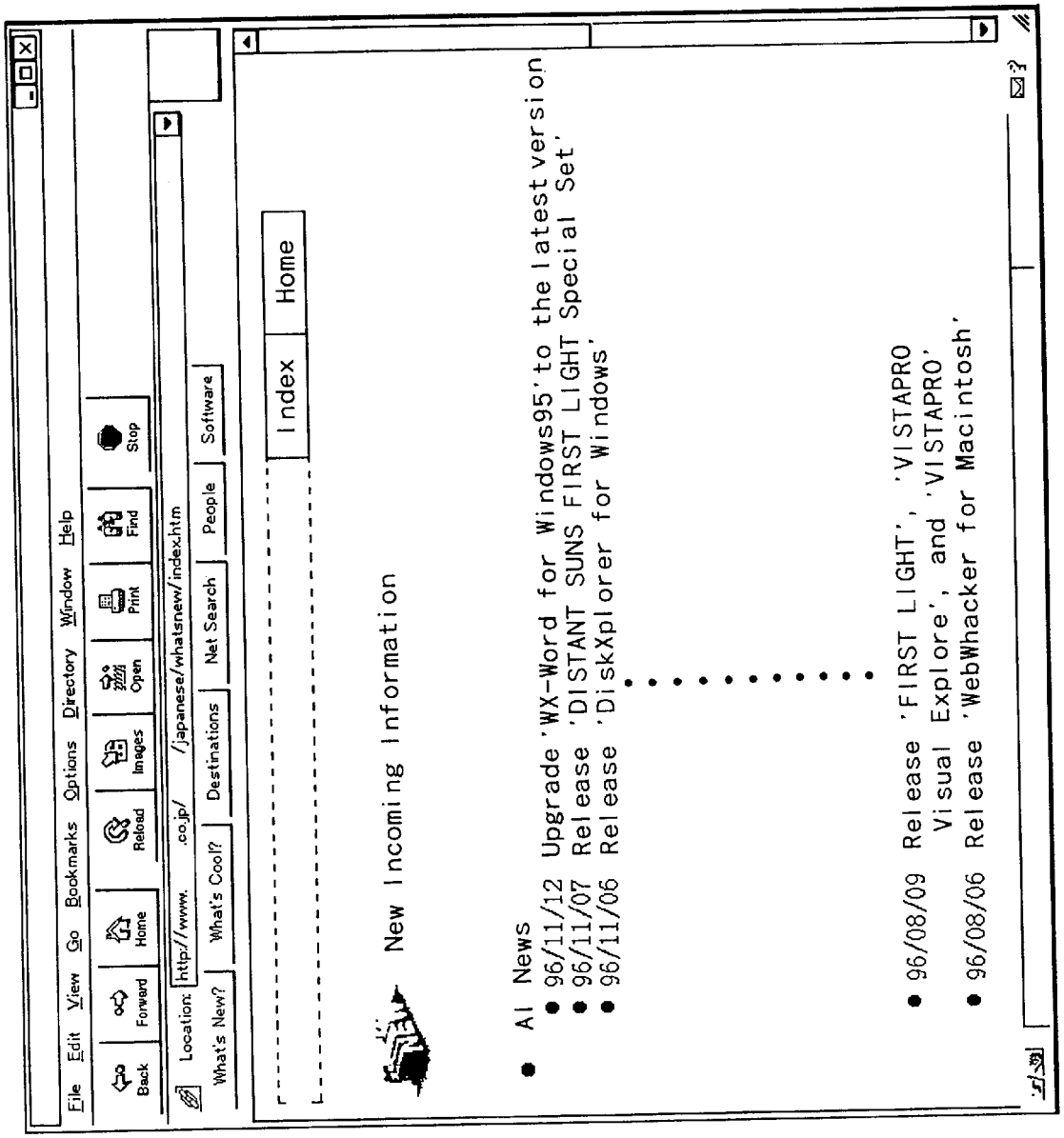
Figure 50:
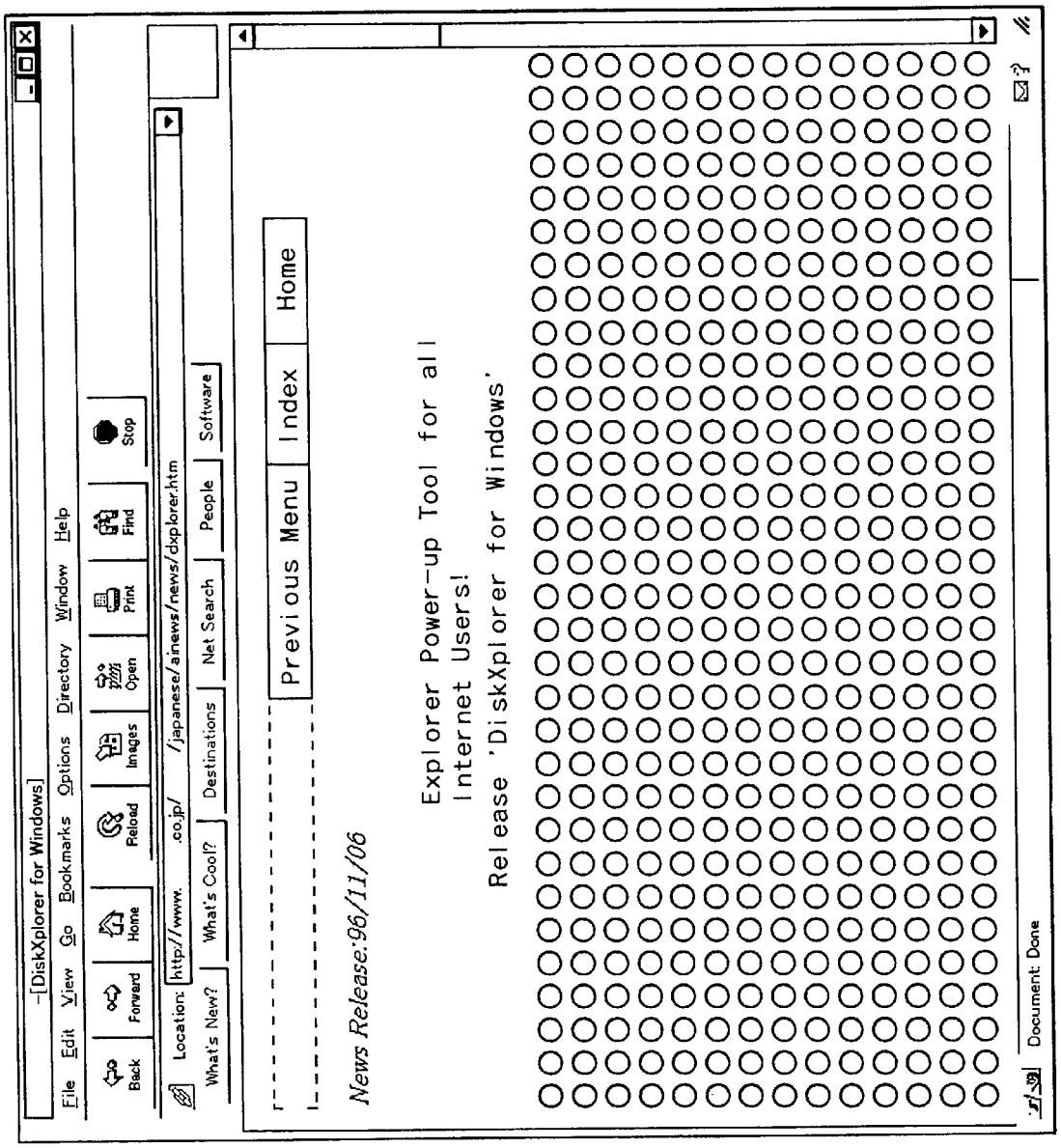
Figure 51:
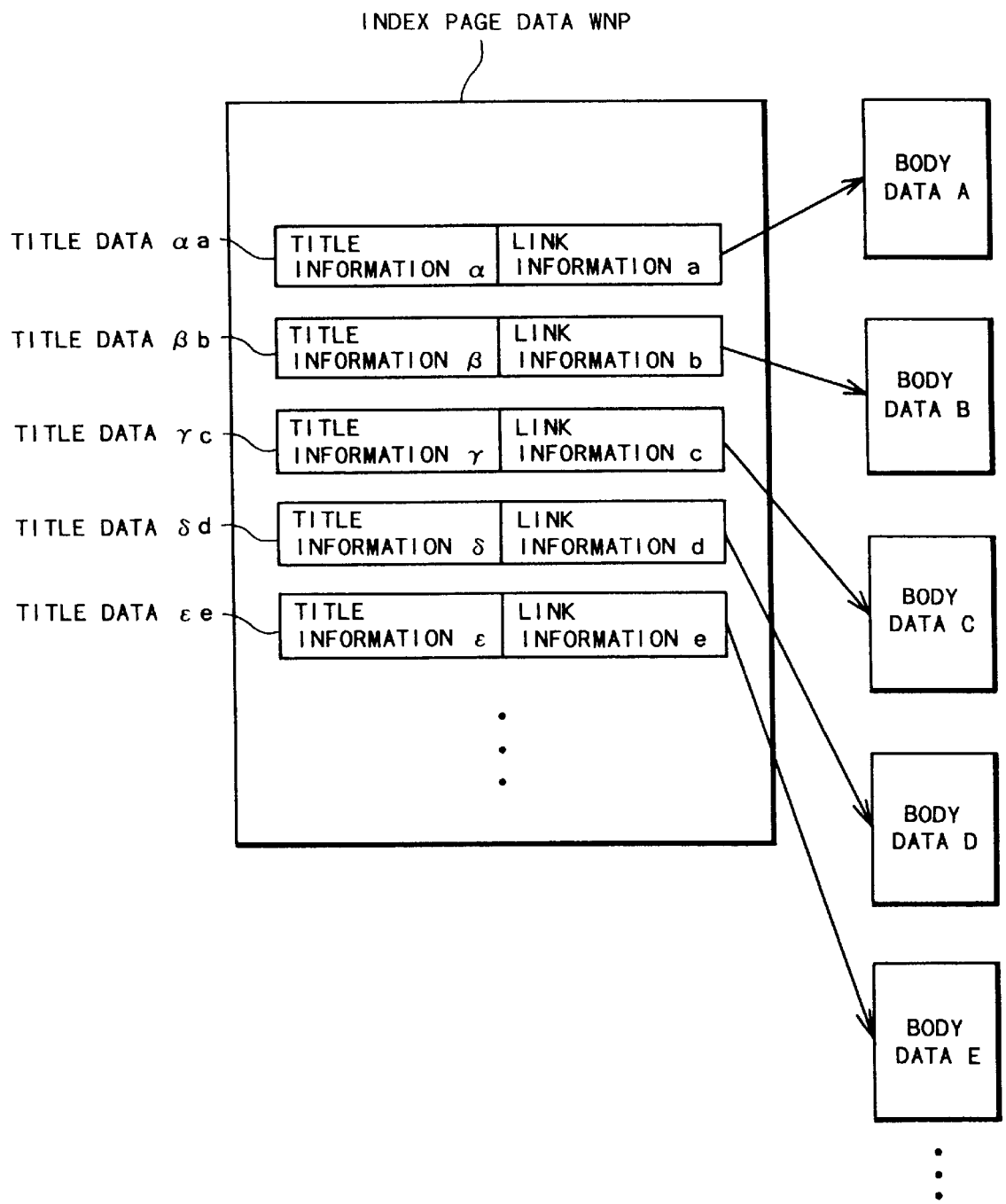
Figure 52:
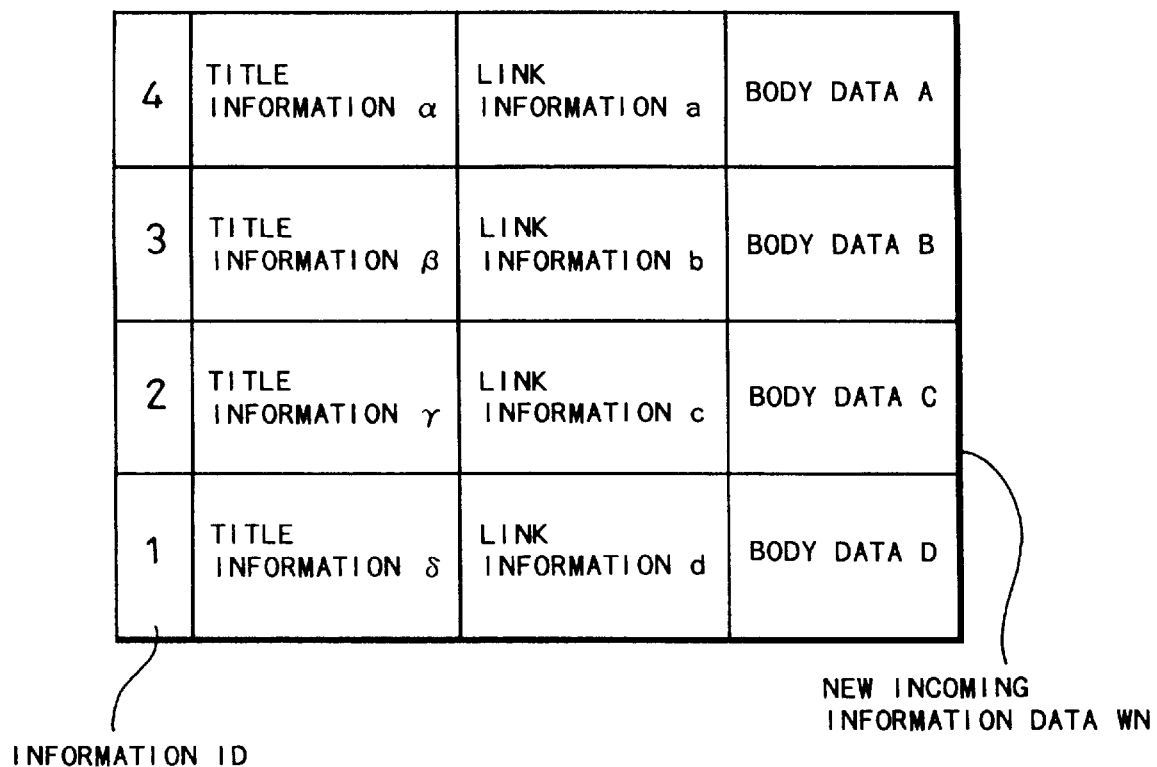
Figure 53:
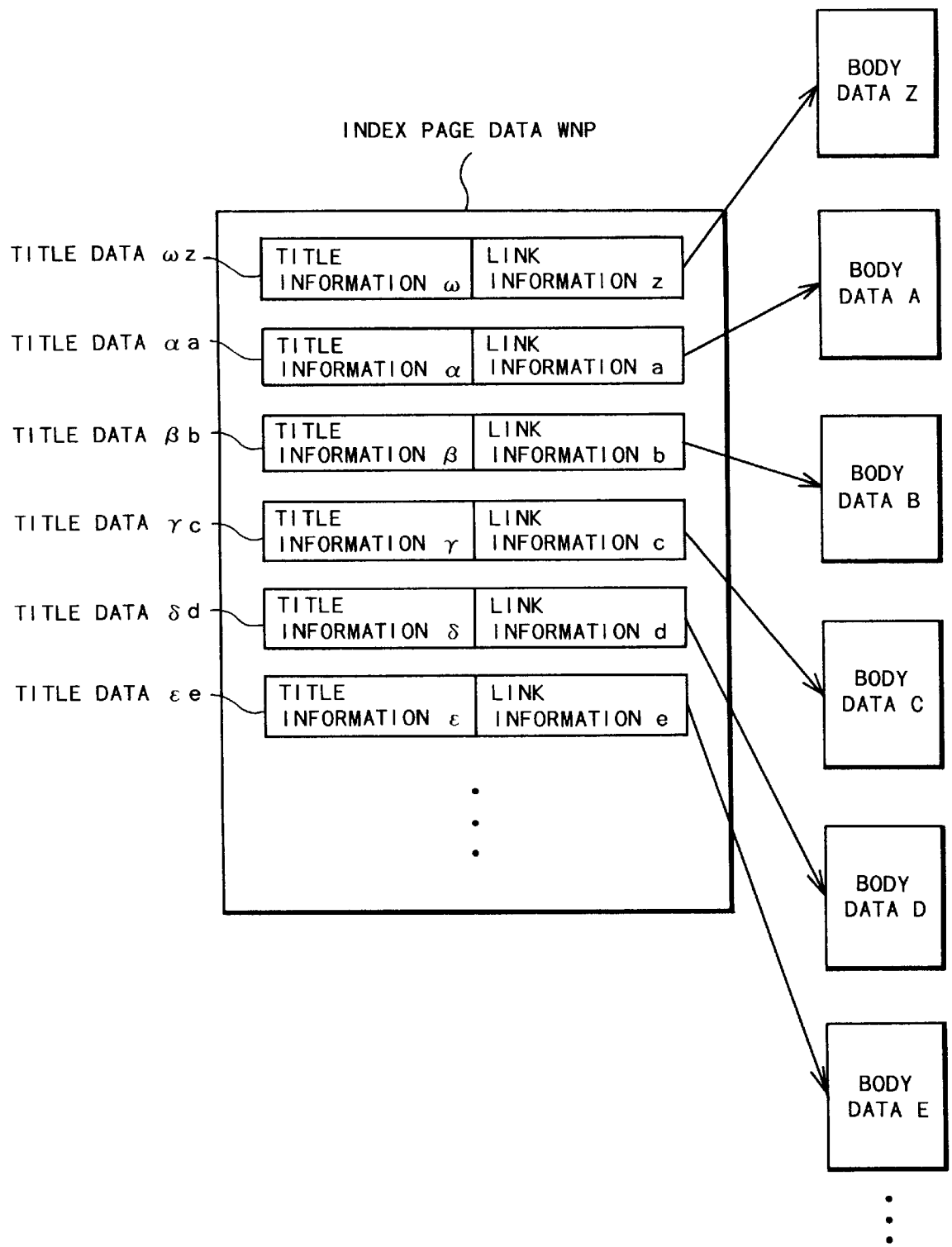
Figure 54:
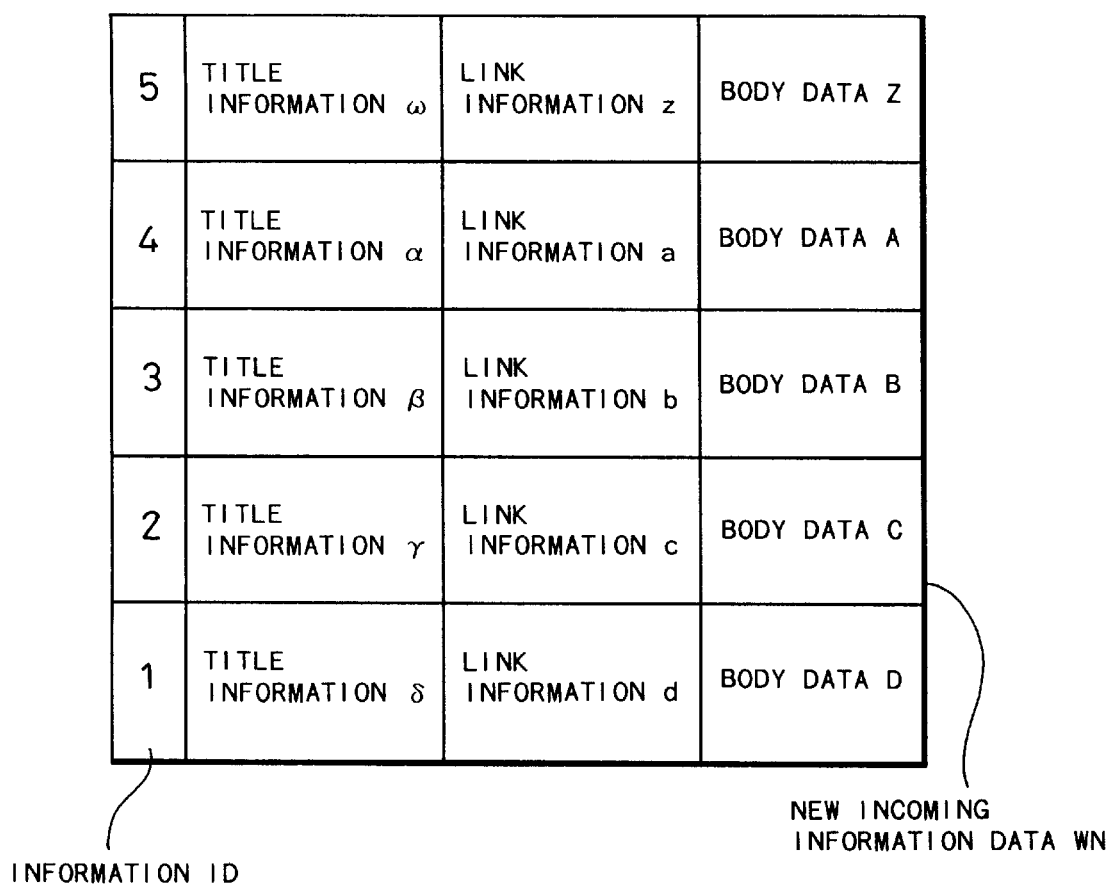
Figure 58:
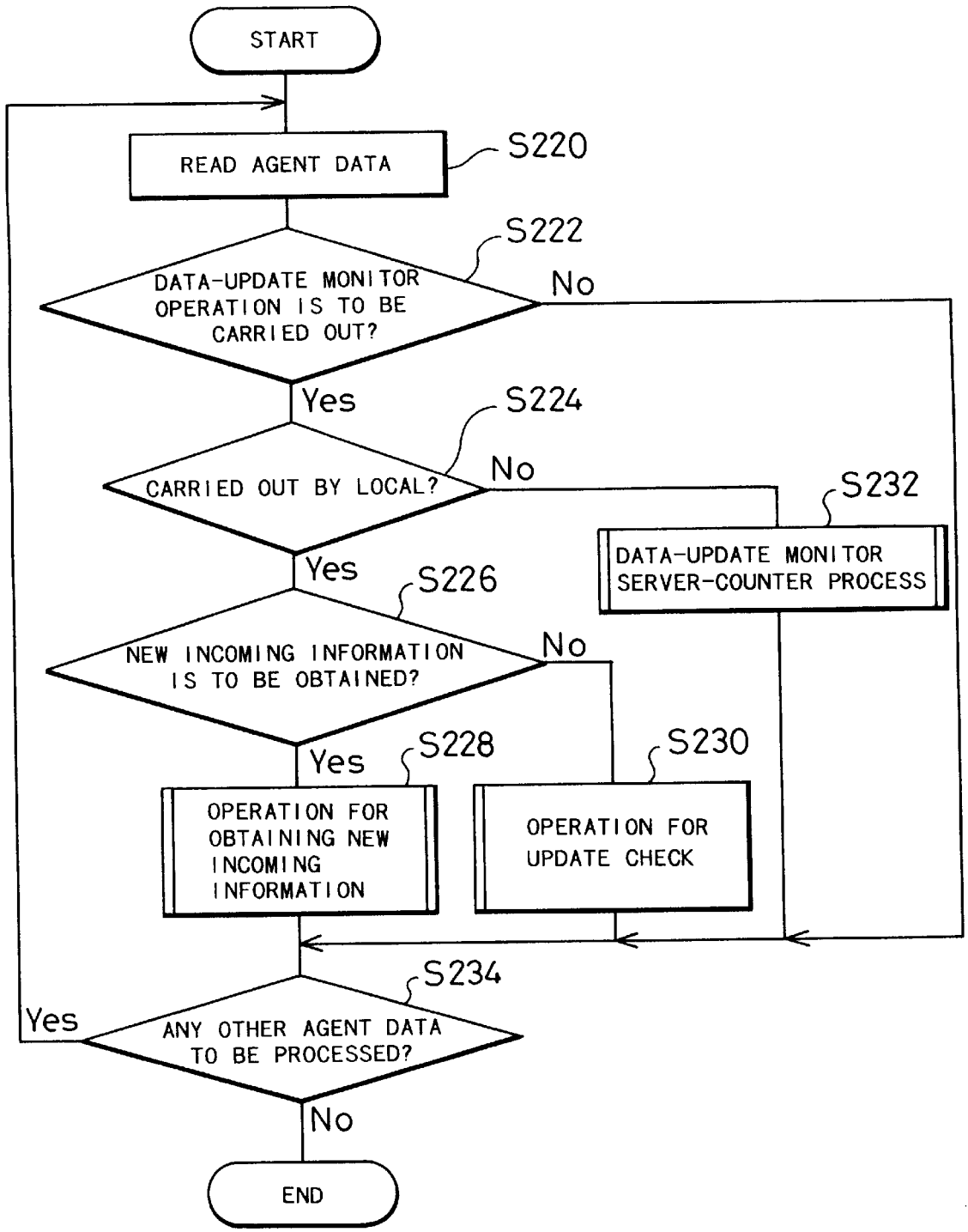
Figure 59:
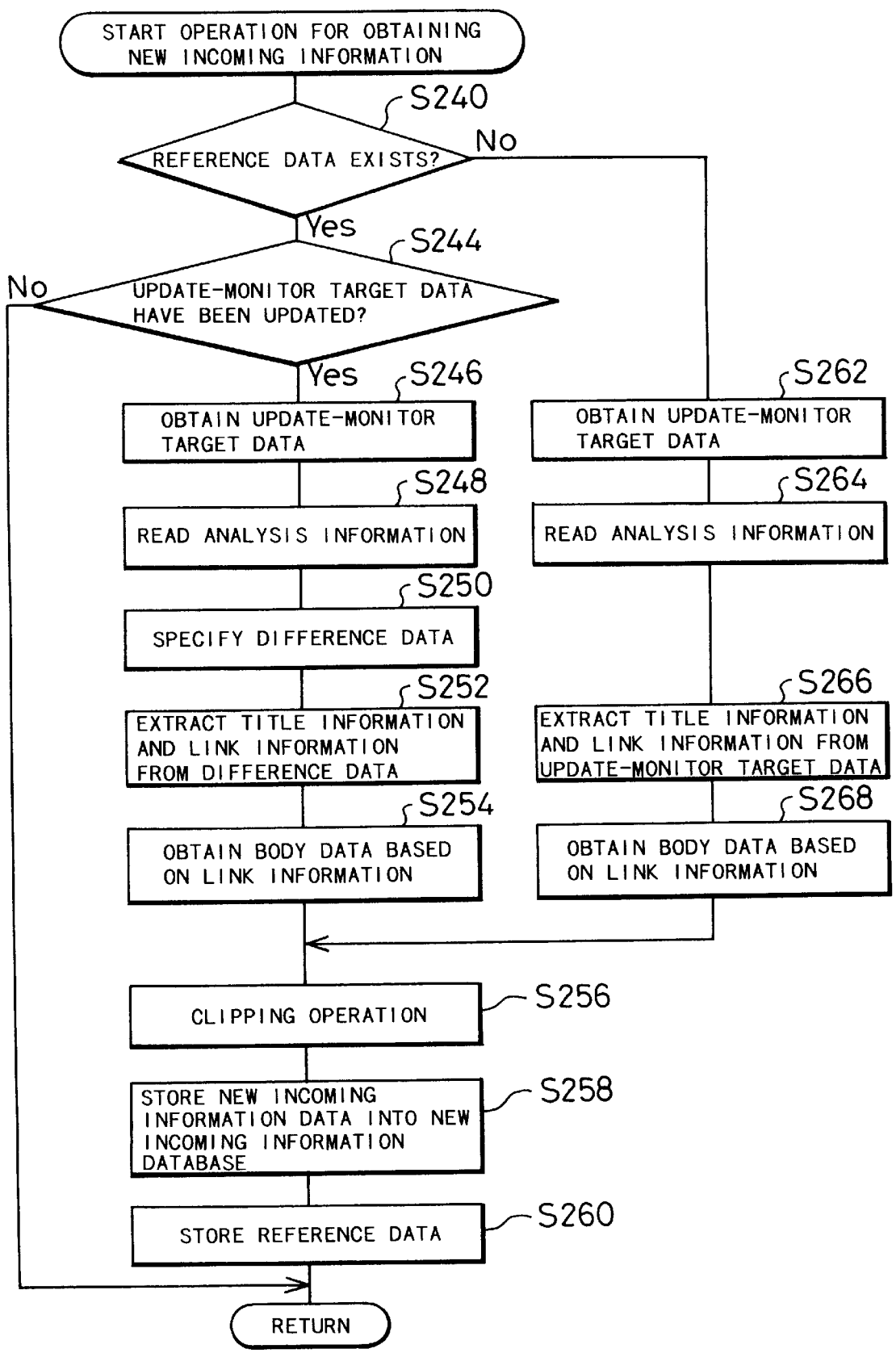
Figure 60:
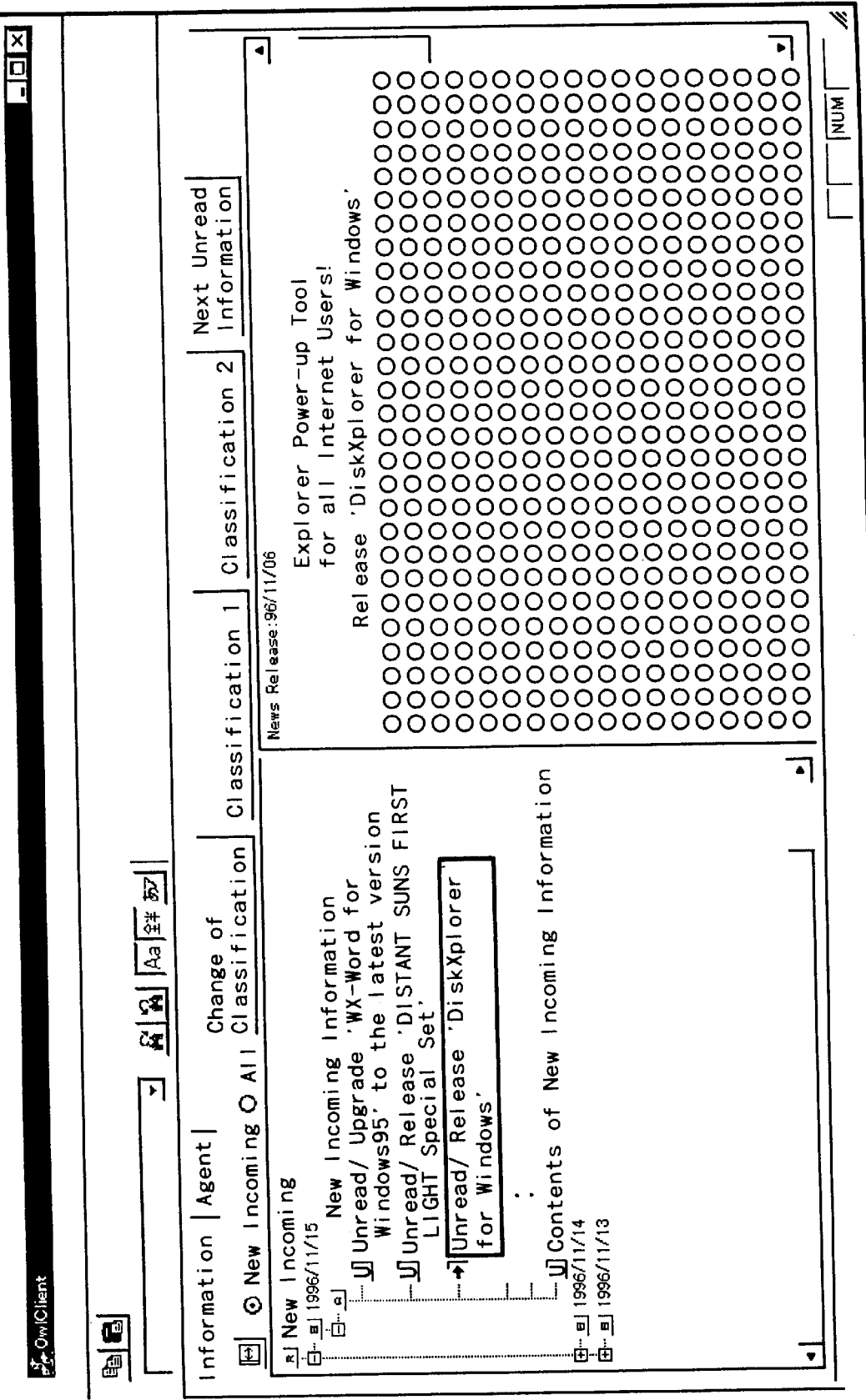
Figure 61:
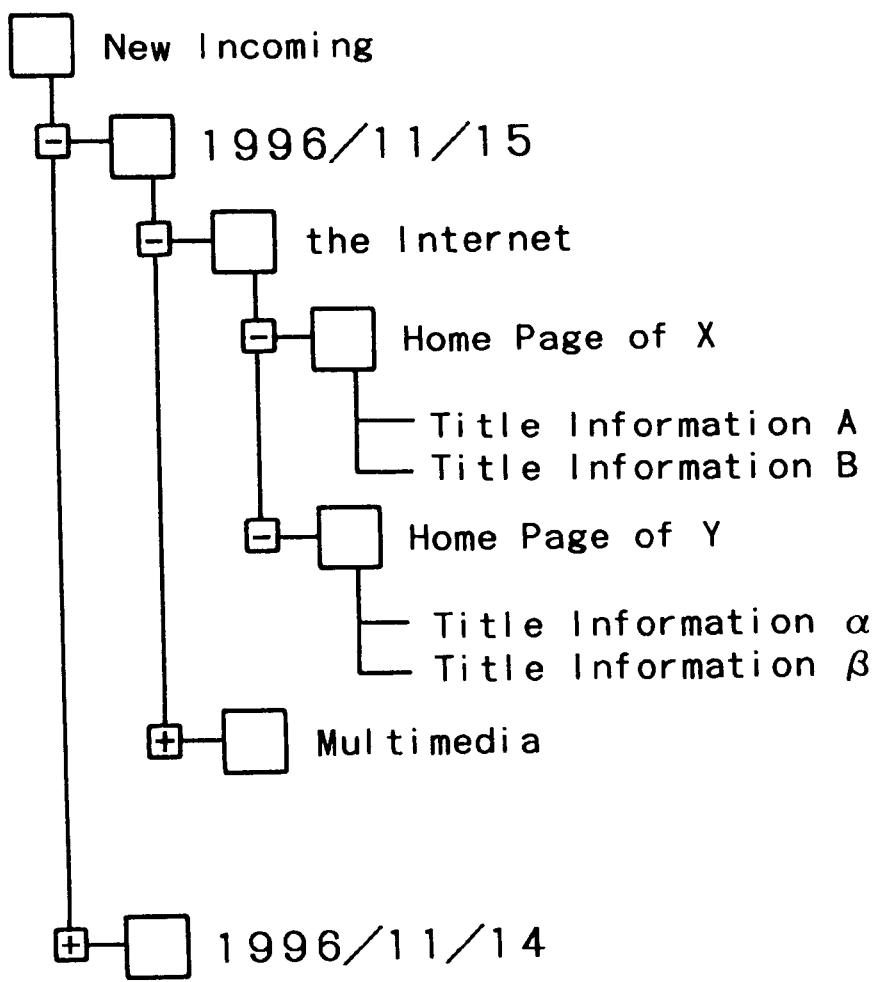
Figure 62:
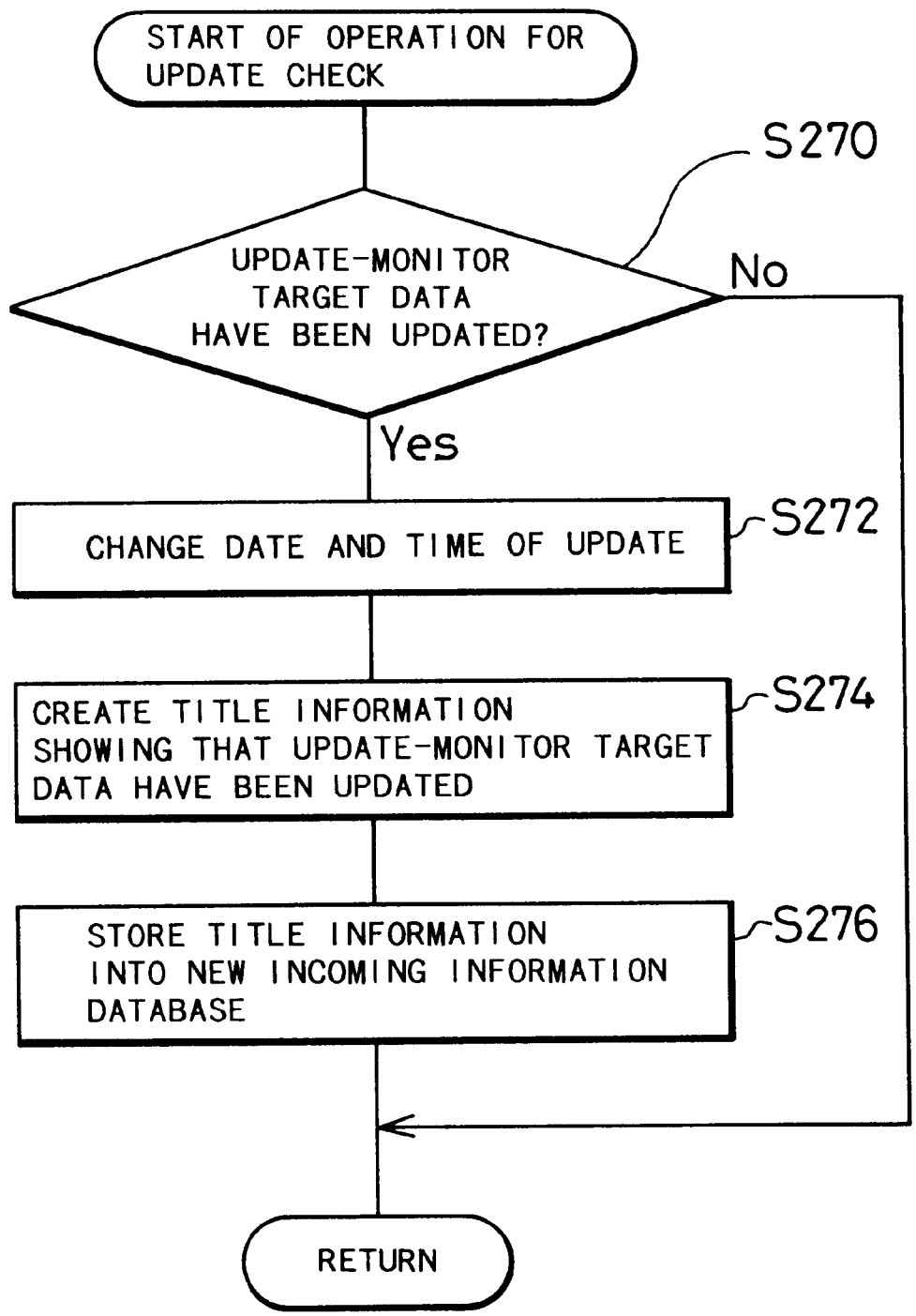
Figure 63:
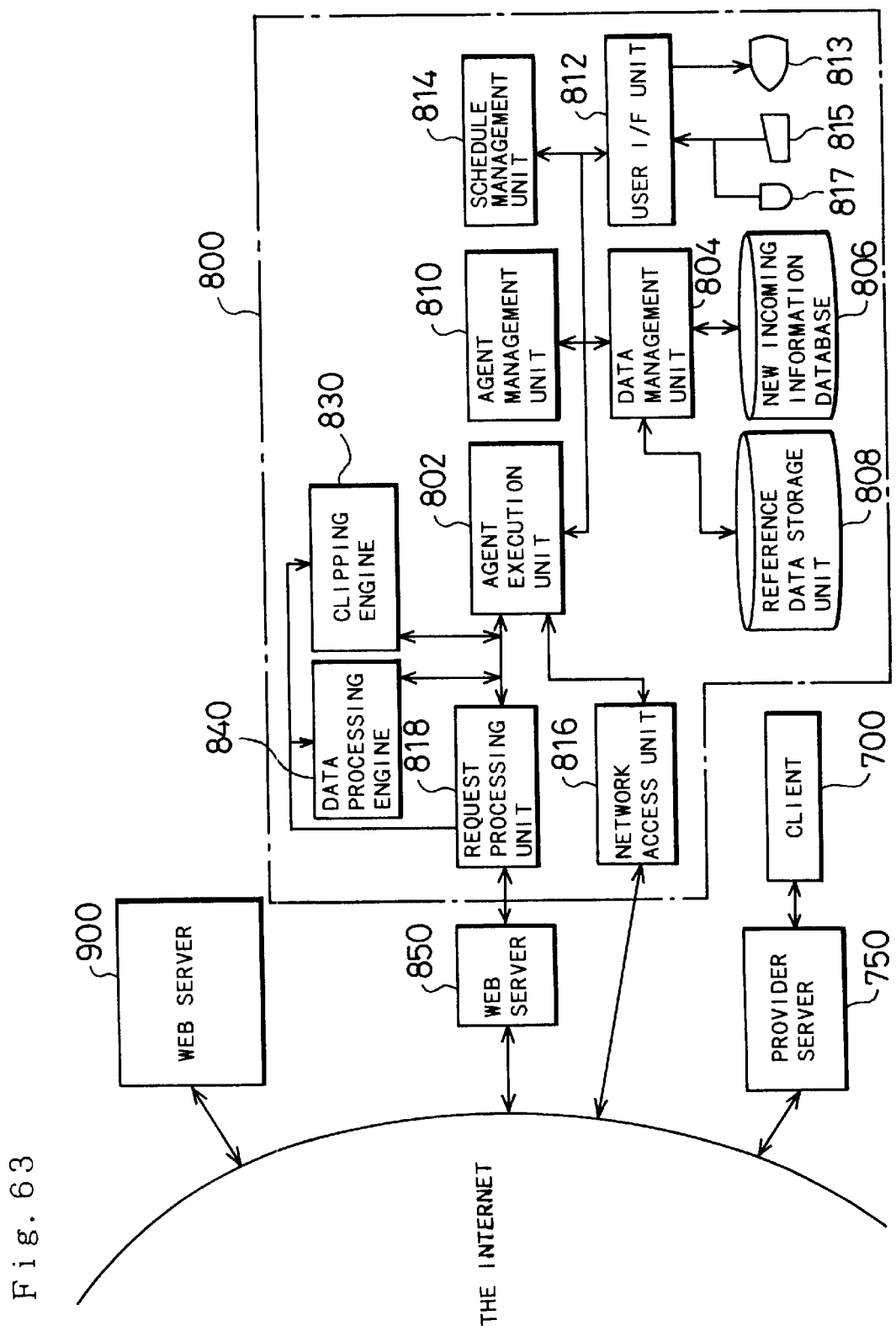
Figure 64:
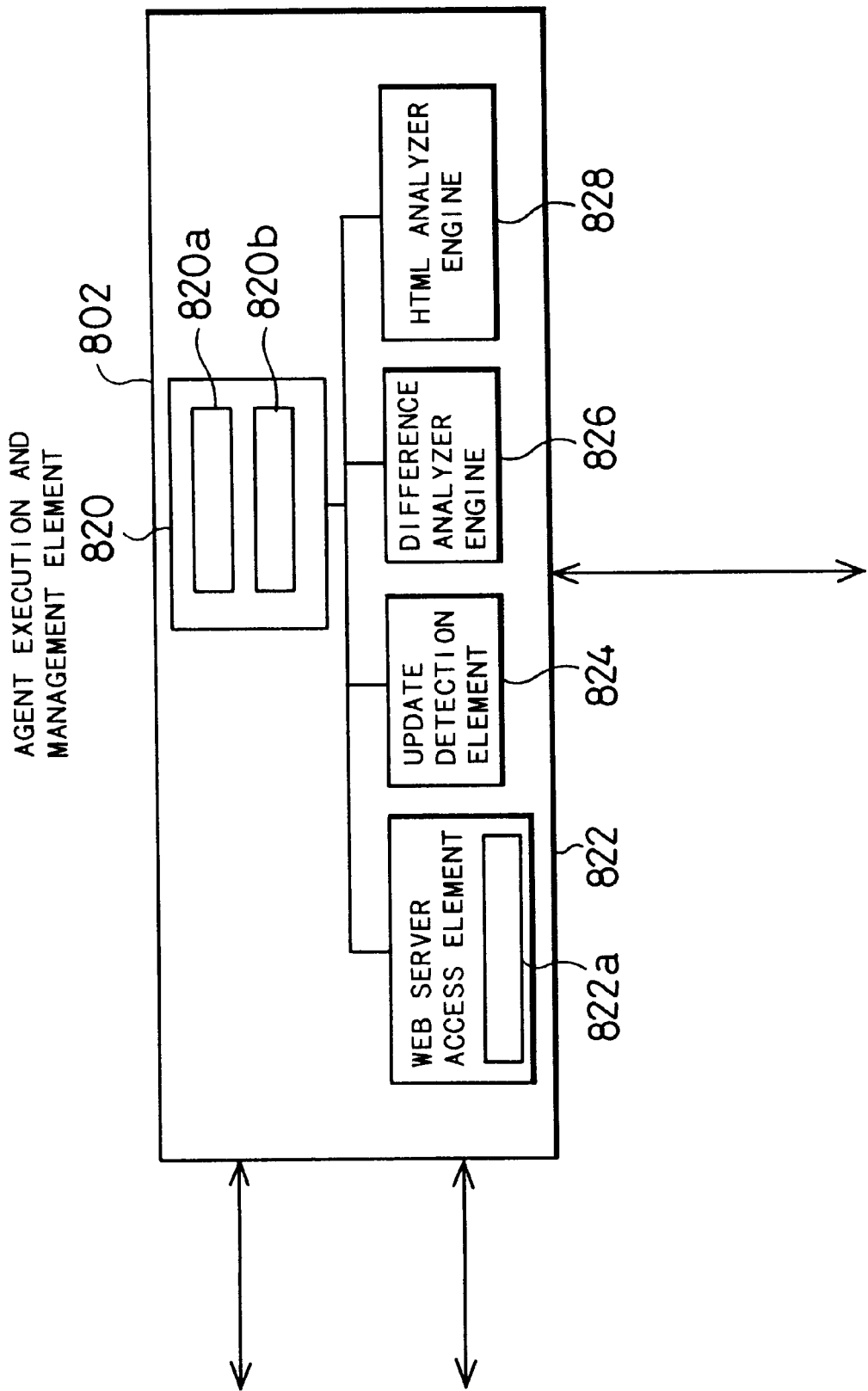
Figure 65:
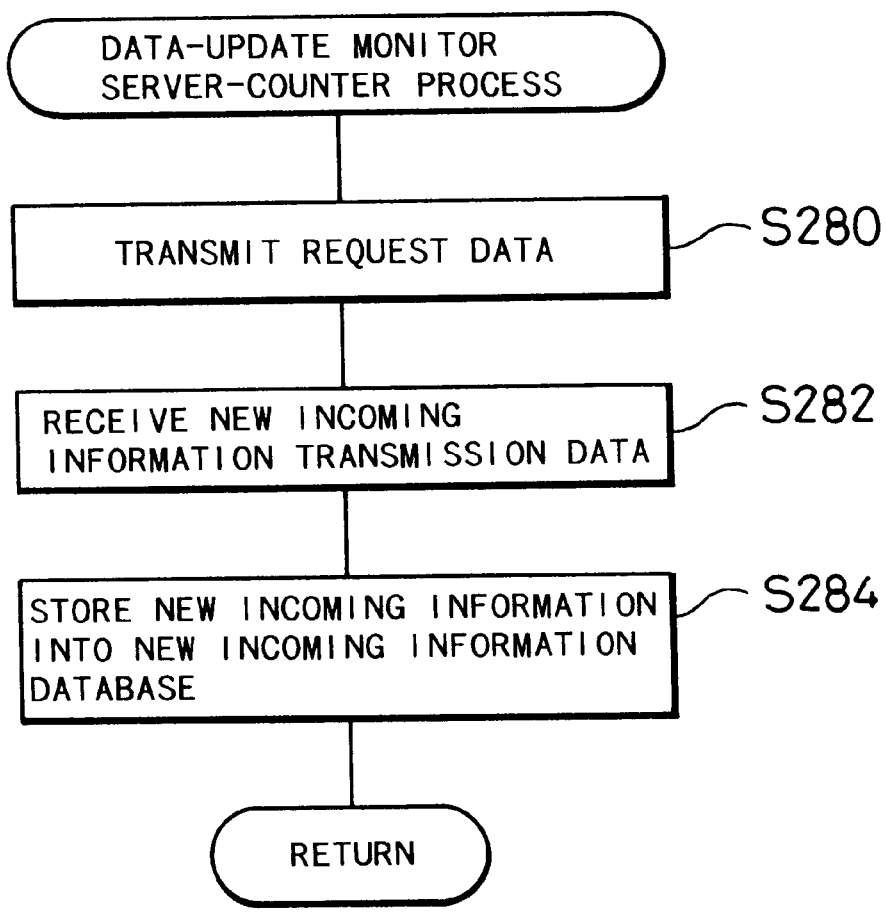
Figure 67:
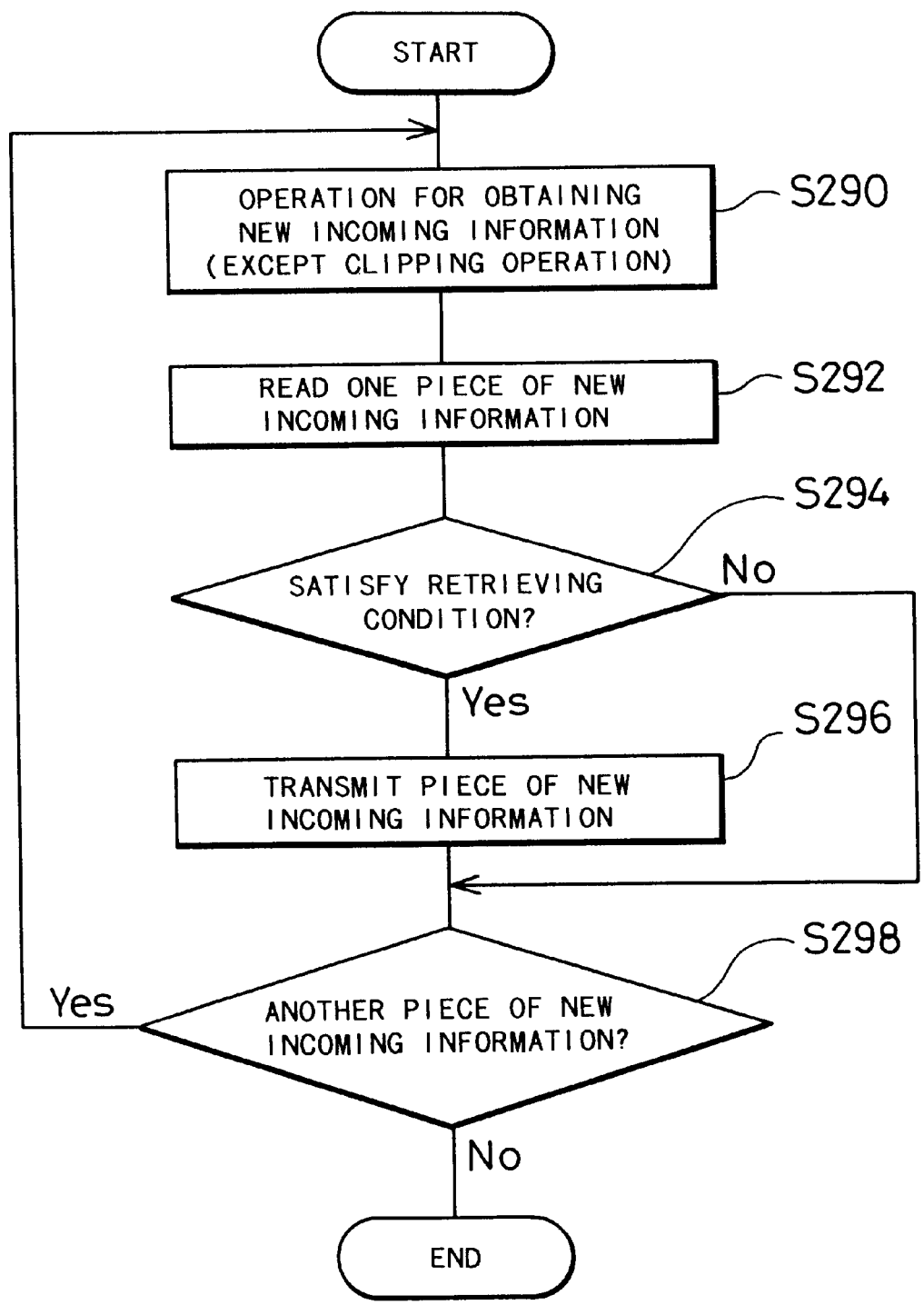

FIG. 44 shows the outlines of management data in case that the monitor URL for each user is managed by each client 2000;

FIGS. 45(*a*) and 45(*b*) show the outlines of transactions between the data-update monitor server 1000 and the client 2000 in case that the monitor URL for each user is managed by each client 2000;

FIG. 46 is a block diagram illustrating structure of a communications terminal as a third embodiment according to the present invention;

FIG. 47 is a block diagram illustrating structure of the agent execution unit 702 shown in FIG. 46;

FIG. 48 shows an index page, on which plural pieces of title information are written, as an example;

FIG. 49 shows the contents of HTML data (index page data) representing the index page shown in FIG. 48;

FIG. 50 shows a page, on which body information linked with the title information "Release 'DiskXplorer for Windows'" shown in FIG. 48 is written;

FIG. 51 shows the relationship between index page data and plural pieces of body data stored in a Web server;

FIG. 52 shows new incoming information data stored in the new incoming information database 706 shown in FIG. 46 as an example;

FIG. 53 shows the relationship between updated index page data and body data stored in the Web server;

FIG. 54 shows updated new incoming information data stored in the new incoming information database 706 shown in FIG. 46 as an example;

FIG. 55 shows the contents of agent data used in the third embodiment;

FIG. 56 shows the contents of URL data used in the third embodiment;

FIG. 57 shows the contents of a new incoming information table used in the third embodiment;

FIG. 58 is a flowchart showing a typical processing routine executed by the communications terminal 700 shown in FIG. 46;

FIG. 59 is a flowchart showing details of the operation for obtaining new incoming information carried out at step S228 in the flowchart of FIG. 58;

FIG. 60 shows new incoming information displayed on the screen of the monitor 713 as an example;

FIG. 61 shows a title information tree as an example;

FIG. 62 is a flowchart showing details of the operation for update check carried out at step S230 in the flowchart of FIG. 58;

FIG. 63 is a block diagram illustrating structure of a data-update monitor server as a fourth embodiment according to the present invention;

FIG. 64 is a block diagram illustrating structure of the agent execution unit 802 shown in FIG. 63;

FIG. 65 is a flowchart showing a processing routine of data-update monitor server-counter process carried out at step S232 in the flowchart of FIG. 58;

FIG. 66 shows the contents of request data transmitted from the communications terminal or client to the data-update monitor server;

FIG. 67 is a flowchart showing a primary processing routine executed by the data-update monitor server 800 shown in FIG. 63;

FIG. 68 shows the contents of new incoming information transmission data transmitted from the data-update monitor server to the communications terminal or client;

10

Figure 69:
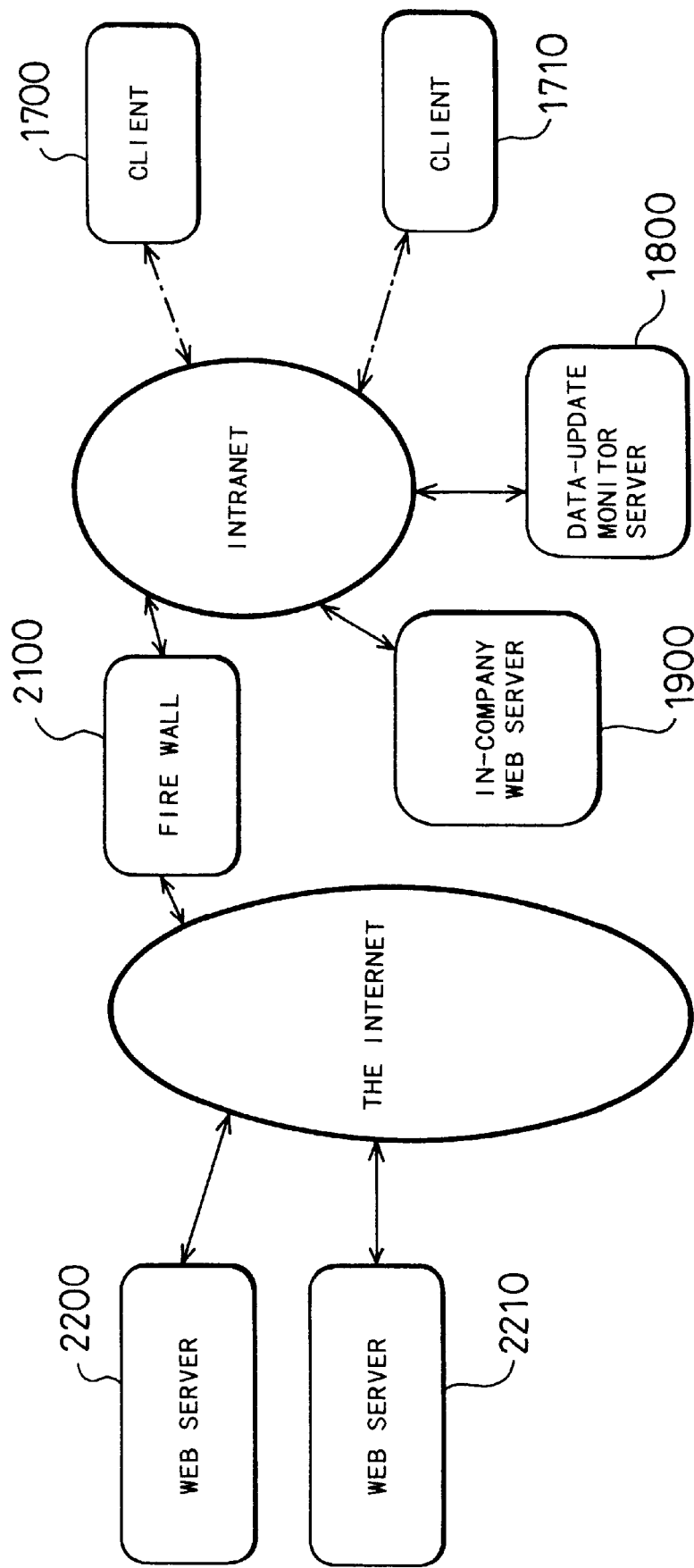
Figure 70:
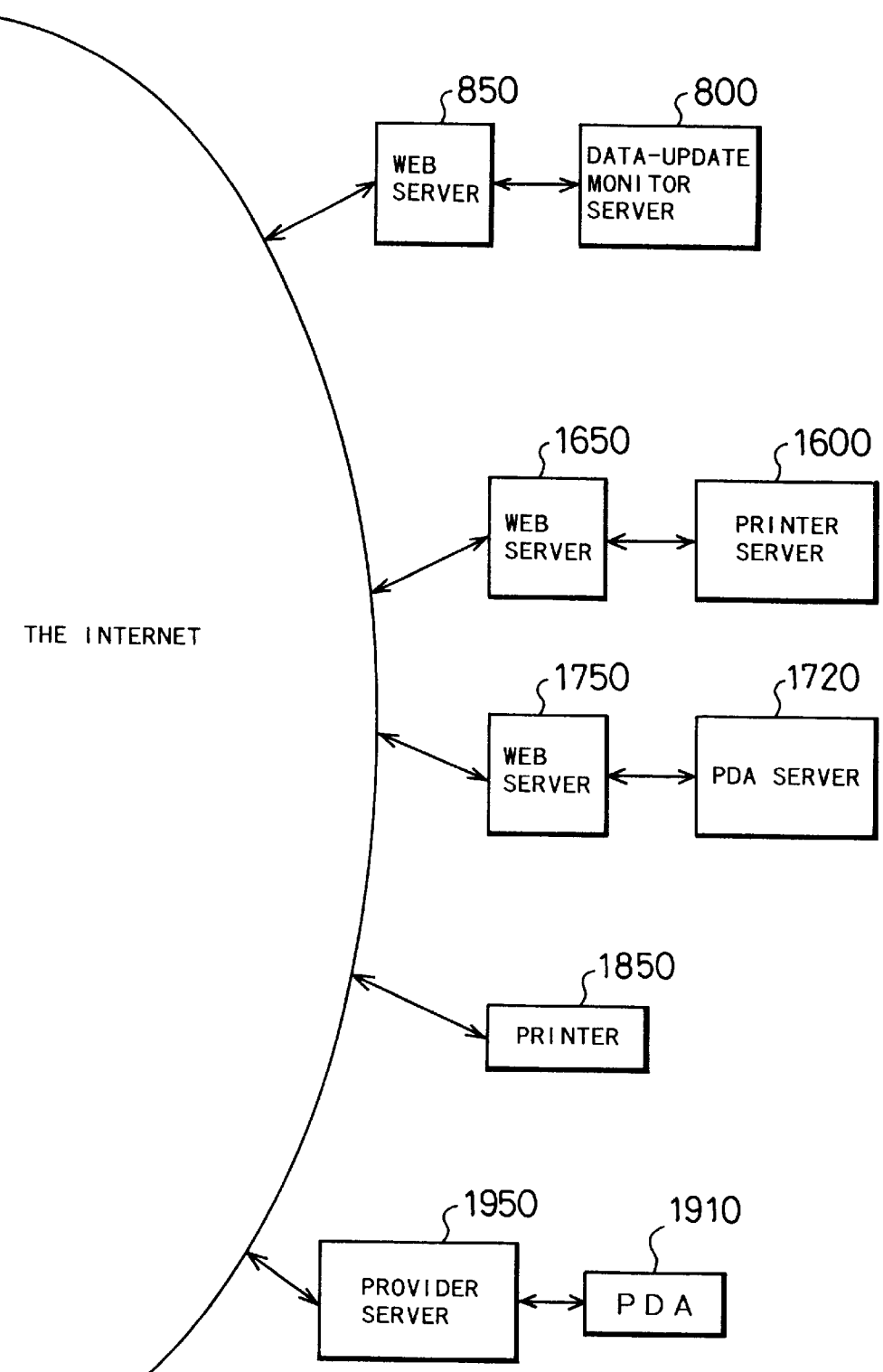
Figure 71:
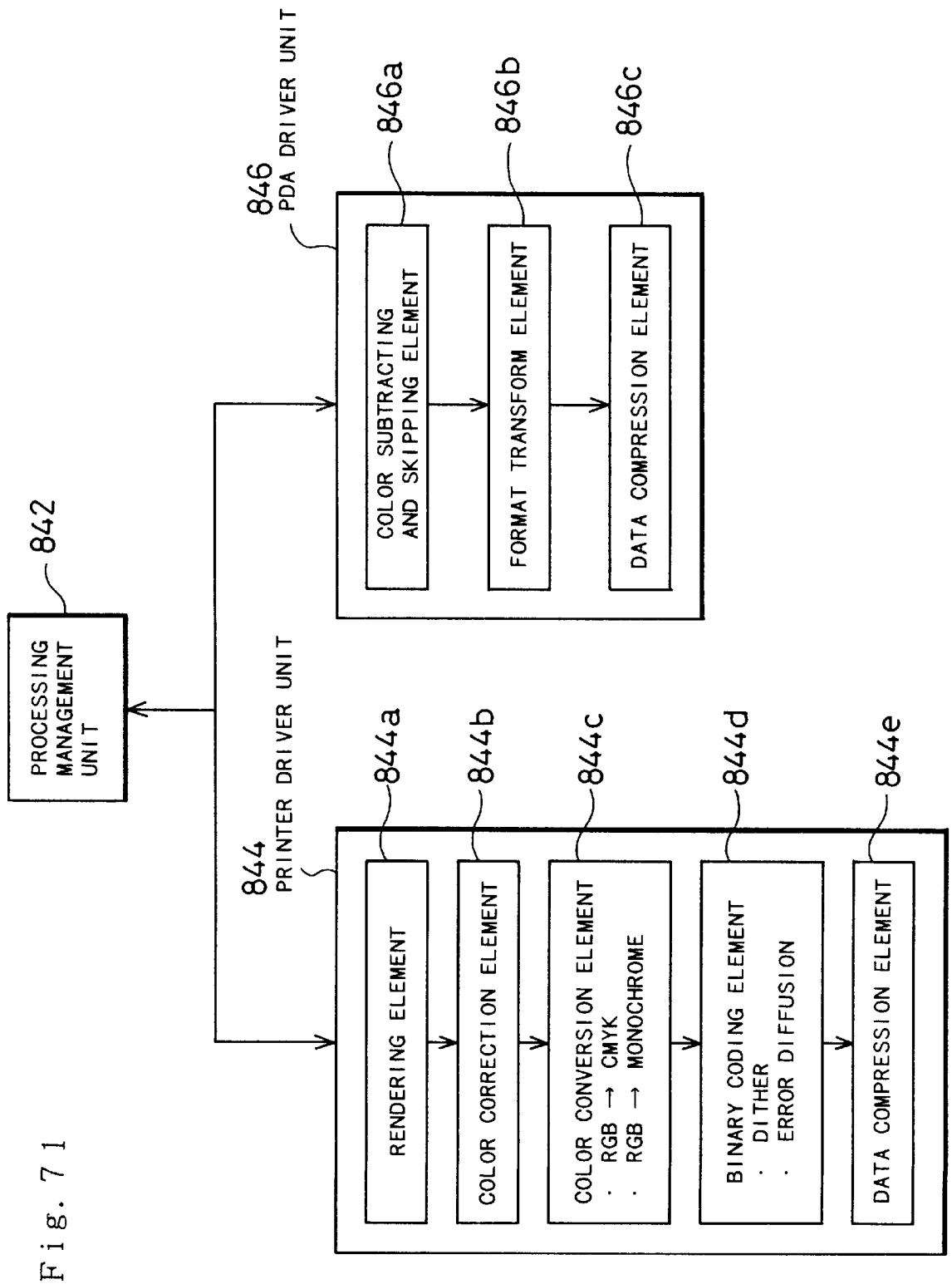
Figure 72:
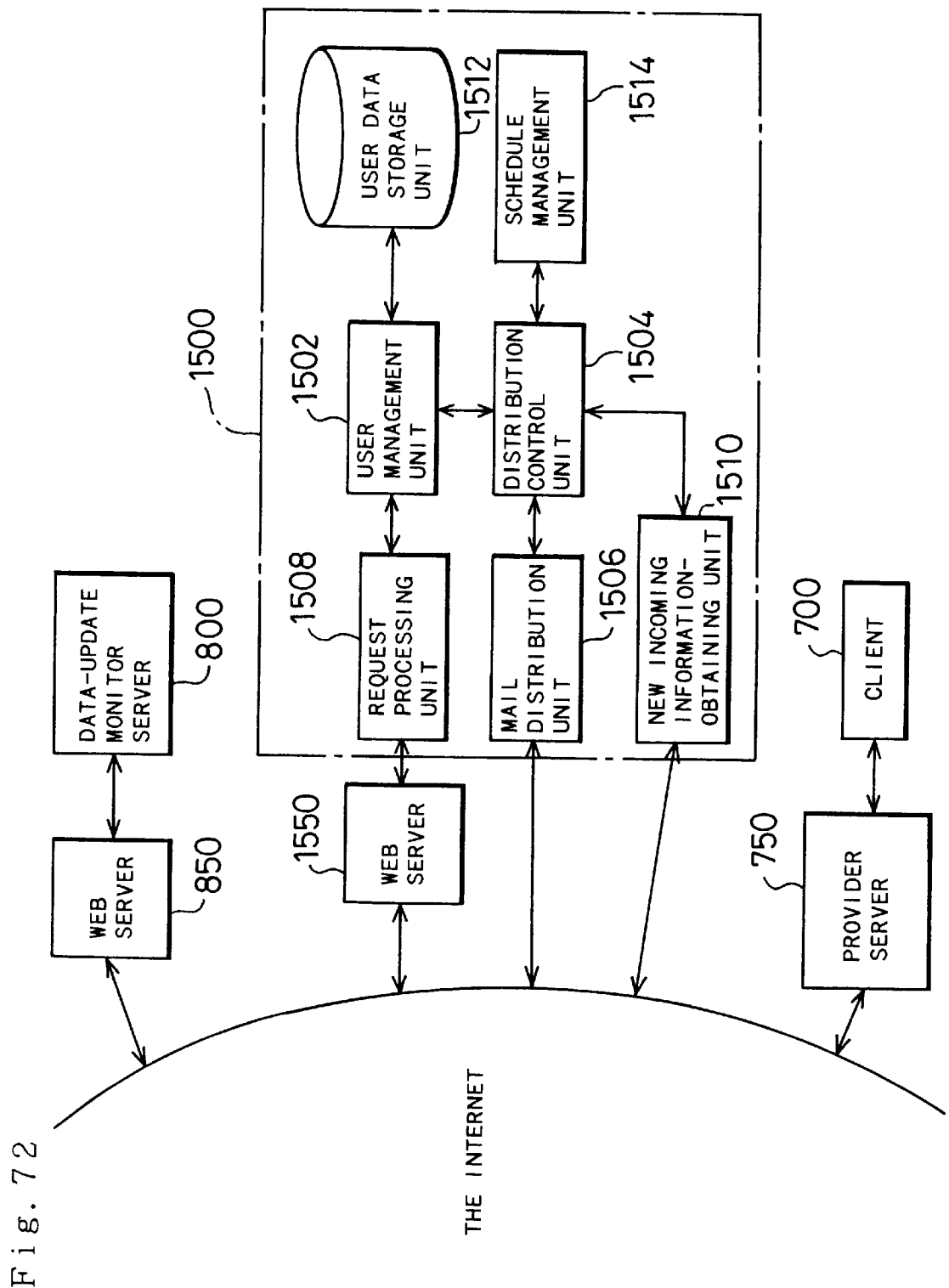

FIG. 69 shows an exemplified connection of the data-update monitor server on the Intranet;

FIG. 70 shows an exemplified connection of a PDA and a printer used as clients to the data-update monitor server 800 shown in FIG. 63;

FIG. 71 is a block diagram illustrating structure of the data processing engine 840 shown in FIG. 63; and FIG. 72 is a block diagram illustrating structure of a mail distribution system utilizing the data-update monitor server as a fifth embodiment according to the present invention.

DESCRIPTION OF THE PREFERRED EMBODIMENTS

1) Communications terminal for Personal Computer Communications service

Figure 1:
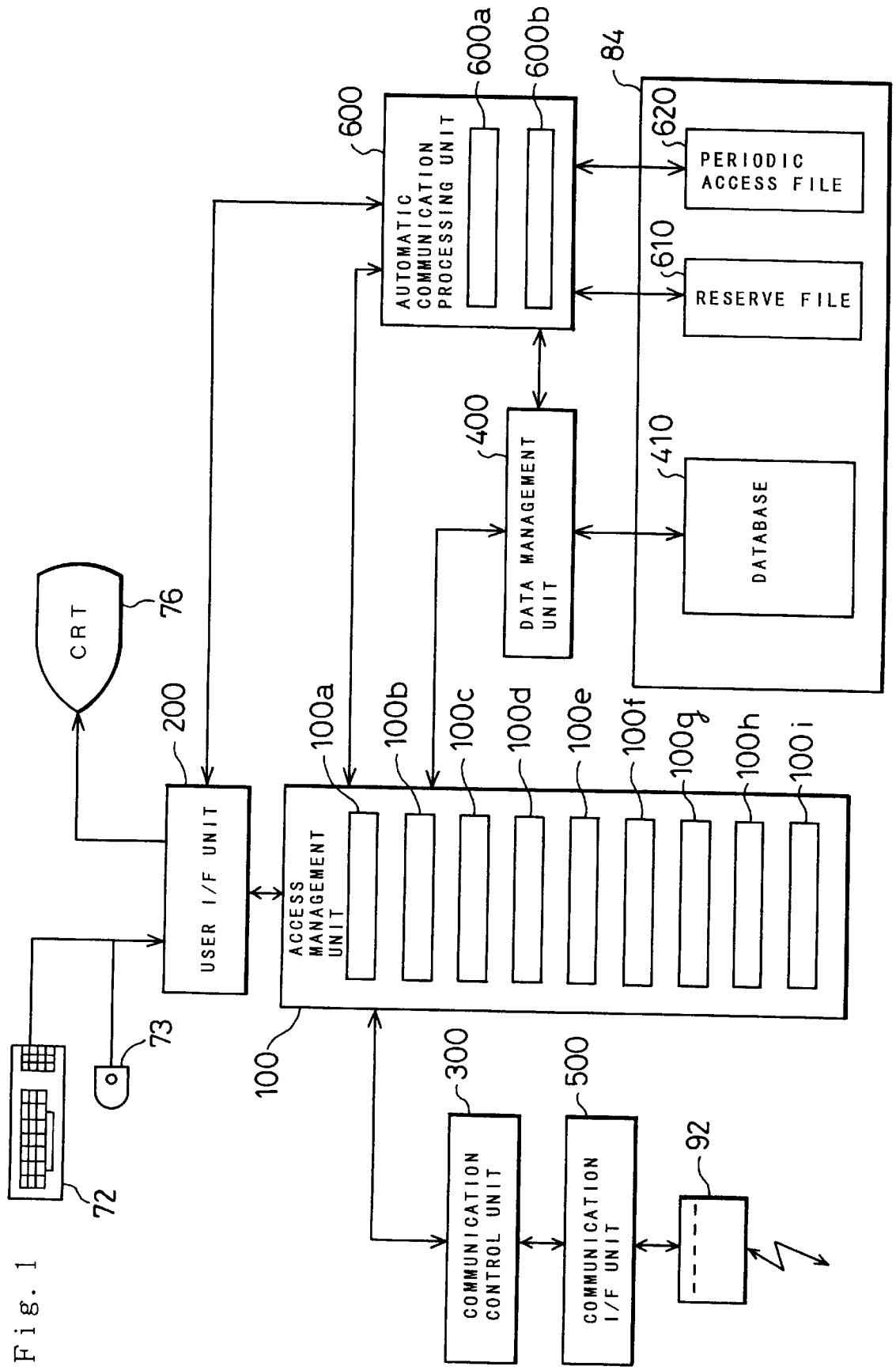
FIG. 1 is a block diagram illustrating structure of a communications terminal as a first embodiment according to the present invention.

Some modes of carrying out the present invention are described as preferred embodiments. FIG. 1 is a block diagram illustrating structure of a communications terminal as a first embodiment according to the present invention. The first embodiment is a communications terminal used for participating in a personal computer communications service and is realized by a computer as described below.

The user who wants to participate in the personal computer communications service gains an access to a communications host, such as a host computer or a server placed in a personal computer communications center, via a communication line from a communications terminal realized by any one of a personal computer, a word processor, a game computer and so on and utilizes the storage and processing functions of the communications host, so as to send and receive messages and data to and from the communications host. The personal computer communications services supplied through the personal computer communication include electronic mail (e-mail), online discussion, bulletin board service (BBS), communication service like chat, and information service like news, weather forecasts, and library.

1-1) Structure of Computer Realizing Communications terminal

Figure 2:
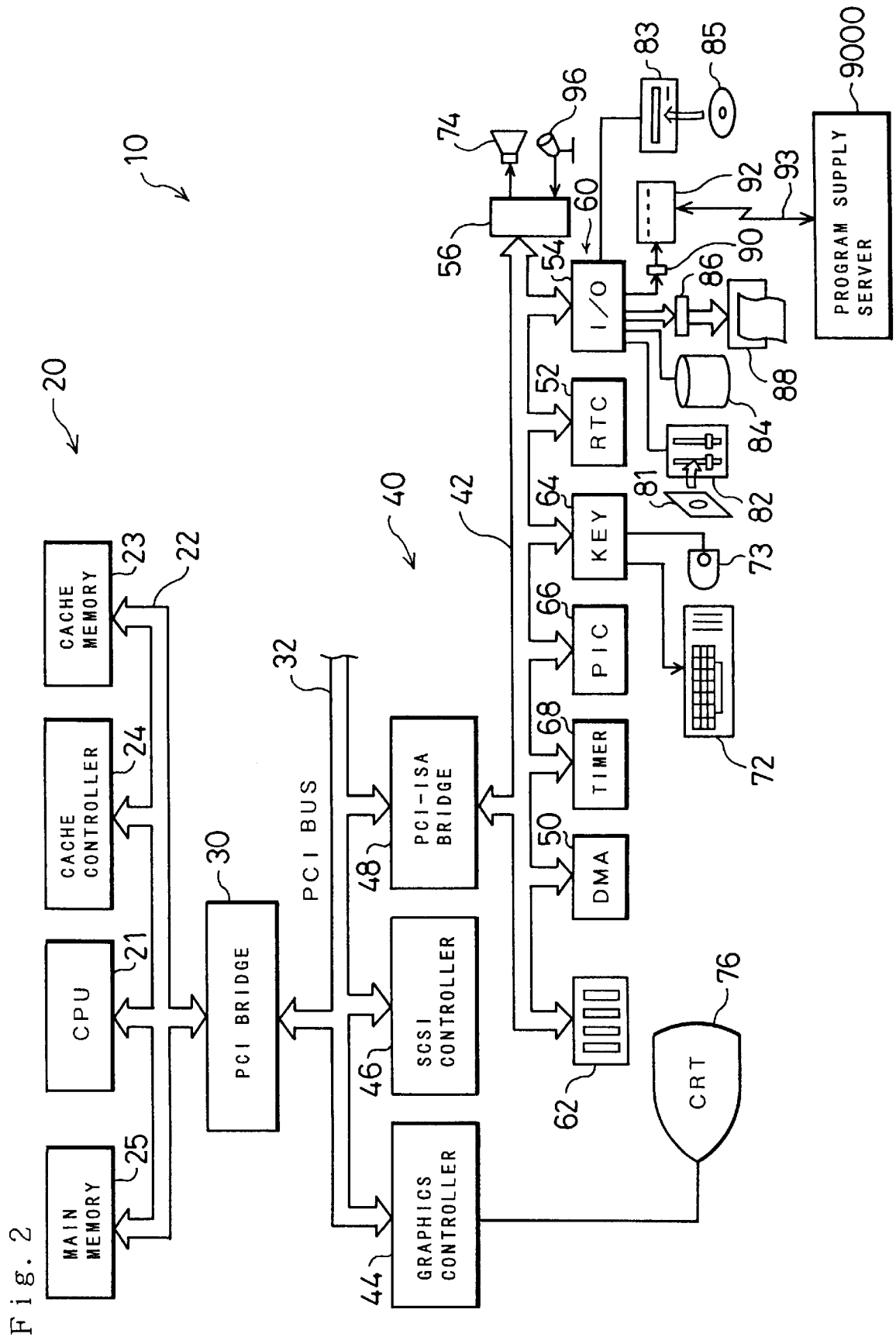
FIG. 2 is a block diagram schematically illustrating structure of a computer that realizes the communications terminal of FIG. 1.

FIG. 2 is a block diagram schematically illustrating structure of a computer that realizes the communications terminal of FIG. 1.

As a matter of convenience, the following describes a general structure of a computer 10 that realizes the communications terminal of this embodiment.

Referring to FIG. 2, the computer 10 includes a processing unit 20 connected to a local bus 22, a PCI bridge 30 for connecting the local bus 22 to a PCI bus 32 that is one of external buses, a controller unit 40 which a CPU (central processing unit) 21 of the processing unit 20 accesses via the PCI bus 32, an I/O (input/output) unit 60 having an ISA (industry standard architecture) bus 42, which is a low-speed external bus, and peripheral devices, such as a keyboard 72, a speaker 74, and a monitor (color CRT) 76.

The processing unit 20 includes the central processing unit or CPU 21 (Pentium ™ manufactured by Intel Corporation is used in this embodiment), a cache memory 23, a cache controller 24, and a main memory 25. The PCI bridge 30 is a controller having a function of controlling the high-speed PCI bus 32. The memory space handled by the CPU 21 is expanded to logical addresses, which are wider than the actual physical addresses, by respective registers included in the CPU 21.

The controller unit 40 includes a graphics controller (hereinafter referred to as CRTC) 44 that manages display of images on the monitor 76, an SCSI (small computer systems interface) controller 46 that manages data transfer from and to connected SCSI devices, and a PCI-ISA bridge 48 that functions as an interface between the PCI bus 32 and the lower ISA bus 42. The CRTC 44 enables a 16-color display of 640×480 dots on the monitor (color CRT) 76. Although a character generator for storing display fonts, a graphic controller for receiving specific commands and drawing predetermined figures, and a video memory for storing drawn images are mounted on the CRTC 44, these constituents are well known and thus omitted from the illustration of FIG. 2.

The I/O unit 60 has the ISA bus 42 connected to the PCI bus 32 via the PCI-ISA bridge 48. The ISA bus 42 is an input/output control bus, to which a variety of I/O devices are connected. The I/O unit 60 includes a DMA (direct memory access) controller 50, a real-time clock (RTC) 52, a composite I/O port 54, a sound I/O 56, a keyboard interface 64 functioning as an interface to the keyboard 72 and a two-button mouse 73, an interrupt controller 66 for carrying out an interrupt control having a preference, and a timer 68 for counting a time and generating a beep. The ISA bus 42 also connects with an ISA slot 62, on which an expansion board can be mounted.

The composite I/O port 54 has a port for parallel input/output, a port for serial input/output, and a port for inputting and outputting signals used for controlling a floppy disk drive 82, a CD-ROM (compact disc, read-only memory) drive 83, and a hard disk 84. The parallel input/output is connected to a printer 88 via a parallel port 86, whereas the serial input/output is connected to a modem 92 via a serial port 90. The speaker 74 as well as a microphone 96 is connectable with the sound I/O 56.

The hard disk 84 included in the computer 10 stores a DOS (disk operating system) and a variety of device drivers that can be incorporated in the DOS. On a start, the computer 10 reads the DOS and incorporates required device drivers into the DOS according to the contents of files referred to by the DOS. A typical device driver is a printer driver that enables printing by the printer 88 via the composite I/O port 54.

The hard disk 84 stores WINDOWS™, which is a GUI (graphical user interface)-based operating system from Microsoft Corporation. The computer 10 reads the operating system before reading and executing applications programs, which work on the operating system, onto the main memory 25.

1-2) Structure of Communications Terminal of First Embodiment

The following describes the communications terminal of the first embodiment based on the block diagram of FIG. 1. The communications terminal is realized by both software and hardware that are integrated with each other in the computer 10. The block diagram of FIG. 1 includes functions realized by the software as well as the hardware.

The communications terminal includes an access management unit 100, a user I/F (interface) unit 200, a communication control unit 300, a data management unit 400, a communication I/F unit 500, and an automatic communication processing unit 600.

The user I/F unit 200 sends a variety of instructions given by the user through operation of the keyboard 72 and the mouse 73 to the access management unit 100 and displays a variety of data transmitted from the access management unit 100 on the screen of the monitor 76. When the user gives an instruction of, for example, communication reservation or periodic access (discussed later), the user I/F unit 200 sends the contents of the instructed communication reservation or periodic access to the automatic communication processing unit 600.

The access management unit 100 sends a variety of requirements to the communication control unit 300 and the data management unit 400 in response to the instructions transmitted via the user I/F unit 200, transfers data, which are sent from a communications host (not shown) via the communication control unit 300, to the data management unit 400, and outputs data, which are read from a database 410 in the hard disk 84 via the data management unit 400, to the user I/F unit 200.

The access management unit 100 includes a writing element 100a, a reading element 100b, a difference data-specifying element 100c, a new incoming mark adding element 100d, a new incoming mark retrieving element 100e, a transfer requiring element 100f, a particular communication service start requiring element 100g, a particular communication service stop requiring element 100h, and a text data transfer requiring element 100i.

The data management unit 400 writes data sent from the writing element 100a into the database 410 in response to a requirement from the writing element 100a of the access management unit 100, while reading data from the database 410 and sending the read-out data to the reading element 100b in response to a requirement from the reading element 100a of the access management unit 100. In case that the data required by the access management unit 100 do not exist in the database 410, the data management unit 400 outputs an error signal to the access management unit 100. The data management unit 400 sorts out, retrieves, and deletes the data stored in the database 410 according to the requirements. The database 410 included in the hard disk 84 is a local database managed by the data management unit 400. A variety of data sent from the communications host are sorted out under a hierarchical structure into respective services supplied by the communications host and stored in the database 410 as discussed later.

When receiving a requirement from one of the requiring elements 100f to 100i of the access management unit 100, for example, 'transfer the title number 1 on X menu in Y service', the communication control unit 300 translates the requirement to a menu number or command in the corresponding service of the communications host and sends the translated menu number or command to the communication I/F unit 500. When receiving data transmitted from the communications host via the communication I/F unit 500, on the other hand, the communication control unit 300 extracts a required portion from the input data, converts the portion into a form required by the access management unit 100, and transfers the converted data to the access management unit 100. The communication I/F unit 500 sends and receives data to and from the communications host connected thereto through a communication line via the modem 92.

The automatic communication processing unit 600 writes and stores the contents of communication reservation or periodic access sent from the user I/F unit 200 into a reserve file 610 or a periodic access file 620 included in the hard disk 84. When receiving an instruction of starting automatic communication from the user or an instruction of activating automatic communication by the timer, the automatic communication processing unit 600 automatically transmits information and data to and from the communications host based on the contents stored in the reserve file 610 or the periodic access file 620.

The automatic communication processing unit 600 includes a sorting element 600a and a transfer element 600b.

The respective blocks shown in FIG. 1 include portions realized by hardware and those realized by software as mentioned above. By way of example, the user I/F unit 200 has the keyboard interface 64 and the CRTC 44 (shown in FIG. 2) as hardware structures, but these hardware structures do not work without software for controlling input and display. Namely the user I/F unit 200 and the other constituents in the block diagram of FIG. 1 essentially include both the hardware and software.

The software has been stored in the form of applications programs in the hard disk 84. When the user instructs an activation of the communications terminal through operation of the keyboard 72 and the mouse 73, the operating system is activated to read required applications programs from the hard disk 84 to the main memory 25. This realizes the communications terminal shown in FIG. 1, wherein the hardware and the software are integrated with each other.

In case that the applications programs are recorded in a CD-ROM 85 shown in FIG. 2, the applications programs are read from the CD-ROM 85 inserted into the CD-ROM drive 83 and transferred to the main memory 25. In case that the applications programs are recorded in a floppy disk 81 shown in FIG. 2, the applications programs are read from the floppy disk 81 inserted into the floppy disk drive 82 and transferred to the main memory 25. The applications programs may also be read from another portable recording medium or carriable recording medium, such as a magnetic optical disc, and transferred to the main memory 25.

In case that the applications programs are stored in a program supply server 9000 shown in FIG. 2, the user gains an access to the program supply server 9000 via a communication line 93 with the modem 92. The applications programs are then transmitted from the program supply server 9000 and transferred to the main memory 25. Available examples of the communication line 93 include wired lines, such as telephone lines and network lines, as well as wireless lines using communications satellites.

1-3) Operations of Communications Terminal of First Embodiment

The communications terminal thus constructed works in the following manner. As an example, the following description refers to a case in which the user participates in one of the major personal computer communications services, NIFTY-Serve (managed by Nifty Corporation, Japan).

The communications terminal of this embodiment can implement two different forms of communications, that is, manual communication and automatic communication. In manual communication, the user directly gives an instruction through operation of the keyboard 72 and the mouse 73 to send a requirement to the communications host. In automatic communication, on the other hand, requirements are automatically sent to the communications host according to the contents of the reserve file 610 or the periodic access file 620 prepared in advance. Each requirement is sent to the communications host as a menu number or command in a specified service.

1-4) Access to Service through Manual Communication

For example, in case of manual communication, when the user gives an instruction of starting manual communication through operation of the keyboard 72 and the mouse 73, the access management unit 100 telephones the communications host via the communication control unit 300 and the other related elements and makes communication with the communications host. When the communications terminal is connected to the communications host via the communication line 93, the access management unit 100 carries out a series of log-in operations including transmission of a user's identification number and a password. When the communications host accepts a log-in, the communications terminal can participate in communications services supplied by the communications host. Even in case of manual communication, the communications terminal automatically carries out a series of operations required for communication before a start of communications services.

On a start of communications services, the communications host transmits a menu of available communications services. The access management unit 100 creates a graphical user interface with list boxes and buttons, that is, a GUI menu operable with the mouse 73, based on the transmitted menu, and displays the GUI menu on the monitor 76. When the user selects, for example, a certain button on the GUI menu, the access management unit 100 displays a GUI menu of lower hierarchy on the monitor 76.

Figure 3:
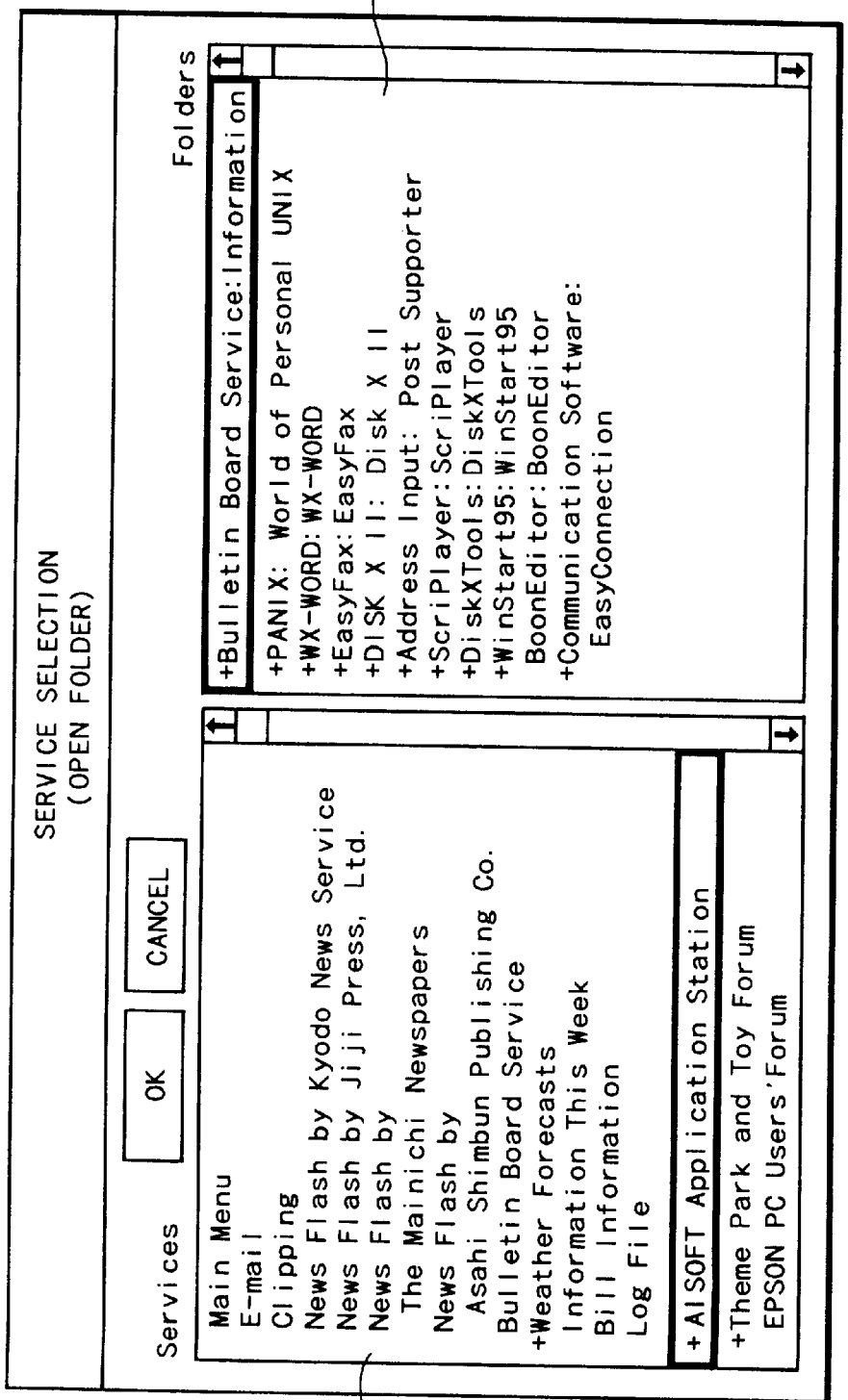
FIG. 3 shows a service selection window displayed on the monitor 76 as an example.

In case that the user instructs display of a service selection window, the access management unit 100 creates a service selection window as shown in FIG. 3 and displays the service selection window on the monitor 76. Such a service selection window is shown on the monitor 76 whenever the user gives a corresponding instruction. This enables the user to create a shortcut to a desired service. Namely the user can jump to a desired service directly without going through the hierarchical menu.

The access management unit 100 refers to service list files stored in the hard disk 410 and directories prepared corresponding to the respective services and displays a list of available services SL by the communications host on the left side of the service selection window as shown in FIG. 3. The term 'service' here implies a service in a narrow sense. The user can directly jump to a desired service, for example, by a 'GO' command.

In case that the user cancels the instruction of displaying the service selection window, the access management unit 100 returns to the initial mode, in which the GUI menu based on the menu transmitted from the communications host is displayed on the monitor 76.

When the user selects a desired service out of the list of available services SL through operation of the keyboard 72 and the mouse 73 while the service selection window is displayed on the monitor 76, the access management unit 100 transmits a 'GO' command to the communications host via the communication control unit 300 and the other related elements, in order to jump to the selected service and receive the selected service from the communications host. By way of example, when the user selects a service, 'AISOFT Application Station' forum, the access management unit 100 transmits a command 'GO SAISAP'. The communications host receives the transmitted command and shifts to the selected service, 'AISOFT Application Station' forum in this example. The user can receive a desired service from the communications host in this manner.

In the description below, the state in which the communications host has shifted to the selected service and the user can receive the selected service anytime, may be expressed as 'the user (or the communications terminal) goes into the selected service'.

In parallel with a requirement for the selected service to the communications host, the access management unit 100 carries out the following operations. The data management unit 400 reads folder list index files corresponding to the selected service from the database 410, and the access management unit 100 creates a list of folders FL included in the selected service based on the folder list index files and displays the list of folders FL on the right side of the service selection window. For example, when the service 'AISOFT Application Station' forum is selected, the list of folders FL included in the 'AISOFT Application Station' forum is shown on the right side of the service selection window as shown in FIG. 3.

In response to an user's instruction for a selected service, the access management unit 100 requires the selected service to the communications host, reads folder list index files corresponding to the selected service from the database 410, creates the list of folders FL included in the selected service based on the folder list index files, and displays the list of folders FL on the monitor 76.

The term 'folder' here implies each service form available in the selected service. By way of example, the service 'AISOFT Application Station' forum includes in-forum bulletin board service, in-forum information service, library service, and online discussion service. A plurality of libraries exist in the library service, and a plurality of discussion groups exist in the online discussion service. The folders here represent the in-forum bulletin board service, the in-forum information service, the respective libraries in the library service, and the respective discussion groups in the online discussion service.

Figure 4:
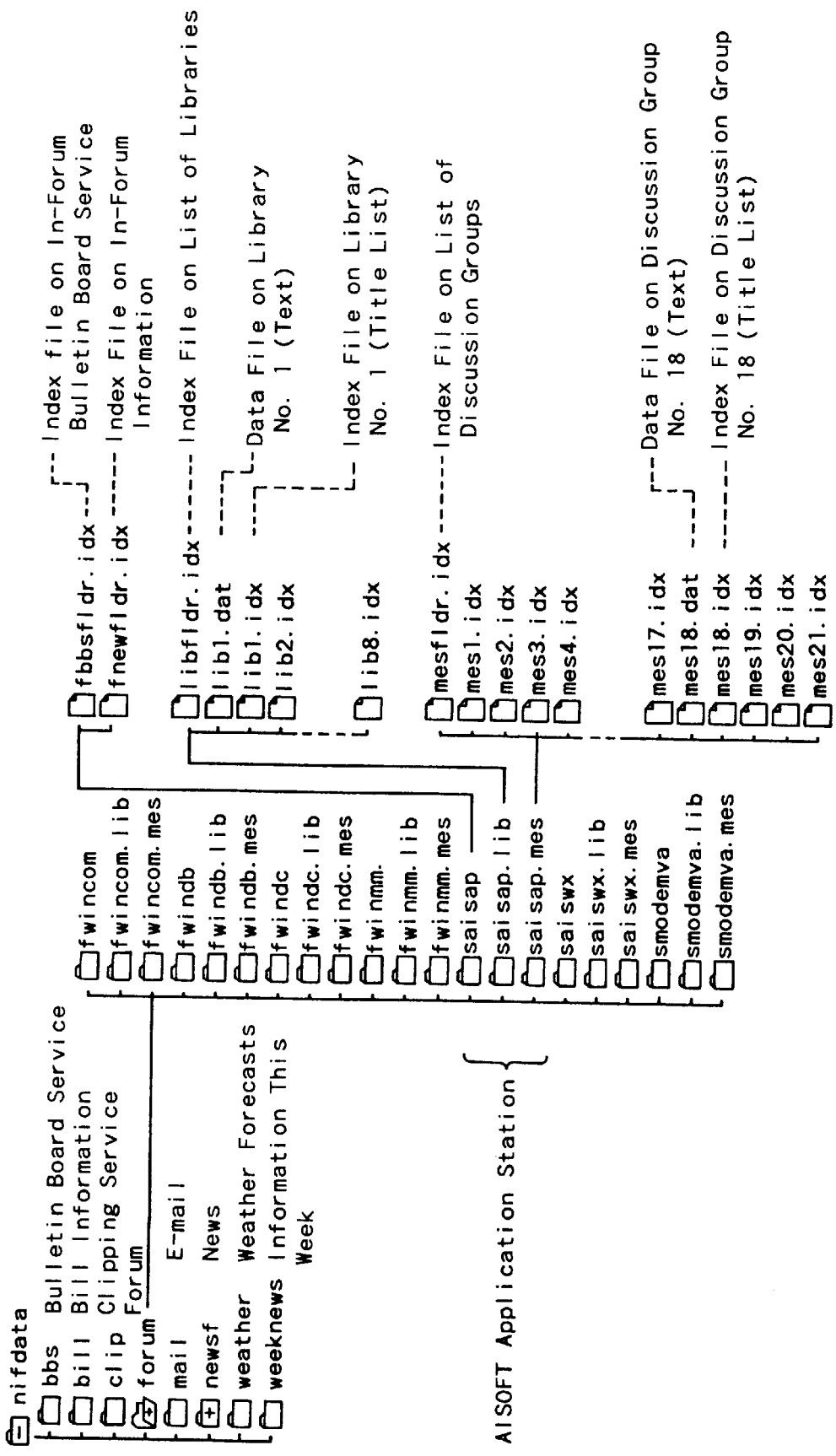
FIG. 4 illustrates a typical structure in the database 410 shown in FIG. 1.

The following describes internal structure of the database 410, in which a variety of data are registered. FIG. 4 illustrates a typical structure in the database 410 shown in FIG. 1. The database 410 has a hierarchical structure, in which each data file is divided into several directories in a directory tree.

The top level of the directory tree, the root directory, is called 'nifdata' representing a collection of communications data regarding NIFTY-Serve. The second level of the directory tree includes directories of Bulletin Board Service, Bill Information, Clipping Service, Forum, E-mail, News, Weather Forecasts, and Information This Week, which correspond to a variety of services available in NIFTY-Serve. The data management unit 400 automatically creates the directories on the second level when the user accesses the communications host for the first time.

When the user opens 'forum', which represents a directory of Forum (SIG; Special Interest Group), directories of various forums appear as the level immediately below the second-level directory. Each forum has three directories, '*', '*.lib', and '*.mes'. In case of the 'AISOFT Application Station' forum, for example, there are three directories, 'saisap', 'saisap.lib', and 'saisap.mes'. On the first access to the communications host, the communications terminal receives information on a list of forums, which the user has already joined in, from the communications host, and creates directories of each forum based on the information on the list of forums.

As mentioned above, the three directories 'saisap', 'saisap.lib', and 'saisap.mes' are set for the 'AISOFT Application Station' forum. An index file on in-forum bulletin board service 'fbbsfldr.idx' and an index file on in-forum information service 'fnewfldr.idx' are registered in the 'saisap' directory. The 'saisap.lib' directory is a special directory for in-forum library and includes an index file on a list of libraries (a folder list index file) 'libfldr.idx'. The 'saisap.mes' directory is a special directory for in-forum online discussion and includes an index file on a list of discussion groups (a folder list index file) 'mesfldr.idx'.

As shown on the right side of the service selection window of FIG. 3, the list of folders FL included in the selected service (the selected forum in this case) is prepared based on these folder list index files '*fldr.idx' and displayed on the monitor 76.

When going into a forum for the first time, the communications terminal receives information on a list of folders existing in the forum from the communications host and creates the folder list index files related to the forum based on the information on the list of folders.

FIG. 5 shows the contents of the index file on the list of discussion groups (folder list index file) as an example. Namely FIG. 5 shows the contents of the index file on the list of discussion groups 'mesfldr.idx' shown in FIG. 4.

Referring to FIG. 5, the index file on the list of discussion groups (folder list index file) includes the name of discussion groups, the number of titles registered in the discussion group, the date of the previous access to the discussion group by the user, the name of folders, and the new incoming mark. The other folder list index files, such as the index file on in-forum bulletin board service, the index file on in-forum information service, and the index file on the list of libraries, have substantially similar structures.

Both an index file 'lib*.idx' and a data file 'lib*.dat' corresponding to each library are registered in the directory 'saisap.lib' exclusively used for in-forum library, whereas both an index file 'mes*.idx' and a data file 'mes*.dat' corresponding to each discussion group are registered in the directory 'saisap.mes' exclusively used for in-forum online discussion.

Data on titles registered in each library or discussion group (that is, each folder) are primarily written in each index file 'lib*.idx' or 'mes*.idx'. On the first access to a forum, these index files 'lib*.idx' and 'mes*.idx' are created based on the information on a list of folders existing in the forum, which is transmitted from the communications host. Even when the user goes into the forum, the size of each index file is kept zero until the user actually goes into the corresponding discussion group or library.

Text data registered in each library or discussion group (that is, each folder) are primarily written in each data file 'lib*.dat' or 'mes*.dat'. These data files 'lib*.dat' and 'mes*.dat' are created when the user actually goes into the corresponding discussion groups and libraries in the forum.

When the user specifies a desired folder, through operation of the keyboard 72 and the mouse 73, among the list of folders FL displayed on the right side of the service selection window as shown in FIG. 3, the access management unit 100 transmits a menu number corresponding to the specified folder to the communications host via the communication control unit 300 and the other elements. This operation enables the user to receive a service regarding the specified folder from the communications host. The communications host then shifts to the specified holder.

When going to the folder specified by the user, the access management unit 100 carries out a title updating operation (discussed later in detail). The access management unit 100 obtains unread title data existing in the folder specified by the user from the communications host and updates title data in an index file on the corresponding folder in the database 410. The access management unit 100 then displays titles in the folder as a folder window on the monitor 76, based on the title data read from the index file.

Figure 6:
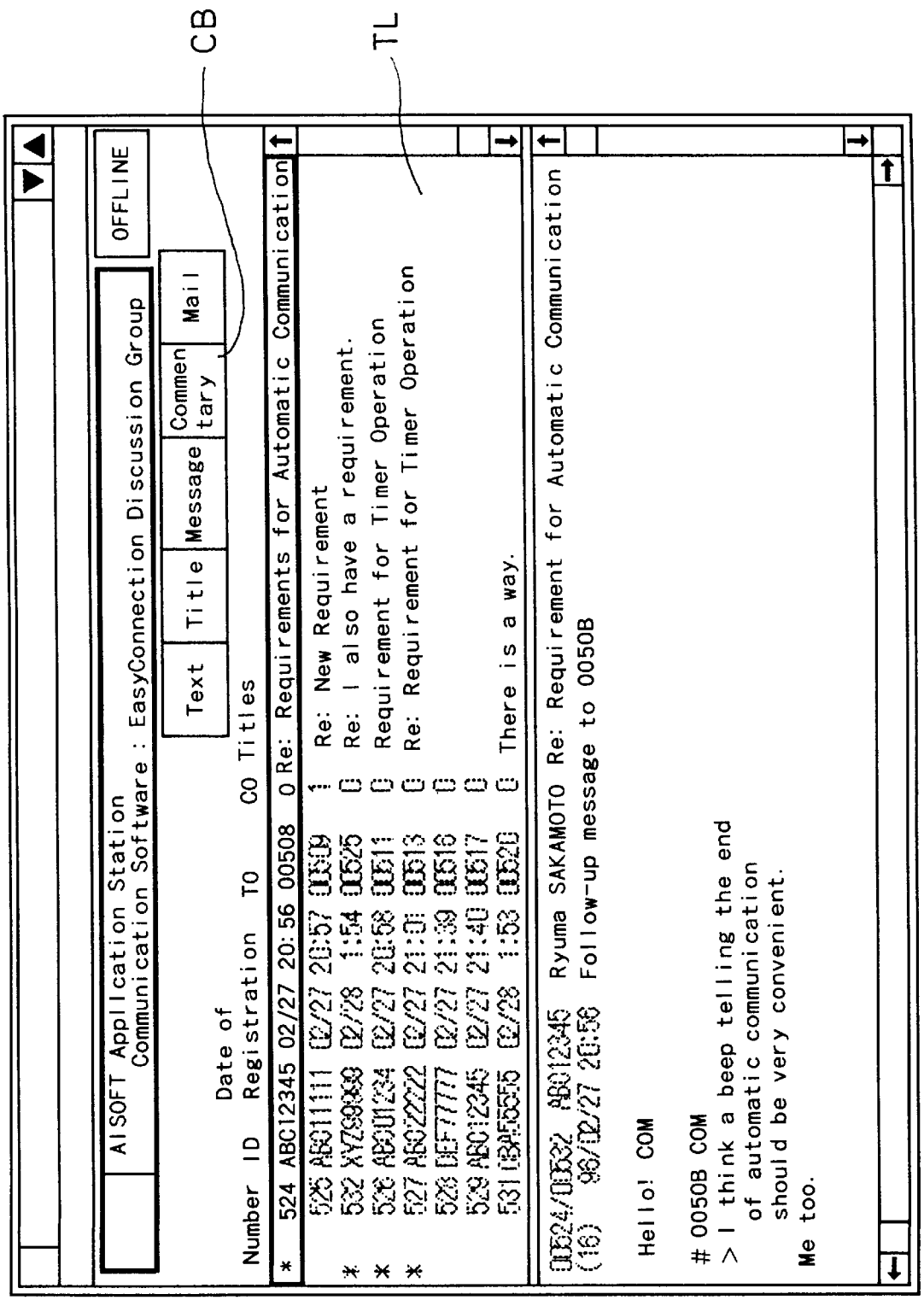
FIG. 6 shows a folder window displayed on the monitor 76 as an example.

FIG. 6 shows a folder window displayed on the monitor 76 as an example. In the example of FIG. 6, the discussion group No. 18 'EasyConnection' in the 'AISOFT Application Station' forum has been specified as the desired folder. The titles existing in the specified folder are shown as a list of titles TL in the upper portion of the folder window. The list of titles TL are created and displayed, based on an index file 'mes*.idx' ('mes18.idx' in this case) on the corresponding discussion group (the discussion group No. 18 in this case). The index file has already been updated by the title updating operation carried out immediately after the communications terminal went into the discussion group (that is, immediately after the communications host shifted to the discussion group).

FIG. 7 shows the contents of an index file on a discussion group as an example. The example of FIG. 7 refers to the contents of the index file 'mes18.idx' on the discussion group No. 18 in the 'AISOFT Application Station' forum discussed above.

Referring to FIG. 7, the index file 'mes*.idx' on the discussion group includes the date on which the title was registered into the communications host, the name of titles, the location of text corresponding to the title in the data file (given as the offset), and the new incoming mark. The respective index files other than the index files 'lib*.idx' on the libraries have substantially similar structures. The list of titles TL shown in the upper portion of the folder window of FIG. 6 is created and displayed, based on the index file 'mes18.idx' shown in FIG. 7.

Referring to FIG. 6, the asterisk * is added to some titles included in the list of titles TL. This means that text data regarding the *-marked title are stored in the data file in the database 410 and are available for display. Text data regarding the title without * mark are, on the contrary, not stored in the data file. Such indication allows the user to readily distinguish the titles having available text.

When the user specifies a *-marked title among the displayed list of titles TL through operation of the keyboard 72 and the mouse 73, the access management unit 100 requires the data management unit 400 to read text data corresponding to the specified title. The data management unit 400 then retrieves the data file 'mes*.dat' of the selected discussion group in the database 410, reads text data corresponding to the specified title, and transfers the text data to the access management unit 100. The access management unit 100 transfers the input text data to the user I/F unit 200. The user I/F unit 200 displays text on the monitor 76 based on the transferred text data. In this manner, the text specified by the user is eventually displayed in the lower portion of the folder window as shown in FIG. 6. In the example of FIG. 6, the user has specified the title 'Re: Requirement for Automatic Communication'.

When the user has selected the discussion group No. 18 in the 'AISOFT Application Station' forum, the data file of the selected discussion group is 'mes18.dat' as shown in FIG. 4. The text data corresponding to the title 'Re: Requirement for Automatic Communication' exist at the location '1024' as shown in FIG. 7. The text displayed in the lower portion of FIG. 6 is accordingly based on the text data existing at the location '1024' in the data file 'mes18.dat'.

When the user specifies a title without * mark among the list of titles TL, on the other hand, no text data corresponding to the specified title are stored in the data file 'mes*.dat' of the selected discussion group. The data management unit 400 accordingly outputs an error signal to the access management unit 100. The transfer requiring element 100f of the access management unit 100 requires the communication control unit 300 to obtain text data corresponding to the specified title. The communication control unit 300 makes communication with the communications host via the communication I/F unit 500, and requires the communications host to send the corresponding text data. The communication control unit 300 receives the text data transmitted from the communications host via the communication I/F unit 500 and outputs the text data to the access management unit 100. The access management unit 100 transfers the obtained text data to the data management unit 400 and requires the data management unit 400 to write the text data into the database 410. The data management unit 400 then writes the transferred text data into the data file 'mes*.dat' of the selected discussion group in the database 410. The access management unit 100 again requires the data management unit 400 to read text data corresponding to the specified title. This time, text data corresponding to the specified title exist in the data file 'mes*.dat' of the selected discussion group. The data management unit 400 then reads the corresponding text data and transfers the text data to the access management unit 100. The text corresponding to the specified title is eventually displayed on the monitor 76.

In case that the corresponding text data do not exist in the data file 'mes*.dat', an alternative structure enables the user to arbitrarily determine whether or not transmission of the text data is required to the communications host.

As discussed above, on an access to the communications host, directories related to each service or folder in the communications host are automatically created in the database 410. On an access to each service or folder in the communications host, index files for storing title data and data file for storing text data are automatically created. Every time when the communications terminal makes connection with the communications host, input data including title data and text data are automatically classified and sorted out by the services and folders and written into the corresponding directories and files. The user is thus not required to build the directory tree in the database 410 or to store input data into the corresponding directory. Since the input data are automatically sorted out prior to storage, the user can readily utilize the input data.

1-4-1) Title Updating Operation

The following describes the title updating operation, which is one of the primary characteristics of the first embodiment. The concrete procedure of title updating operation varies with the type of service.

Figure 8:
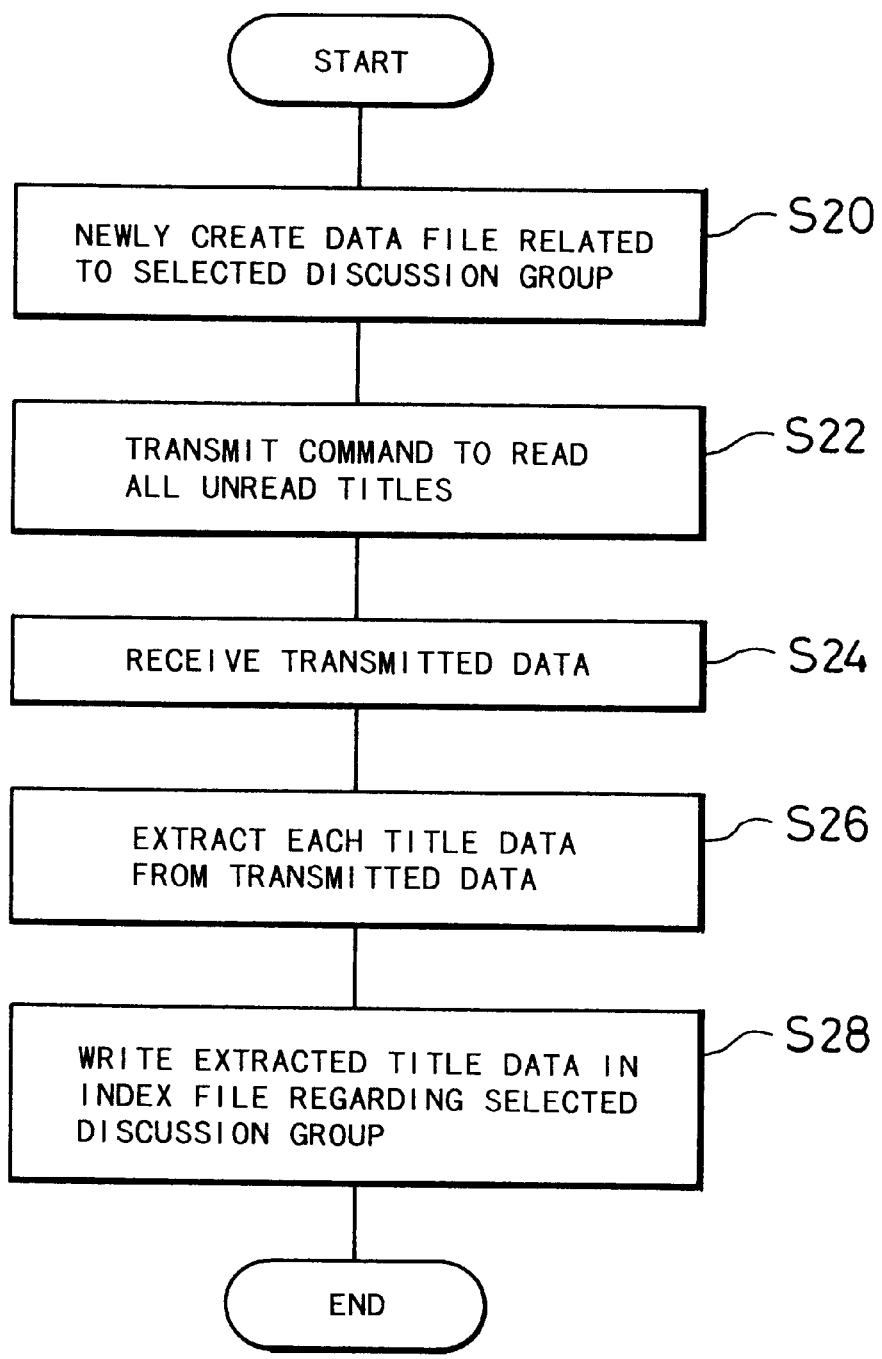
FIG. 8 is a flowchart showing a title updating routine executed when the communications terminal accesses a selected discussion group for the first time.
Figure 9:
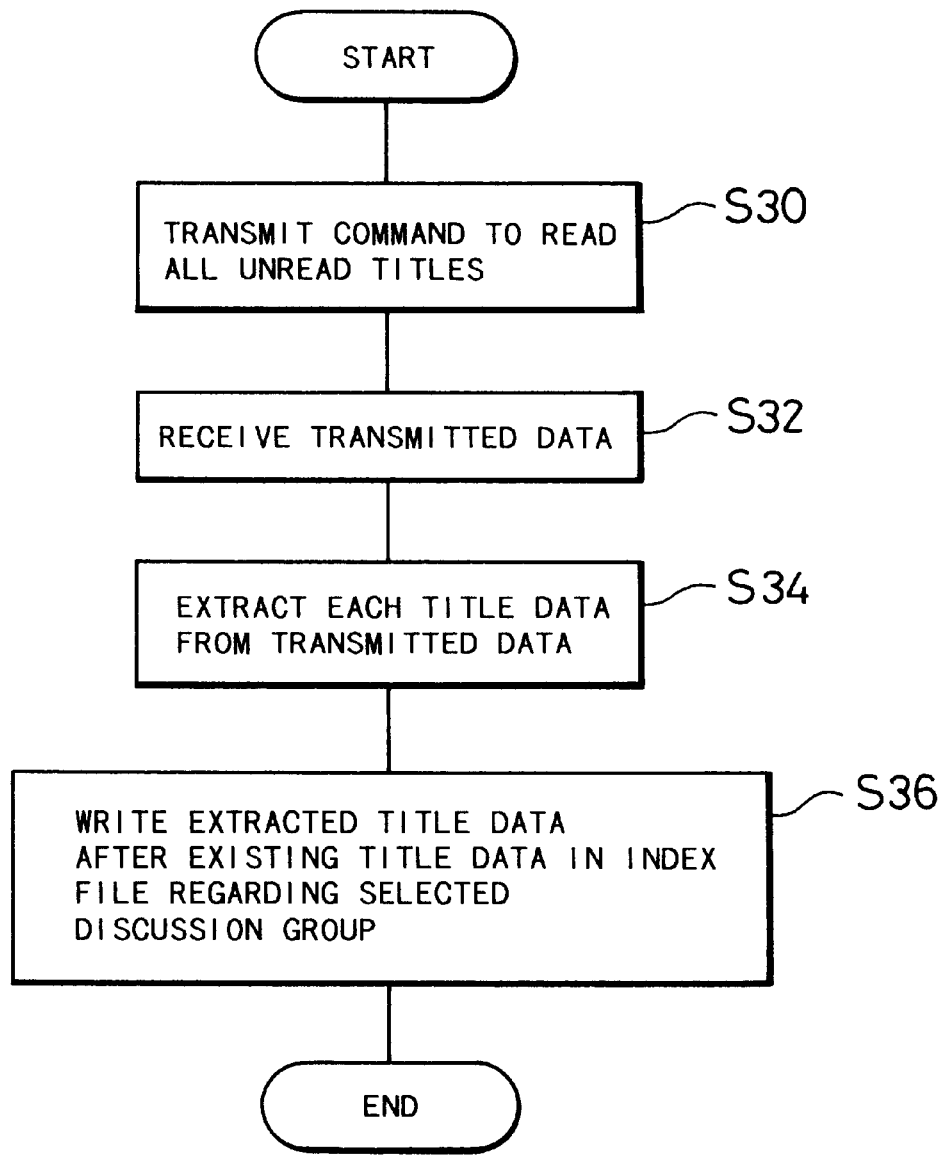
FIG. 9 is a flowchart showing a title updating routine executed when the communications terminal accesses the selected discussion group for the second or subsequent time.

FIG. 8 is a flowchart showing a title updating routine executed when the communications terminal accesses a selected discussion group for the first time. FIG. 9 is a flowchart showing a title updating routine executed when the communications terminal accesses the selected discussion group for the second or subsequent time.

As mentioned above, when the communications terminal goes into a selected discussion group for the first time, no data file related to the discussion group has yet been created although the index file exists already. Referring to FIG. 8, immediately after a first access to the selected discussion group, a data file related to the discussion group is newly created at step S20. In accordance with a concrete procedure, the access management unit 100 requires the data management unit 400 to create the data file 'mes*.dat' of the discussion group in the database 410.

A command is then transmitted to read all unread titles at step S22. In accordance with a concrete procedure, the access management unit 100 transmits a command to the communications host via the communication control unit 300, in order to read only the unread titles among all the titles of discussion. The communications host stores and manages unread title numbers for the respective discussion groups. In response to the command, the communications host transmits all the titles corresponding to the unread title numbers to the user. In this manner, the communications host transmits data on the unread titles. The communications terminal receives the transmitted data at step S24, extracts each title data from the transmitted data at step S26, and writes the extracted title data in the index file regarding the selected discussion group at step S28. In accordance with a concrete procedure, the communication control unit 300 receives the transmitted data via the communication I/F unit 500, extracts each title data from the transmitted data, and transfers the extracted title data to the access management unit 100. The access management unit 100 then writes the title data into the index file 'mes*.idx' in the database 410 via the data management unit 400. This terminates the series of title updating operation.

Referring to FIG. 9, when the communications terminal goes into the selected discussion group for the second or subsequent time, a command is transmitted to read all unread titles at step S30. The communications host regards the previously transmitted titles as read titles, and transmits only the unread titles, which have been newly registered after the previous access, to the user in response to the command. The communications terminal receives the transmitted data at step S32, extracts each title data from the transmitted data at step S34, and writes the extracted title data after the existing title data in the index file regarding the selected discussion group at step S36. This terminates the series of title updating operation.

In the title updating operation for the discussion group, the communications host regards all the previously transmitted titles as read titles and does not re-transmit these read titles in response to the command for reading only unread titles. This effectively prevents the same title data from being written a plurality of times into the index file in the database 410. The newly transmitted and extracted title data are written after the existing title data in the index file. This procedure enables the up-to-date title data to be connected seamlessly to the existing title data.

FIGS. 10(*a*) and 10(*b*) show a concrete procedure of the title updating operation for the discussion group. By way of example, it is assumed that the communications terminal goes into a selected discussion group at 9:00 am on March $2^{nd}$ for the first time. In this situation, the communications host stores all the title numbers as unread title numbers. In response to a command for reading all unread titles, all the title data registered in the selected discussion group are transmitted from the communications host and written into the index file regarding the selected discussion group as shown in FIG. 10(*a*). The communications host manages the title numbers in such a manner that the last number is allocated to the latest title, and arranges the titles in the order of title number.

The communications terminal again goes into the same discussion group at 10:00 am on the same day. In this situation, the communications host regards the previously transmitted titles as read titles and stores only the title numbers newly registered after the time of the previous access (that is, 9:00 am) as unread title numbers. In response to a command for reading all unread titles, only the title data newly registered after 9:00 am are transmitted from the communications host and written into the index file as shown in FIG. 10(*b*). The title data transmitted this time are written after the title data stored in the previous communication. The title data after No. 554 are thus connected seamlessly to the last title data No. 553 stored in the previous communication in the index file.

Figure 11:
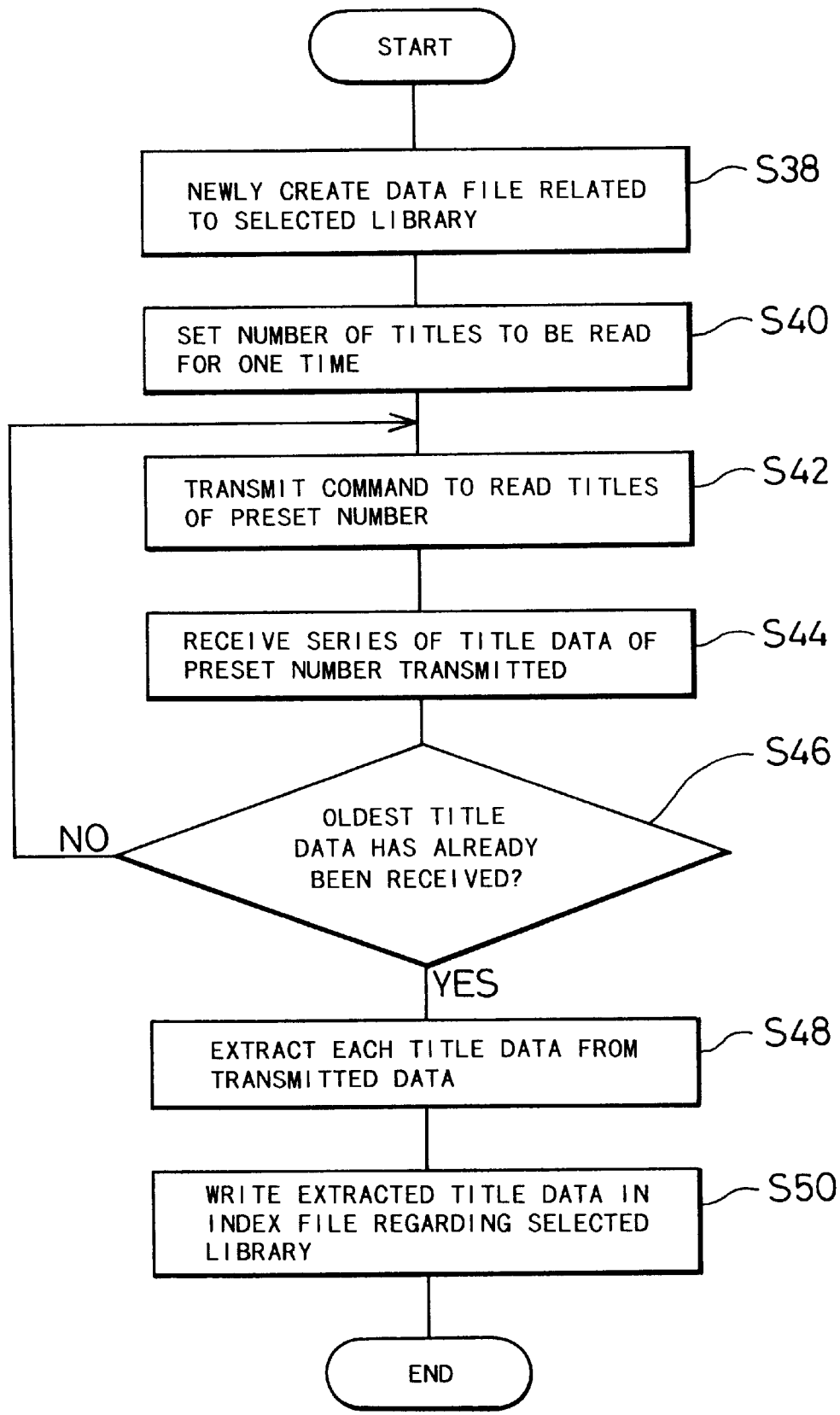
FIG. 11 is a flowchart showing a title updating routine executed when the communications terminal accesses a selected library for the first time.
Figure 12:
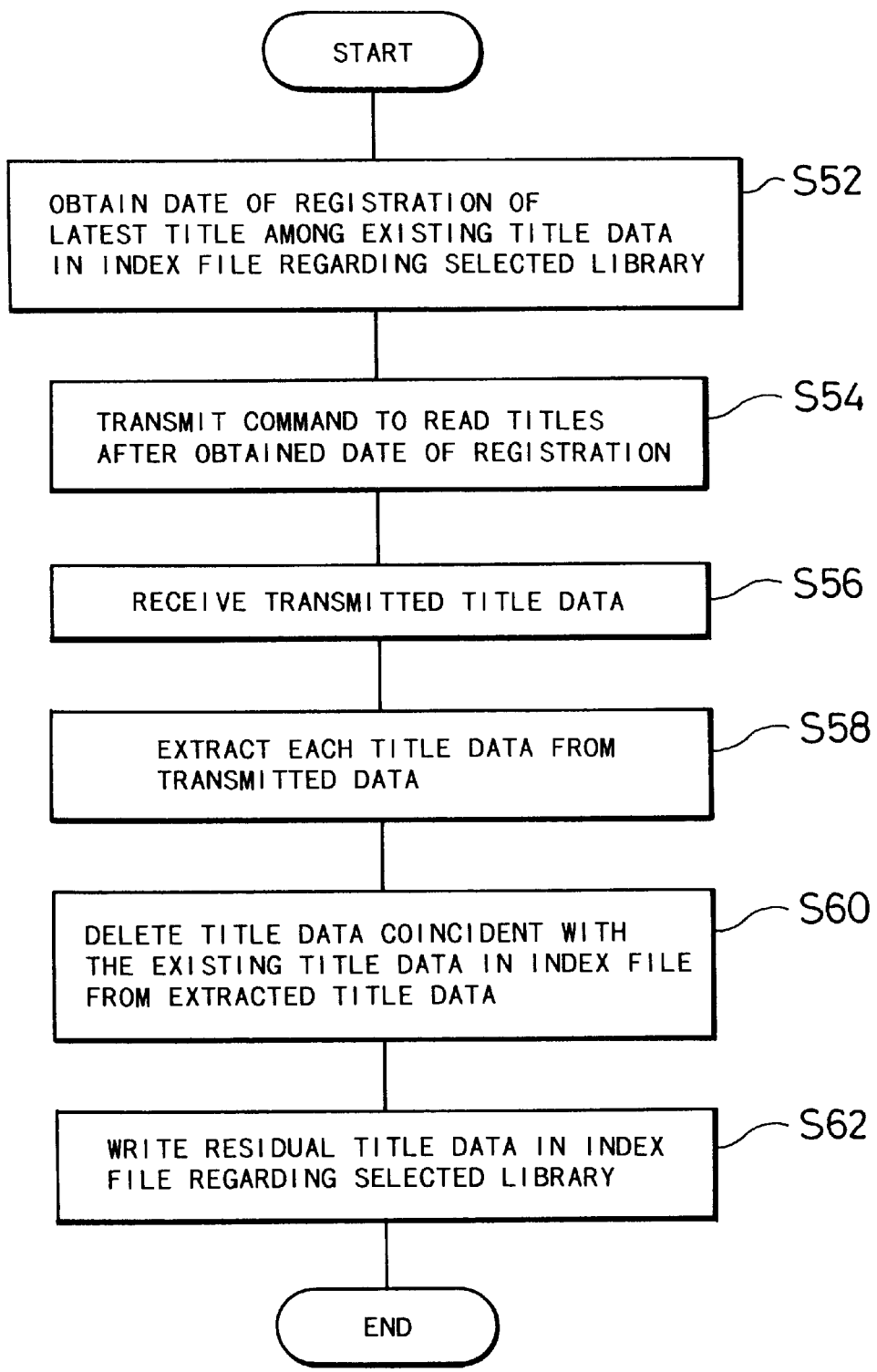
FIG. 12 is a flowchart showing a title updating routine executed when the communications terminal accesses a selected library for the second or subsequent time.

FIG. 11 is a flowchart showing a title updating routine executed when the communications terminal accesses a selected library for the first time. FIG. 12 is a flowchart showing a title updating routine executed when the communications terminal accesses a selected library for the second or subsequent time.

Like the title updating operation for the discussion group, when the communications terminal goes into a selected library for the first time, no data file related to the library has yet been created although the index file exists already. Referring to FIG. 11, immediately after a first access to the selected library, the access management unit 100 newly creates a data file related to the selected library at step S38.

The access management unit 100 subsequently sets the number of titles to be read for one time at step S40, and transmits a command to the communications host to read a series of titles of the preset number at step S42. On the first access to the selected library, it is required to obtain all the titles registered in the library. A sufficiently large value, for example, 100, is accordingly set to the number of titles to be read for one time. The communications host receives the command and transmits the titles of the preset number to the user. The communications terminal then receives the transmitted title data at step S44. In case of the library, the communications host manages the title numbers in such a manner that the last number is allocated to the latest title and arranges the titles in the reverse order of title number (that is, the newest title comes first). It is then determined at step S46 whether or not the oldest title data among the titles registered in the library has been already received. When the oldest title data has not been received yet, the program returns to step S42 to transmit the command again to the communications host to read a next series of titles of the preset number. When the transmitted title data do not fulfill the preset number or when no data are transmitted in response to the command, the program determines that the oldest title data has already been received.

When it is determined that the oldest title data has already been received, the communications terminal extracts each title data from the transmitted data at step S48, and writes the extracted title data in the index file regarding the selected library at step S50. This terminates the series of title updating operation.

Referring to FIG. 12, when the communications terminal goes into the selected library for the second or subsequent time, the access management unit 100 obtains the date of registration of the newest title among the existing title data in the index file regarding the selected library at step S52. Namely the access management unit 100 finds the last date of registration among all the title data written in the index file in the previous access. The access management unit 100 then transmits a command to the communications host to read titles after the obtained date of registration at step S54.

Unlike in case of the discussion group, the communications host does not store or manage the unread title numbers in case of the library, so that it is impossible to receive only unread titles from the communications host. The communications host, however, can transmit titles after the specified date of registration. In this example, the last date of registration in the previous access is specified as the date of registration.

The communications host transmits the title data after the specified date of registration in response to the command. The communications terminal then receives the transmitted data at step S56 and extracts each title data from the transmitted data at step S58. In this manner, the communications terminal receives title data after the last date of registration in the previous access, and thereby obtains title data newly registered in the communications host during a time period between the previous access and the current access.

The title data received in the current communication are those after the last date of registration in the previous communication. This means that the title data obtained in the current communication may include the title data on the last date of registration which have already been received in the previous access. This causes the same title data to be written a plurality of times in the index file.

The difference data-specifying element 100c of the access management unit 100 deletes the title data coincident with the existing title data in the index file regarding the selected library from the title data obtained in the current access at step S60. The writing element 100a then writes the residual title data into the index file at step S62. This procedure enables only the title data registered during a time period between the previous access and the current access to be written in the index file. This terminates the series of title updating operation.

In the title updating operation for the library, the communications terminal receives title data after the last date of registration in the previous access transmitted from the communications host, deletes the title data on the last date of registration, which have already been stored in the previous communication, from the transmitted title data, and writes the residual title data in the index file. Like in case of the discussion group, this procedure effectively prevents the same title data from being written a plurality of times into the index file on the selected library in the database 410. This procedure also enables the newly transmitted up-to-date title data to be connected seamlessly to the existing title data in the index file.

FIGS. 13(a) and 13(b) show a concrete procedure of the title updating operation for the library. By way of example, it is assumed that the communications terminal goes into a selected library in the middle of January for the first time. In this situation, the communications terminal requires the communications host to transmit all the title data registered in the selected library by the preset number of titles.

The title data are transmitted from the communications host in response to the requirement and written into the index file regarding the selected library as shown in FIG. 13(a).

The date of registration of the latest title among the title data obtained in the first access is Dec. 14, 1995 for the title number 56. In case of the library, the communications host manages the title numbers in such a manner that the last number is allocated to the latest title and arranges the titles in the reverse order of title number as mentioned previously. There is a case in which some title data in the library are deleted in the communications host. In this case, the numbers allocated to the deleted titles are simply omitted and do not affect the subsequent title numbers.

The communications terminal goes into the same library in the middle of February. In this situation, the communications terminal requires the communications host to transmit all the title data after the date of registration of the latest title in the previous access (that is, Dec. 14, 1995). The communications host transmits the title data after Dec. 14, 1995 in response to this requirement as shown in FIG. 13(b). As seen in the title data of FIG. 13(b), the latest title data No. 56 in the previous access has not been deleted by the communications host.

This title data No. 56 has, however, already been written in the index file in the previous access. The procedure of simply writing all the transmitted title data in the index file causes the title data No. 56 to appear twice in the registration in the index file. It is accordingly required to delete the title data No. 56 from the data written in the index file in the current communication. The title data of and after No. 57 are then written in the index file.

This procedure enables the title data of and after No. 57 transmitted in the current access to be connected seamlessly to the latest title data No. 56 stored in the previous communication in the index file.

Figure 14:
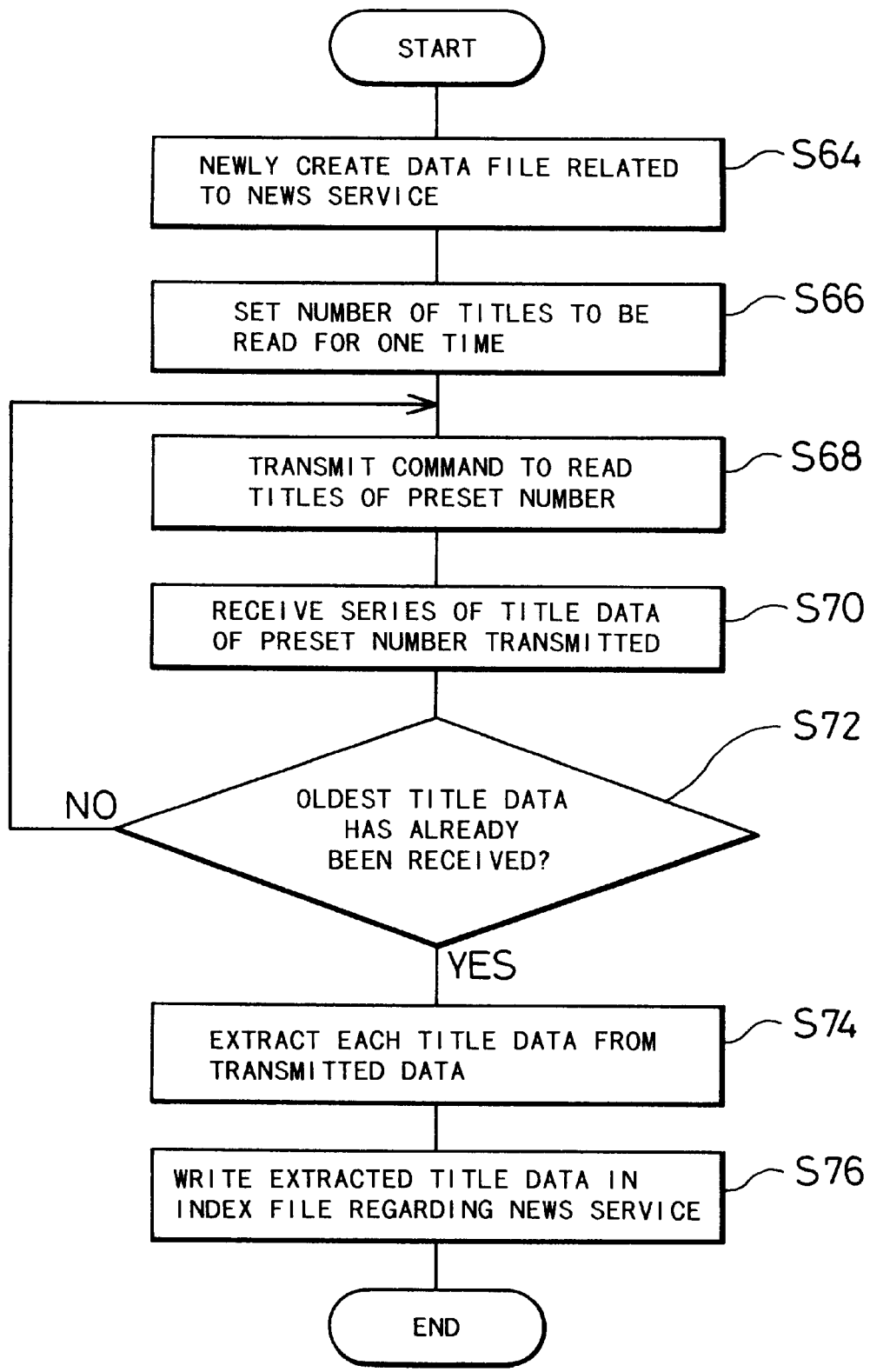
FIG. 14 is a flowchart showing a title updating routine executed when the communications terminal accesses the news service for the first time.
Figure 15:
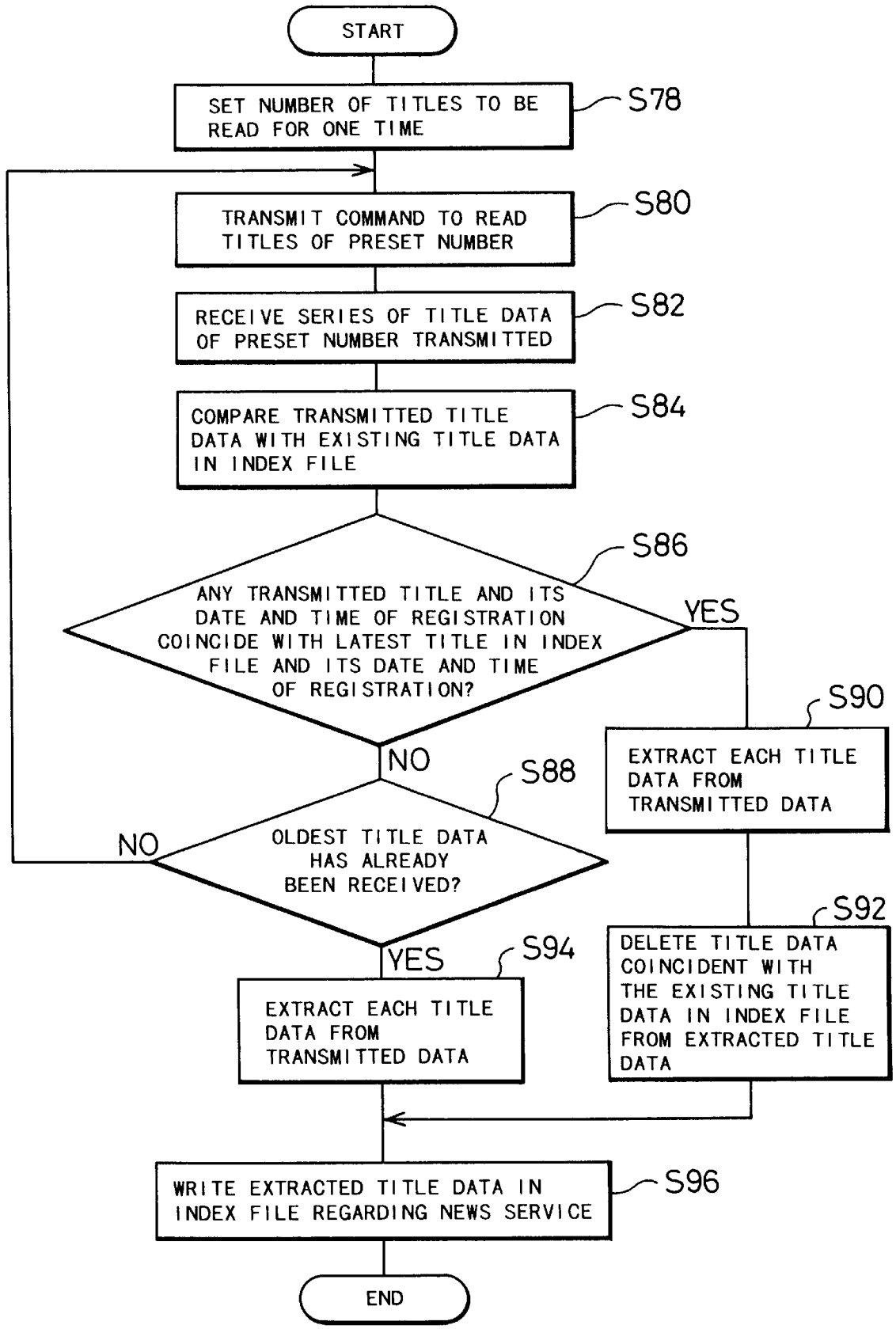
FIG. 15 is a flowchart showing a title updating routine executed when the communications terminal accesses the news service for the second or subsequent time.

FIG. 14 is a flowchart showing a title updating routine executed when the communications terminal accesses the news service for the first time. FIG. 15 is a flowchart showing a title updating routine executed when the communications terminal accesses the news service for the second or subsequent time.

The concrete procedure of title updating operation executed when the communications terminal accesses the news service for the first time (FIG. 14) is identical with the procedure for the library (FIG. 11) and is not specifically described here.

Like in case of the library, the communications host does not store or manage the unread title numbers in case of the news service, so that it is impossible to receive only unread titles from the communications host. In case of the news service, the data registered in the communications host are frequently updated and an extremely large number of data are registered in one day. It is thus impractical to obtain title data newly registered during a time period between the previous access and the current access from the communications host based on the date of registration, as in case of the library. The title updating operation for the news service is hence carried out in the following manner.

Referring to FIG. 15, when the communications terminal goes into the news service for the second or subsequent time, the access management unit 100 sets the number of titles to be read for one time at step S78 and transmits a command to the communications host to read a series of titles of the preset number at step S80.

When the communications terminal goes into the news service for the first time, a sufficiently large value, for example, 100, is set to the number of titles to be read for one time since it is required to obtain all the title data. In the second or subsequent access, however, an excessively large number may result in overrun and cause the title data which have already been stored in the previous communication to be wastefully received again. A relatively small value, such as 10 to 20, is accordingly set to the number of titles to be read for one time. In case that a relatively long time has elapsed since the previous communication, a large value, for example, 100, may be set to the number of titles to be read for one time.

The communications host transmits a series of titles of the preset number to the user in response to the command, and the communications terminal then receives the transmitted title data at step S82.

The access management unit 100 then compares the transmitted title data with the existing title data in the index file at step S84 and determines at step S86 whether or not both the title and the date and time of registration of any one of the newly transmitted title data coincide with the latest title in the index file and its date and time of registration.

As mentioned previously, in case of the news service, an extremely large number of data are registered in one day. It is accordingly difficult to determine whether or not any transmitted title coincides with the latest title in the previous communication, based on the date of registration.

In case of the news service, the communications host manages the titles in such a manner that the number 1 is always allocated to the latest title, and increments the respective numbers allocated to the existing titles by one, every time when a new title is registered. The communications host arranges the titles in the order of title number (the latest title comes first). It is accordingly impossible to determine whether or not any transmitted title coincides with the latest title in the previous communication, based on the title number.

In this embodiment, the determination of coincidence is based on the date and time when the title and the news text of the title are registered in the communications host. In case of the news service, the communications host manages not only the date but the time of registration of each data. Even when a number of data are registered on the same date, comparison of the registered time generally enables the determination of coincidence. In case that a plurality of data are registered at the same time on the same date, the determination of coincidence is carried out based on the difference in title. In the news service, the title is not changed during storage and it is very rare to give the same title to different pieces of news. It is accordingly fair to determine the coincidence based on the difference in title.

In case of the news service, data registered in the communications host are deleted sequentially in the order of oldness, and no intermediate data are deleted by ignoring the order of oldness.

When it is determined that both the title and the date and time of registration of any one of the newly transmitted title data coincide with the latest title and its date and time of registration at step S86, the program proceeds to step S90, at which the communications terminal extracts each title data from the transmitted data. In this manner, the communications terminal confirms that the same title data as the latest title in the previous access has been received and then obtains all the transmitted title data. Namely the communications terminal can obtain all the title data newly registered in the communications host during a time period between the previous access and the current access.

Since the title data coincident with the latest title data in the previous communication and the title data registered before the date of registration of the latest title data have already been written in the index file in the previous access, the procedure of writing all the title data received in the current access causes some title data to be stored a plurality of times in the index file. The difference data-specifying element 100c of the access management unit 100 thus deletes the title data coincident with the existing title data in the index file regarding the news service from the title data obtained in the current access at step S92. The writing element 100a then writes the residual title data into the index file at step S96. This procedure enables only the title data registered during a time period between the previous access and the current access to be written in the index file.

When it is determined that each of the title and its date and time of registration of the newly transmitted title data does not coincide with the latest title and its date and time of registration in the previous access at step S86, on the contrary, the program proceeds to step 88 at which it is determined whether or not the oldest title data among all the titles registered in the news service has already been received. When the oldest title data has not been received yet, the program returns to step S80 to transmit the command again to the communications host to read a next series of titles of the preset number.

When it is determined that the oldest title data has already been received at step S88 while each of the title and its date and time of registration of the newly transmitted title data does not coincide with the latest title in the index file and its date and time of registration, the communications terminal extracts each title data from the transmitted data at step S94. The fact that the oldest title data has been received irrespective of no coincidence with the latest title in the index file and its date and time of registration means that all the title data registered for the news service in the communications host have been received by the communications terminal and that yet none of the input title data coincides with the title data input in the previous access. This represents a skip-out state, in which the old titles including the latest title in the previous access have been deleted by the communications host during a time period between the previous access and the current access.

In case of the skip-out state, the communications terminal receives the title data down to the oldest title data and thereby obtains all the title data currently registered in the communications host. In news service or bulletin board service wherein the registered data are frequently updated, if the communications terminal goes into those services after a time period of only several days, the time period may cause the skip-out state.

In case of the skip-out state, all the newly obtained title data are those registered after the previous communication and accordingly do not coincide with any of the existing title data in the index file. All the obtained title data are thus written into the index file at step S96. This terminates the series of title updating operation.

In the title updating operation for the news service, the communications terminal receives title data by a predetermined number of titles from the communications host until any one of the transmitted title data coincides with the latest title data in the previous access. The communications terminal then deletes the existing title data from the transmitted title data and writes the residual title data in the index file. This procedure effectively prevents the same title data from being written a plurality of times into the index file in the database 410. This procedure also enables the newly transmitted up-to-date title data to be connected seamlessly to the existing title data in the index file.

FIGS. 16(a) and 16(b) show a concrete procedure of the title updating operation for the news service. By way of example, it is assumed that the communications terminal goes into a selected news service at 9:00 am on March 1$^{st}$ for the first time. In this situation, the communications terminal requires the communications host to transmit all the title data registered in the news service by the preset number of titles. The title data are transmitted from the communications host in response to the requirement and written into the index file regarding the news service as shown in FIG. 16(a). The latest title among the title data obtained in the first access is 'Ten patients died at A hospital', and its date and time of registration is 8:53 am on March 1$^{st}$.

The communications terminal again goes into the same news service at 9:30 am on the same date. In this situation, the communications terminal requires the communications host to send title data by a predetermined number of titles, for example, by six titles. The communications host then transmits data of six titles in response to the requirement as shown in FIG. 16(b).

The comparison between the title data of FIG. 16(a) and those of FIG. 16(b) shows that the title data No. 4 coincides with the latest title and its date and time of registration in the previous communication and that title data having the smaller title numbers than the number 4 are those newly registered during a time period between the previous access (9:00 am) and the current access (9:30 am). Registration of these three pieces of title data increases the title numbers allocated to the latest title in the previous access and the prior two titles.

The title data of the latest title in the previous access and those having the subsequent numbers, that is, the title data No. 4 to No. 6, have already been written in the index file in the previous communication and are thereby deleted from the data to be written in the current communication. Namely only the title data No. 1 to No. 3 are written into the index file this time. This procedure enables the title data No. 1 to No. 3 transmitted in the current access to be connected seamlessly to the latest title data stored in the previous communication.

Figure 17:
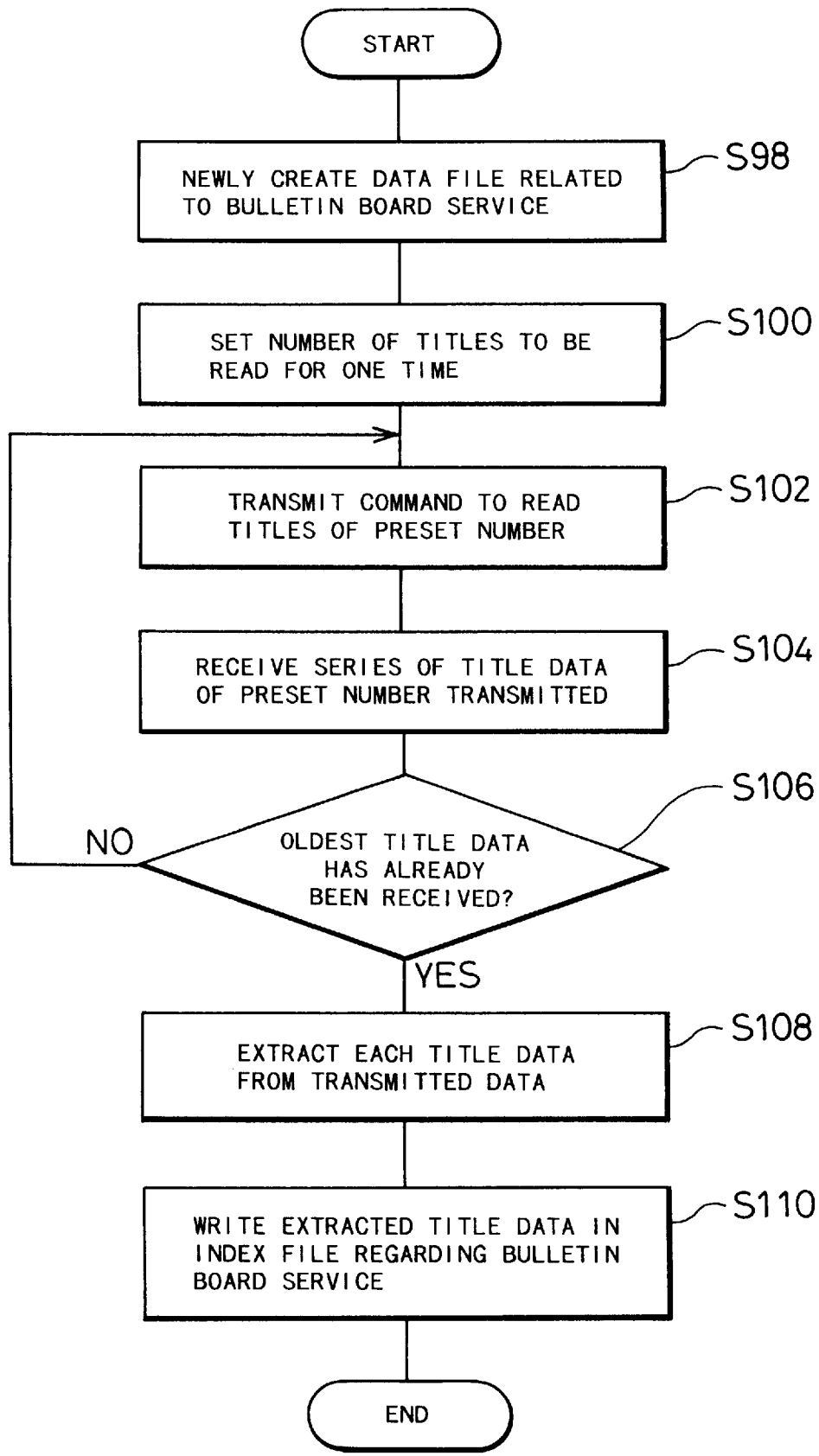
FIG. 17 is a flowchart showing a title updating routine executed when the communications terminal accesses the bulletin board service for the first time.
Figure 18:
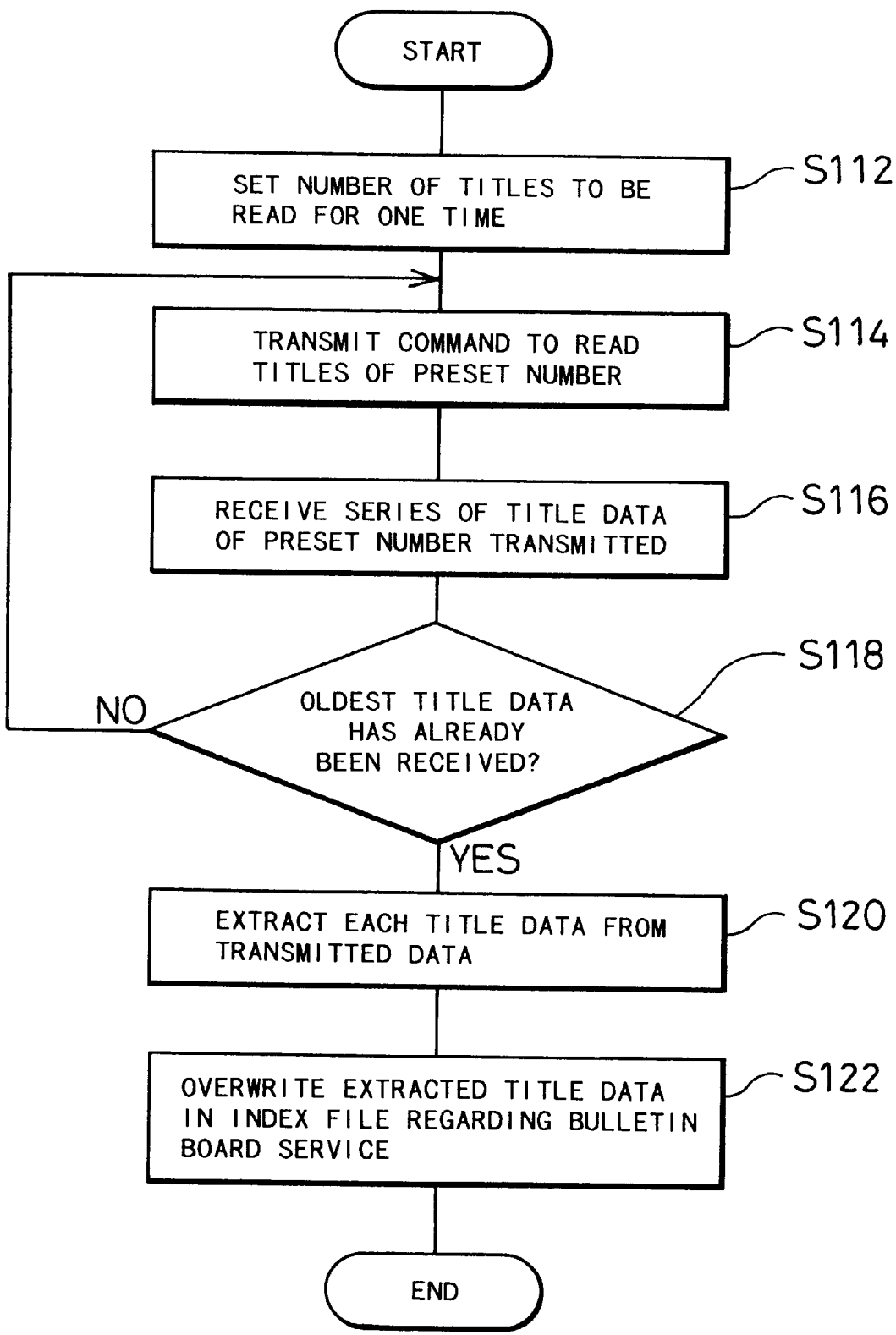
FIG. 18 is a flowchart showing a title updating routine executed when the communications terminal accesses the bulletin board service for the second or subsequent time.

FIG. 17 is a flowchart showing a title updating routine executed when the communications terminal accesses the bulletin board service for the first time. FIG. 18 is a flowchart showing a title updating routine executed when the communications terminal accesses the bulletin board service for the second or subsequent time.

The concrete procedure of title updating operation executed when the communications terminal accesses the bulletin board service for the first time (FIG. 17) is identical with the procedure for the library (FIG. 11) and the procedure for the news service (FIG. 14) and is not specifically described here.

As discussed previously, in case of the news service, title data registered in the communications host are deleted sequentially in the order of oldness. In case of the bulletin board service, the maximum number of title data that can be registered in the communications host is limited to 512, and the title data exceeding the maximum number are deleted sequentially in the order of oldness. In any case, the title data stored in the index file may have already been deleted from the data registered in the communications host. Under such a condition, the title data stored in the index file regarding the news service may be utilized later as the past news information. In case of the bulletin board service, however, there is no use in storing title data which has already been deleted from the registration in the communications host. In the embodiment, the title updating operation for the bulletin board service is accordingly carried out in the following manner.

Referring to FIG. 18, when the communications terminal goes into the bulletin board service for the second or subsequent time, the communications terminal obtains all the title data registered in the communications host in the same manner as the first access (steps S112 through S120). After obtaining all the title data, the communications terminal overwrites the obtained title data in the index file regarding the bulletin board service in the database 410 at step S122. This procedure replaces the existing title data in the index file with the title data newly obtained from the communications host. This terminates the series of title updating operation.

In the title updating operation for the bulletin board service, all the registered title data are transmitted from the communications host every time to replace the existing title data stored in the index file in the database 410. This procedure effectively prevents the same title data from being written a plurality of times into the index file in the database 410.

The title updating operation discussed above relates to the procedure of updating titles in a certain folder. In some cases, a folder in a certain service may be added, changed, or deleted by the communications host. In accordance with a preferable application, the updating operation may be carried out for each folder in the service.

When the user specifies a desired service through operation of the keyboard 72 and the mouse 73, the access management unit 100 transmits a 'GO' command to the communications host via the communication control unit 300 and the other related elements, in order to make the communications host shift to the specified service. The communications host then shifts to the specified service in response to the 'GO' command. When going into the service specified by the user, the access management unit 100 requires the communications host to transmit information on a list of folders. The access management unit 100 receives the information on the list of folders from the communications host via the communication control unit 300 and the other related elements, reads a folder list index file from the database 410 via the data management unit 400, and compares the folder list index file with the input information on the list of folders. In case that addition, change, or deletion of any folder is observed in the specified service, the folder list index file is updated with the input information on the list of folders.

The access management unit 100 then creates the list of folders FL in the specified service based on the updated folder list index file and displays the list of folders FL on the monitor 76.

The folder updating operation may be carried out in the above manner.

1-4-2) Bill-Saving Operation

Among the various communications services supplied by the communications host, several services, such as the news service, are pay services that require an additional charge other than the basic charge. When the user participates in such a pay service, the charge is based on the total time for which the communications terminal is in the pay service. It is accordingly desirable to make the time period, for which the user is in the pay service (that is, for which the user utilizes the pay service), as short as possible. In case that the user receives such a pay service through manual communication, however, operations and decisions undesirably consume the time, and cause the user to be in the pay service for a long time and thereby to pay much money for the service.

In this embodiment, when the user receives a pay service through manual communication, the following bill-saving operation, which is the second characteristic of the embodiment, is carried out.

Figure 19:
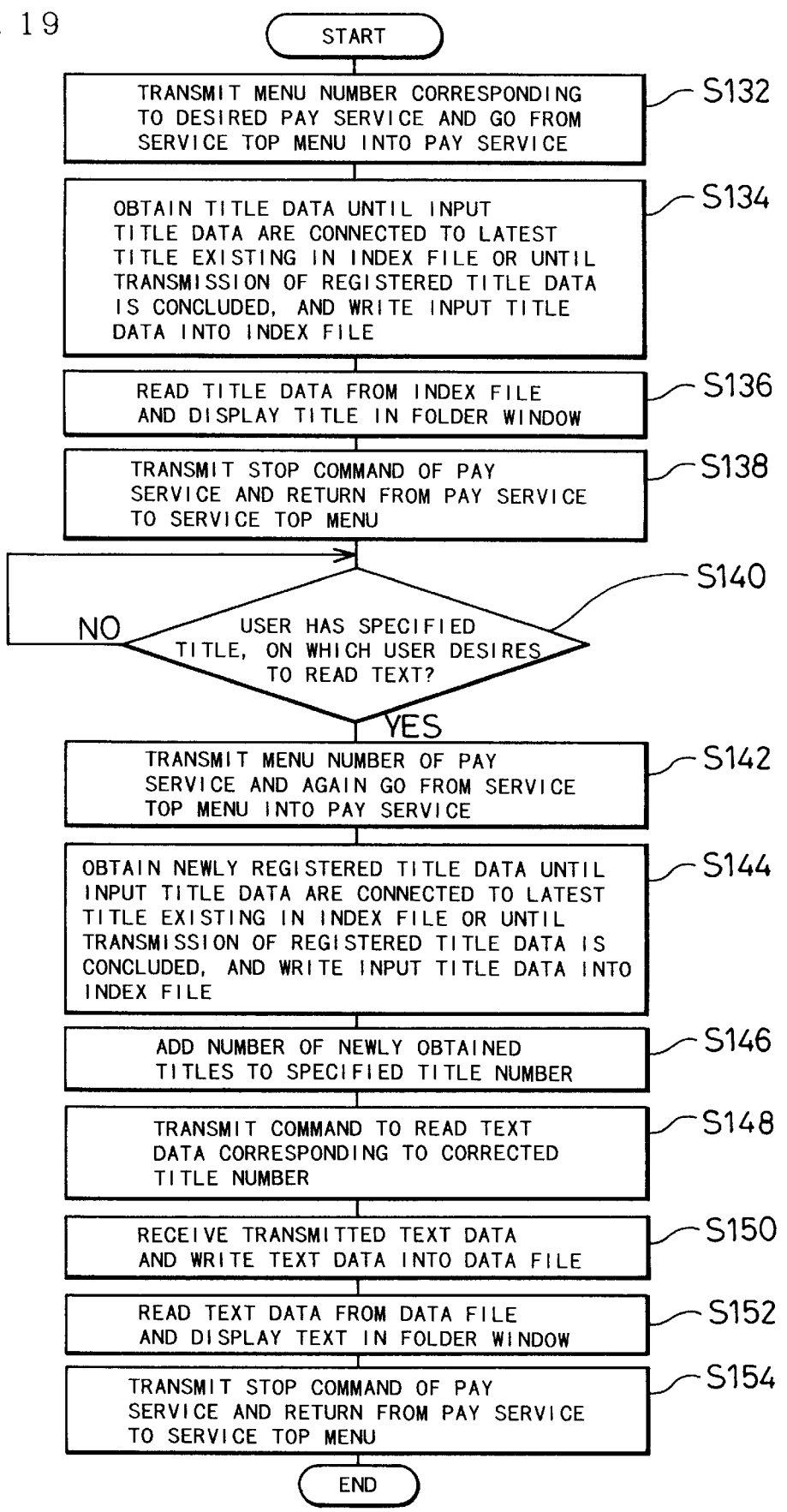
FIG. 19 is a flowchart showing a bill-saving routine executed when the user receives a pay service.

FIG. 19 is a flowchart showing a bill-saving routine executed when the user receives a pay service. It is assumed that the user is located at a service top menu of a pay service, such as the news service, on the communications services supplied by the communications host. The service top menu provides the user with information how to utilize the pay service, and no additional charge is required as long as the user is on the service top menu.

When the user gives an instruction to go into a pay service through operation of the keyboard 72 and the mouse 73, the program enters the bill-saving routine of FIG. 19. The particular communication service start requiring element 100g of the access management unit 100 transmits a menu number representing the specified pay service to the communications host via the communication control unit 300, and goes from the service top menu into the pay service at step S132. When the access management unit 100 goes into the pay service, the communications host starts counting the time, for which the user utilizes the pay service, and charges according to the time count.

The access management unit 100 carries out the title updating operation discussed above, so as to obtain title data related to the pay service until the input title data are connected to the latest title data stored in an index file regarding the pay service or until transmission of all the registered data in the communications host is concluded and write the input title data into the index file in the database 410 via the data management unit 400 at step S134.

The access management unit 100 then reads the obtained title data from the index file in the database 410 and displays a title based on the title data in a folder window on the monitor 76 via the user I/F unit 200 at step S136. This procedure enables a list of titles in the pay service to be displayed on the monitor 76.

At the same time, the particular communication service stop requiring element 100h of the access management unit 100 transmits a stop command of the pay service to the communications host via the communication control unit 300 and returns from the pay service to the non-charged service top menu at step S138. The communications host then stops counting the time in the pay service and thereby charging according to the time count. The access management unit 100 waits in this state until the user specifies a title for reading text at step S140. The user can check the list of titles displayed in the folder window on the monitor 76 and select a desired title without being charged.

When the user specifies a title, on which the user desires to read text, in the folder window through operation of the keyboard 72 and the mouse 73, the particular communication service start requiring element 100g of the access management unit 100 again transmits the menu number of the pay service to the communications host via the communication control unit 300 and goes from the service top menu into the pay service at step S142. When the access management unit 100 goes into the pay service, the communications host again starts counting the time in the pay service and charges according to the time count.

The access management unit 100 again carries out the title updating operation, so as to obtain up-to-date title data and write the up-to-date title data into the index file in the database 410 at step S144. This procedure can deal with the case, in which new titles have been registered during a time period between the previous access to the pay service and the current access to the pay service. The time period between the two accesses is, however, generally very short, and it is rare that new titles have been registered in such a short time period. The title updating operation is thus concluded in a very short time period.

Provided that the pay service is a news service, the communications host manages the titles in such a manner that the number 1 is always allocated to the latest title as discussed above. Every time when a new title is registered, the respective numbers allocated to the registered titles are incremented by one. In case that one or a plurality of new titles are registered during the time period between the two accesses to the pay service, the respective numbers allocated to the existing titles in the communications host are incremented by the number of newly registered titles. In this case, the user can not obtain text data regarding the desired title when the access management unit 100 transmits the title specified by the user to the communications host without any correction.

The text data transfer requiring element 100i of the access management unit 100 then adds the number of titles newly obtained in the title updating operation (that is, the number of titles newly registered in the communications host) to the title number specified by the user at step S146, and transmits a command to the communications host to read text data regarding the corrected title number at step S148. This procedure enables transmission of text data corresponding to the title actually desired by the user to be accurately required to the communications host.

The communications host transmits the text data required by the user, and the access management unit 100 obtains the transmitted text data via the communication control unit 300 and writes the text data into a data file in the database 410 via the data management unit 400 at step S150.

The access management unit 100 then reads the obtained text data from the data file in the database 410 and displays the text in the folder window on the monitor 76 via the user I/F unit 200 at step S152. This procedure enables the text corresponding to the title required by the user to be displayed on the monitor 76.

At the same time, the particular communication service stop requiring element 100h of the access management unit 100 transmits a stop command of the pay service to the communications host via the communication control unit 300 and returns from the pay service to the non-charged service top menu at step S154. The communications host then stops counting the time in the pay service and thereby charging according to the time count. This terminates the series of bill-saving operation.

In the above example, the charge is based on the total time for which the communications terminal is in the pay service. As another example, a fixed charge is imposed for each unit time (for example, 100 yen/minute), and charging starts every time when the communications terminal goes into the pay service. When the time period in the pay service is 1 minute and 1 second, for example, this is calculated as 2 minutes. A fixed charge is imposed as long as the time period does not exceed 2 minutes. Namely the charge for 1 minute and 1 second is identical with the charge for 1 minute and 59 seconds. In this case, the access management unit 100 goes out of the pay service after waiting up to 1 minute and 59 seconds. This structure enables the access management unit 100 to be well prepared for a next operation, for example, an instruction to read text data.

In accordance with another preferable application, the access management unit 100 may measure an elapse of time since it went into the pay service and display the measured time on the monitor 76 via the user I/F unit 200. In case that the method of calculation of the additional charge is known, the additional charge may be actually calculated and displayed on the monitor 76. This informs the user of the time period in the pay service and the additional charge for the pay service.

The bill-saving operation shown in the routine of FIG. 19 makes the time period, for which the communications terminal is in the pay service, as short as possible, even when the user receives the pay service through manual communication. The access management unit 100, in place of the user, carries out the operation of going out of the pay service at an optimal timing. This saves the labor of the user. In accordance with another possible structure, the user may give an instruction to go out of the pay service according to the requirements.

1-4-3) Offline Operation

The above description refers to the online operation when the communications terminal makes manual connection with the communications host. The communications terminal of the embodiment can also carry out a similar offline operation when the communications terminal does not make connection with the communications host.

In this embodiment, the input data from the communications host are sorted out according to the hierarchical structure and stored in the database 410. The communications terminal can thus carry out the offline operation similar to the online operation, based on these stored data.

By way of example, when the user specifies a desired service (in a narrow sense) among a list of services SL displayed in the service selection window shown in FIG. 3 through operation of the keyboard 72 and the mouse 73, the access management unit 100 requires the data management unit 400 to read a folder list index file corresponding to the specified service from the database 410 and creates and displays a list of folders FL included in the specified service based on the folder list index file.

When the user specifies a desired folder among the list of folders FL through operation of the keyboard 72 and the mouse 73, the access management unit 100 requires the data management unit 400 to read an index file regarding the specified folder from the database 410 and displays a list of titles TL included in the specified folder in the folder window shown in FIG. 6, based on the index file.

When the user specifies a title, on which the user desires to read text, among the list of titles TL through operation of the keyboard 72 and the mouse 73, the access management unit 100 requires the data management unit 400 to read text data corresponding to the specified title from a data file in the database 410 if any, and displays text in the folder window shown in FIG. 6, based on the text data.

In this manner, the communications terminal can carry out the offline operation similar to the online operation. Irrespective of the existence or non-existence of the actual communication of the communications terminal with the communications host, the user can utilize the data displayed on the monitor 76 through substantially the same operation.

In the offline operation, when no text data corresponding to the title specified by the user exist in the data file in the database 410, no text desired by the user is displayed in the folder window on the monitor 76. A communication reservation (discussed later) or the following procedure may solve such a problem.

When the data management unit 400 outputs an error signal representing the state that no desired text data exist in the database 410, the transfer requiring element 100f of the access management unit 100 immediately telephones the communications host via the communication control unit 300 to be connected to the communications host. On a start of the communication service by the communications host, the access management unit 100 requires the communications host to transmit the desired text data.

This procedure enables the desired text data to be obtained from the communications host and written into the data file in the database 410, so that the desired text can be displayed on the monitor 76.

1-5) Access to Service through Automatic Communication

The above description refers to an access to the communication service through manual connection. The following describes an access to the communication service through automatic connection.

In this embodiment, there are two available methods for previously setting a target (service) to be accessed and the contents of the processing executed at the preset target through automatic communication; specification of periodic access and communication reservation. The specification of periodic access is adopted when the user desires to receive data regarding a specified service (folder) on a periodic basis. The communication reservation is adopted when the user desires to receive individual data that the user is interested in.

1-5-1) Specification of Periodic Access

The following describes the specification of periodic access. FIG. 20 shows a periodic access specification window displayed on the monitor 76 as an example. When the user gives an instruction to set specification of periodic access through operation of the keyboard 72 and the mouse 73, the window as shown in FIG. 20 is displayed on the monitor 76. FIG. 20 shows a periodic access specification window for the bulletin board service.

After selecting a desired folder name among a list of folders FLB displayed in the left portion of the window by a click of the mouse 73, the user can specify desired settings for the folder. In case that the user clicks the box 'Periodic Access' on the right side in the window, the specified folder is registered as a target of periodic access. The user then sets a number of days as an interval of periodic access to the specified folder (interval of access), and clicks either the box 'Read only Titles' or the box 'Read Text' to determine the reading procedure. When the user desires to restrict the number of data to be read in one access, the user clicks the box 'Restrict by Number of Data' and specifies the number of data to be read in one access. Although the restriction is based on the number of data in the periodic access specification window shown as an example, the restriction may be based on the date of registration.

In this manner, the user can set specification of periodic access for each service (folder) that the user desires periodic access. The contents of specification of periodic access are stored in the periodic access file 620 in the hard disk 84 shown in FIG. 1.

FIG. 21 shows the contents of specification stored in the periodic access file 620 as an example. Referring to FIG. 21, the folder name to be periodically accessed, the selected reading procedure (reading only title or reading text), the interval of access (the number of days), and the read-restricting condition (number of data or date of registration) specified for each service are stored in the periodic access file 620. The read-restricting condition is omitted from the illustration of FIG. 21. In case of the specification of periodic access, only one operation can be specified for each folder. Namely no two operations can be stored under the same name of service and the same name of folder.

The automatic communication processing unit 600 sorts out the contents stored in the periodic access file 620. In accordance with a concrete procedure, the automatic communication processing unit 600 sorts out the contents in such a manner that the operations with the same name of service are grouped together as shown in FIG. 21. As discussed later, the contents of storage in the periodic access file 620 as well as the contents of storage in the reserve file 610 are sorted out in the process of automatic communication. It is accordingly not necessary to sort out the contents at the time of specification of periodic access. As mentioned above, however, no two operations are stored in the periodic access file 620 under the same name of service and the same name of folder and the contents of specification are fixed in case of the periodic access. In order to save the time, it is thus preferable to sort out the contents of storage in the periodic access file 620 at the time of specification of periodic access, instead of sorting out the contents of storage on each time of automatic communication.

Figure 22:
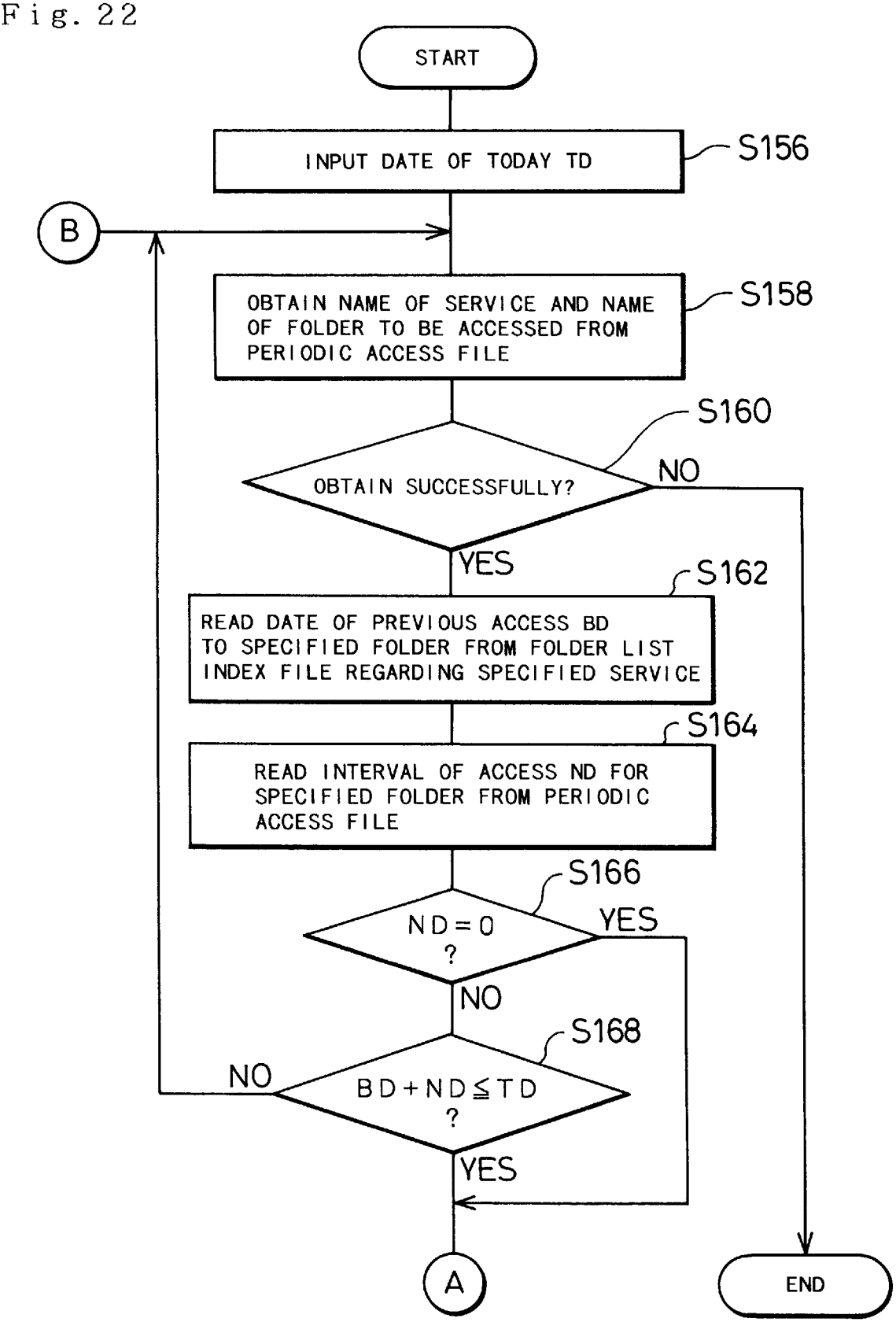
FIGS. 22 and 23 are flowcharts showing an automatic communication routine based on the periodic access file.
Figure 23:
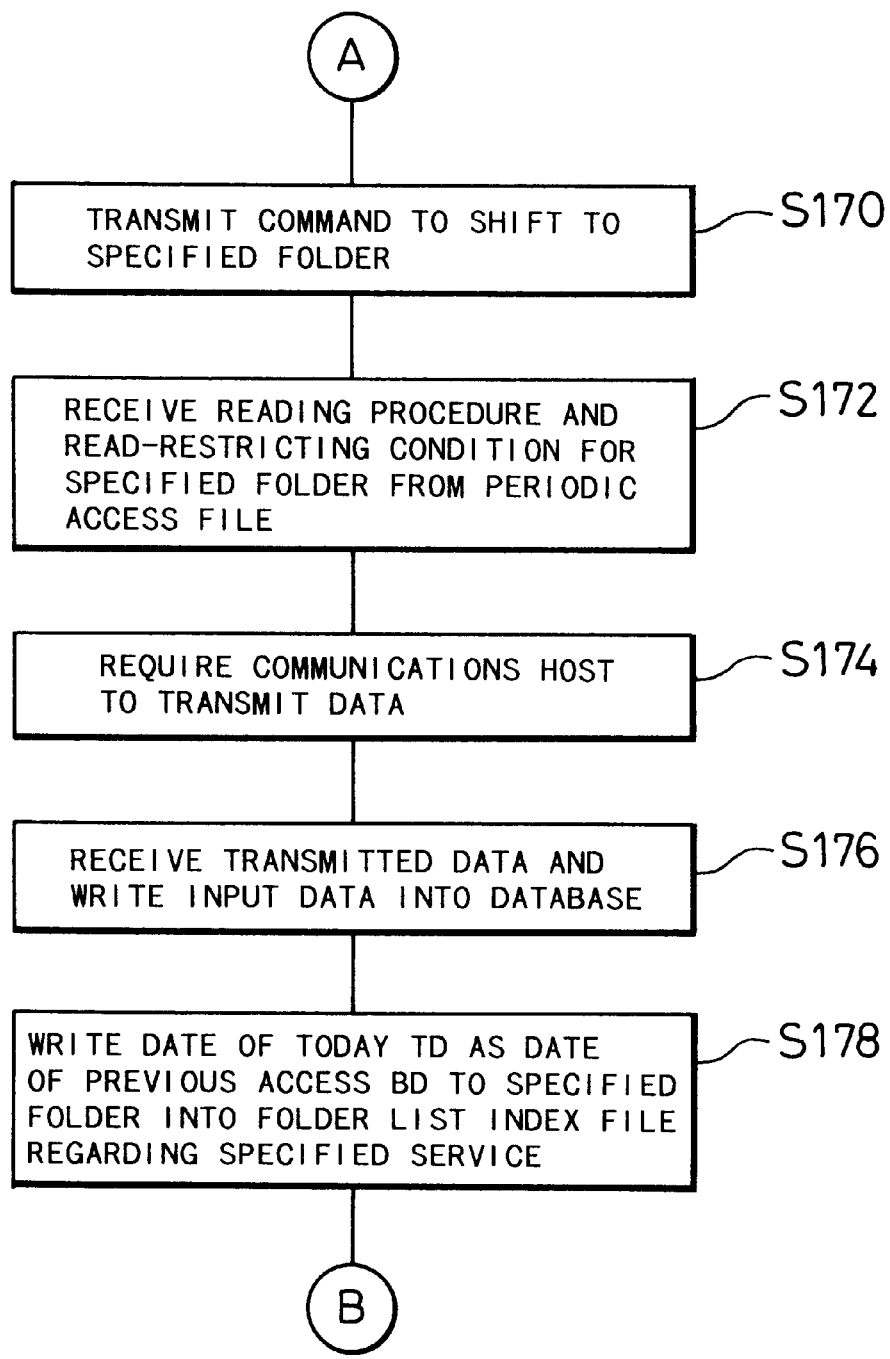

A concrete procedure of automatic communication based on the periodic access file 620 follows an automatic communication routine shown in the flowcharts of FIGS. 22 and 23.

Automatic communication starts when the user gives an instruction to start the automatic communication through operation of the keyboard 72 and the mouse 73 or when the timer 68 detects a preset start time of automatic communication.

On a start of automatic communication, the automatic communication processing unit 600 telephones the communications host via the access management unit 100 and the communication control unit 300 to be connected to the communications host, and starts the processing routine of FIG. 22. When the program enters the routine of FIG. 22, the automatic communication processing unit 600 first obtains a date of today TD from the RTC 52 for managing the date and time at step S156. The automatic communication processing unit 600 then reads the periodic access file 620 in the hard disk 84 in order to obtain the name of service and the name of folder to be accessed on the periodic basis at step S158.

It is then determined at step S160 whether or not the name of service and the name of folder have been obtained successfully. When the answer is affirmative, the program proceeds to step S162.

At step S162, the automatic communication processing unit 600 reads a folder list index file (see FIG. 5) corresponding to the obtained name of service from the database 410 via the data management unit 400, and reads a date of previous access BD stored with the obtained name of folder from the folder list index file. At subsequent step S164, the automatic communication processing unit 600 reads an interval of access ND stored with the obtained name of folder from the periodic access file 620 read at step S158. It is then determined at step S166 whether or not the interval of access ND is equal to 0 day. The interval of access ND equal to 0 day means that the folder is to be accessed every time of automatic communication. In case that the interval of access ND is equal to 0 day at step S166, the program proceeds to step S170 in the flowchart of FIG. 23 to access the folder.

In case that the interval of access ND is not equal to 0 day at step S166, the interval of access ND input at step S164 is added to the date of previous access BD input at step S162, and it is determined whether the resulting date (BD+ND) for the folder is after the date of today TD or either on or before the date of today TD at step S168. In case that the resulting date (BD+ND) is after the date of today TD, the preset days as the interval of access have not elapsed yet since the date of previous access. It is accordingly not required to access the folder by the current cycle of automatic communication. The program thus does not access the folder and returns to step S158. In case that the resulting date (BD+ND) is on or before the date of today TD, on the contrary, the preset days as the interval of access have elapsed since the date of previous access. It is accordingly required to access the folder by the current cycle of automatic communication. The program thus proceeds to step S170 in the flowchart of FIG. 23 to access the folder.

Referring to the flowchart of FIG. 23, at step S170, the transfer element 600*b* of the automatic communication processing unit 600 transmits a command to the communications host via the access management unit 100 and the communication control unit 300, in order to make the communications host shift to the folder specified as the target of periodic access. In accordance with a concrete procedure, the transfer element 600*b* first transmits a command to make the communications host shift to the service, which the folder specified as the target of periodic access belongs to. The communications host then shifts to the specified service in response to the command. When the communications host has shifted to the specified service, the transfer element 600*b* transmits a menu number to make the communications host shift to the folder specified as the target of periodic access. The communications host then shifts to the folder specified as the target of periodic access in response to the input menu number.

When going into the specified folder, the program proceeds to step S172, at which the automatic communication processing unit 600 receives the reading procedure and the read-restricting condition stored with the name of folder from the periodic access file 620 read at step S158. The automatic communication processing unit 600 subsequently requires the communications host to transmit data according to the reading procedure and the read-restricting condition at step S174. The automatic communication processing unit 600 receives the required data transmitted from the communications host via the communication control unit 300 and the other related elements, and writes the input data into the database 410 via the data management unit 400 at step S176. The automatic communication processing unit 600 receives a series of data from the communications host in this manner.

By way of example, in case that 'Read only Titles' is chosen as the reading procedure, only title data are read from the communications host and written into the index file. In case that 'Read Text' is chosen as the reading procedure, on the other hand, both title data and text data are read from the communications host and respectively written into the index file and the data file. In case that the read-restricting condition is set, the automatic communication processing unit 600 continuously reads unread title data (or unread title data and text data) registered in the communications host until the read-restricting condition is fulfilled. The reading process is concluded when the newly input data are connected to the latest data previously stored in the index file (or in the index file and data file) or otherwise when all the data regarding the folder and registered in the communications host have been received.

At step S178, the automatic communication processing unit 600 writes the date of today TD as the date of previous access BD to the specified folder in the folder list index file read at step S162. This process updates the date of previous access.

After concluding the series of processing for one folder, the program returns to step S158 to obtain the next name of service and name of folder to be accessed from the periodic access file 620 and repeats the processing discussed above.

The automatic communication is carried out in the above manner based on the periodic access file 620.

1-5-2) Communication Reservation

The following describes communication reservation. While the data stored in the database 410 are displayed on the monitor 76 off line, the user can reserve communication according to the requirements. Byway of example, when the user finds an interesting title among the list of titles displayed on the monitor 76 but the text data corresponding to the title are not stored in the database 410, the user reserves communication to read the text data. As another example, when the user reads text in a certain discussion group and wants to send a follow-up message in response to the text to the discussion group on the communications host, the user reserves communication to upload the follow-up message.

Figure 24:
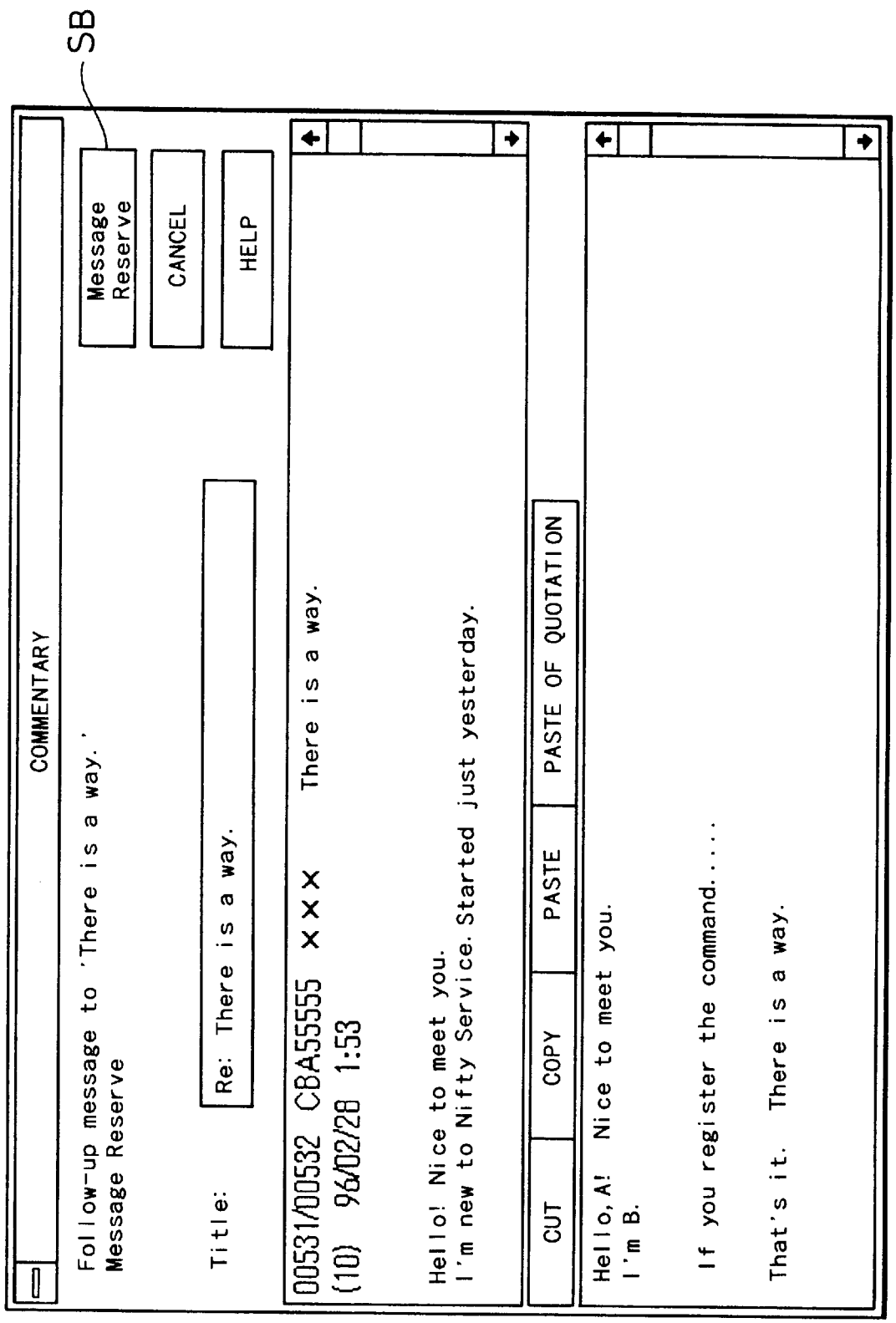
FIG. 24 shows a commentary window displayed on the monitor 76 as an example.

FIG. 24 shows a commentary window displayed on the monitor 76 as an example. For example, the user clicks the mouse 73 to choose the bottom title 'There is a way' among the list of titles TL shown in the upper portion of the folder window of FIG. 6 and subsequently clicks a 'Commentary' box CB in the window. The display then changes to the commentary window as shown in FIG. 24 to display text related to the selected title in the upper portion of the window. The user writes a follow-up message in response to the text in the lower portion of the window and clicks a 'Message Reserve' box SB on the upper right corner in the window. The follow-up message as well as the information on reservation is written into the reserve file 610 in the hard disk 84, and a reservation is added to the reserve file 610 as shown in FIG. 25.

FIG. 26 shows the contents of reservation stored in the reserve file 610 as an example. Referring to FIG. 26, the contents of reservation are stored in the reserve file 610 in the order of reservation. Each reservation includes information on reservation, that is, the name of service, the name of folder, and the details of reservation, as well as the corresponding title number and the contents of the follow-up message according to the requirements.

The contents of reservations which the user have made off line for a variety of folders are stored in the reserve file 610 in the order of reservation. This means that the contents of reservation are not grouped by the name of service or the name of folder as shown in FIG. 26. Unlike the periodic access file 620, the contents of storage are not sorted out in the reserve file 610 at the time of communication reservation, although the sorting-out process may be added according to the requirements.

The following briefly describes the operation of automatic communication based on the reserve file. The procedure for connecting with the communications host is identical with that described above in case of periodic access. When the detail of reservation is to read text in a discussion group or a library, the automatic communication processing unit 600 goes into the discussion group or the library through automatic communication, transmits a title number allocated to the desired text to the communications host, and requires the communications host to transmit text data corresponding to the title number. In case of the discussion group or the library, the title numbers once allocated to text data are kept unchanged at the communications host. The automatic communication processing unit 600 can accordingly require the communications host to transmit text data by sending the title number stored in the reserve file 610 without any correction.

When the communications host transmits the corresponding text data, the automatic communication processing unit 600 receives the text data and writes the input text data into the data file in the database 410. This procedure enables the reserved text data to be obtained and written into the database 410. The title updating operation discussed above is carried out when update of titles is required for the discussion group or the library.

When the detail of reservation is to read text in news service or bulletin board service, the automatic communication processing unit 600 goes into the news service or bulletin board service and transmits a title number allocated to the desired text to the communications host.

In case of the news service and the bulletin board service, however, the numbers allocated to the existing titles are incremented by one every time when a new title is registered at the communications host as described above. Unlike in case of the discussion group and the library, it is impossible to require transmission of text data by sending the title number stored in the reserve file 610 without any correction.

The following operations are accordingly required in case of the news service and the bulletin board service. When going into the news service, the automatic communication processing unit 600 requires the communications host to transmit title data, obtains title data, for example, by ten pieces, and successively compares the obtained title data with the title data stored in the index file in the database 410. Among the obtained title data, the automatic communication processing unit 600 searches for title data that is coincident with the title and the date and time of registration corresponding to the title number stored in the reserve file 610. The automatic communication processing unit 600 then sends a title number allocated to the coincident title data to the communications host and requires transmission of text data corresponding to the title number.

For example, it is assumed that the title number 2 (title 'Crash on a highway' and its date and time of registration '8:41 am, March $1^{st}$') shown in FIG. 16(*a*) is stored as a reservation item in the reserve file 610 and that title data shown in FIG. 16(*b*) are transmitted from the communications host. Among the transmitted title data, title data having the title number 5 coincides with the title and the date and time of registration corresponding to the reserved title number 2. The automatic communication processing unit 600 accordingly sends the title number 5 to the communications host and requires transmission of text data corresponding to the title number 5.

As described previously, in case of the news service, data registered in the communications host are deleted sequentially in the order of oldness, and no intermediate data are deleted by ignoring the order of oldness. When the user wants to read text data regarding a plurality of titles, the above procedure of correcting the title number should be carried out only for one title. For the other titles, corrected title numbers to be transmitted to the communications host are obtained simply by adding the offset to the title numbers stored as reservation items in the reserve file 610.

For example, it is assumed that the title number 2 (title 'Crash on a highway' and its date and time of registration '8:41 am, March $1^{st}$') and the title number 4 (title 'C team won in the Asian Cup' and the date and time of registration '8:27 am, March $1^{st}$')shown in FIG. 16(*a*) are stored as reservation items in the reserve file 610. As discussed above, the title number 2 has changed to the title number 5 in the communications host. The offset representing the difference is equal to 3 (=5–2). Addition of the offset '3' to the reserved title number 4 gives the current title number 7 (=4+3) at the communications host, which corresponds to the reserved title number 4. The automatic communication processing unit 600 accordingly sends the title number 7 to the communications host and requires transmission of text data corresponding to the title number 7.

When going into the bulletin board service, the automatic communication processing unit 600 requires the communications host to transmit title data, obtains title data, for example, by ten pieces, and successively compares the obtained title data with the title data stored in the index file in the database 410. Among the obtained title data, the automatic communication processing unit 600 searches for specific title data that is coincident with the title and the identification number of the user (user ID) corresponding to the title number stored in the reserve file 610. The automatic communication processing unit 600 then sends a title number allocated to the specific title data to the communications host and requires transmission of text data corresponding to the title number.

FIGS. 27(*a*) through 27(*c*) show a procedure of reading text in the bulletin board service. FIG. 27(*a*) shows title data that have already been stored in the index file regarding the bulletin board service, and FIGS. 27(*b*) and 27(*c*) show title data transmitted from the communications host for the bulletin board service.

As discussed above, in case of the news service, determination of whether or not the title data transmitted from the communications host coincides with the title data stored in the index file is based on the title and the date and time of registration. In case of the bulletin board service, however, the communications host manages registration of data only by the date and not by the time. Namely it is impossible to carry out the determination based on the time of registration. Like in case of the news service, in case of the bulletin board service, data registered in the communications host are frequently updated and an extremely large number of data are registered in one day. It is accordingly difficult to carry out the determination based on only the date of registration as in case of the library.

In this embodiment, the determination is thus carried out according to the identification number of the user (user ID)

and the title as mentioned above. In case of the bulletin board service, neither the user ID nor the title itself is changed after registration, and no identical titles are given to the same ID.

By way of example, it is assumed that the title number 6 (title 'For Sale: ISDN-TA' and its user ID 'FFF66666') shown in FIG. 27(a) is stored as a reservation item in the reserve file 610 and that ten pieces of title data shown in FIG. 27(b) are transmitted from the communications host. None of the ten pieces of the transmitted title data coincides with the title and the user ID corresponding to the reserved title number 6. Here it is assumed again that the communications host subsequently transmits next ten pieces of title data shown in FIG. 27(c). This time, title data that is coincident with the title and the user ID corresponding to the reserved title number 6 exists among the next ten pieces of the transmitted title data. The automatic communication processing unit 600 accordingly sends the title number 17 allocated to the coincident title data to the communications host and requires the communications host to transmit text data corresponding to the title number 17.

In case of the news service, data registered in the communications host are deleted sequentially in the order of oldness, and no intermediate data are deleted by ignoring the order of oldness as mentioned above. In case of the bulletin board service, on the other hand, the data registered in the communications host can be freely deleted by the providers. When the user wants to read text data regarding a plurality of titles, correction of the title number for one title does not mean correction of title numbers for the other titles. In case of the bulletin board service, the above procedure of correcting the title number prior to the transmission to the communications host is required for each reserved title number.

In the bulletin board service, transmission of text data may be required to the communications host directly with a search command, other than through the above procedure. The search command enables a certain piece of text data in the communications host to be retrieved based on the title and the user ID and transmitted to the communications terminal.

The automatic communication is carried out in the above manner based on the reserve file 610.

1-5-3) Improvement in Efficiency of Automatic Communication

The automatic communication is carried out based on the contents stored in the reserve file 610 and the periodic access file 620 as discussed above. In each cycle of automatic communication, one possible method accesses the folders (services) according to the contents of one file and then accesses the folders (services) according to the contents of the other file. In case that the same folder name is stored as the target of access separately in both the reserve file 610 and the periodic access file 620, however, the communications terminal should go into the same folder twice with some interval of time. This is only waste of time. The same may occur in each of the reserve file 610 and the periodic access file 620. It is assumed that the communications terminal accesses the folders (services) in the sequence of storage in each file. For example, when the contents of the reserve file 610 are those shown in FIG. 26, the communications terminal goes into the service 'AISOFT Station' reserved as the third item, goes into the service 'Bulletin Board Service' reserved as the fourth item, and again goes into the service 'AISOFT Station' reserved as the fifth item. This undesirably consumes the time of communication.

In some cases, the same service name or the same folder name appears a plurality of times as targets of access in the reserve file 610 and the periodic access file 620. In such cases, access to the same service or the same folder many times in one cycle of automatic communication significantly lowers the efficiency of communication. In order to improve the efficiency of automatic communication, in case that the same service name or the same folder name is stored a plurality of times as targets of access in the reserve file 610 and the periodic access file 620, the structure of the embodiment sorts out the contents of storage and completes all the required processes in the service or the folder by one access.

Figure 28:
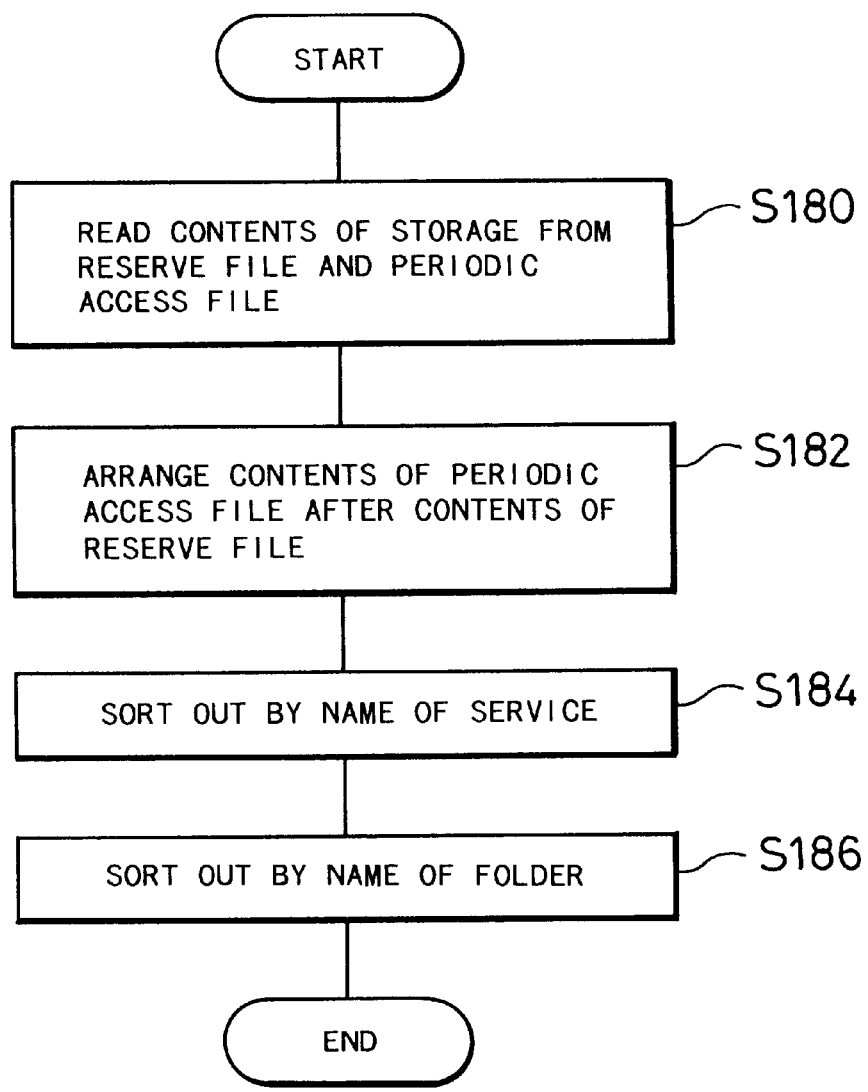
FIG. 28 is a flowchart showing a routine of improving the efficiency of access carried out in the course of automatic communication.

This embodiment carries out a procedure of improving the efficiency of access in automatic communication as discussed below. FIG. 28 is a flowchart showing a routine of improving the efficiency of access carried out in the course of automatic communication. In case of automatic communication based on both the reserve file 610 and the periodic access file 620, the automatic communication processing unit 600 first reads the contents of storage from the reserve file 610 and the periodic access file 620 at step S180 in the routine of FIG. 28. The sorting element 600a of the automatic communication processing unit 600 arranges the contents read from the periodic access file 620 after the contents read from the reserve file 610 at step S182. This arrangement ensures that the contents of the reserve file 610 are always prior to the contents of the periodic access file 620 even after the sorting-out operation discussed below. At the same target of access (the same service name or the same folder name), the processing according to the contents of the reserve file 610 is thus always carried out prior to the processing according to the contents of the periodic access file 620.

The sorting element 600a then sorts out the contents at steps S184 and S186. In accordance with a concrete procedure, the sorting element 600a first sorts out the contents by the name of services at step S184, in order to minimize the number of shifts from a service to another service with the 'GO' command. The sorting element 600a then sorts out the contents by the name of folders at step S186, in order to minimize the number of shifts from a folder to another folder included in the same service (that is, the number of going in and out the menu). The automatic communication processing unit 600 exits from the routine after sorting out the contents read from the periodic access file 620 and the reserve file 610.

The automatic communication processing unit 600 carries out the following operation in addition to the above sorting-out operation. For the contents read from the periodic access file 620, the automatic communication processing unit 600 reads the date of previous access to the respective folders in each service from the corresponding folder list index file in the database 410. In case that there is any folder for which the preset days of interval of access has not yet elapsed, the folder is omitted from the targets of access in the current cycle of automatic communication. It is assumed that the same target of access (that is, the same service name and the same folder name) is found in the contents of the reserve file 610 and those of the periodic access file 620. When the required process based on the reserve file 610 at the target of access is an operation accompanied with update of titles, such as 'read text', and the required process based on the periodic access file 620 at the target of access is an operation, such as 'read titles', the same operations are carried out twice. The process based on the periodic access file 620 is omitted in such a case.

FIG. 29 shows the contents of access sorted out by the routine of improving the efficiency of access shown in the flowchart of FIG. 28. Referring to FIG. 29, the double-circle mark represents the contents of the reserve file 610 to be accessed by the current cycle of automatic communication, whereas the single-circle mark represents the contents of the periodic access file 620 to be accessed by the current cycle of automatic communication. The '<' mark represents the contents of the periodic access file 620 that are omitted from the targets of access since the preset interval of access has not yet elapsed, and the 'x' mark represents the contents of the periodic access file 620 that are omitted from the targets of access since the required process is identical with that based on the reserve file 610.

FIG. 30 shows a communication history of automatic communication carried out according to the contents of access shown in FIG. 29. Automatic communication is started by a log-in operation and goes into each service with the 'GO' command. In the service, the automatic communication accesses the respective folders according to the menu numbers and carries out the required processing at each target of access. The automatic communication is terminated by a log-out operation.

Not only when the titles have been updated according to the contents in the periodic access file 620 but also when a process accompanied with update of titles, such as 'read text', has been carried out according to the contents in the reserve file 610, the date of previous access to the corresponding folder in the folder list index file should be replaced by the date of the current cycle of automatic communication. Even when periodic access to the folder has been specified for the process 'read titles', this structure allows a next access to the folder only after the preset days of interval of access has elapsed since the date of the current cycle of automatic communication. This effectively prevents the wasteful periodic access.

1-5-4) Addition and Display of New Incoming Mark

In case of manual communication, the user looks at the display on the monitor 76 and directly gives instructions in the course of communication. Namely it is fair to assume that the user has already read data obtained from the communications host and written into the database 410 through manual communication. In case of automatic communication, on the other hand, the user may not look at the display on the monitor 76 in the course of communication. For example, the automatic communication can start with a timer, irrespective of the absence of the user. Even when the user looks at the display on the monitor 76 and directly gives an instruction to start automatic communication, it is practically impossible to check and read data obtained from the communications host on the monitor 76 during the automatic communication. Namely it can be assumed that the user has not yet read data obtained from the communications host and written into the database 410 through automatic communication.

It is, however, difficult to distinguish data newly obtained by the current cycle of automatic communication from the existing data, once the data newly obtained from the communications host in the course of automatic communication have been written into the database 410. When the user wants to check the newly obtained data on the monitor 76 off line after the end of automatic communication, the user has no way of knowing which services, which folders, and which titles have new data.

In this embodiment, when new data have been obtained from the communications host during automatic communication, the new incoming mark adding element 100d of the access management unit 100 adds a new incoming mark, which represents new data, to a folder or a title related to the new data. The writing element 100a then writes the new data with the new incoming mark into the database 410 via the data management unit 400. In accordance with a concrete procedure, a new incoming folder mark '+' is added to the corresponding folder in the folder list index file as shown in FIG. 5 and a new incoming title mark '+' is added to the corresponding title in the index file as shown in FIG. 7.

The new incoming mark enables the data newly written in the database 410 to be distinguished from the existing data. When the user checks the newly obtained data on the monitor 76 off line, the new incoming mark informs the user which services, which folders, and which titles have new data.

The way of adding the new incoming mark varies with the type of the processing carried out in the automatic communication. For example, when the process carried out in the automatic communication is to 'read text', the new incoming folder mark is added to the corresponding folder and the new incoming title mark is given to the newly obtained title itself.

When the process carried out in the automatic communication is to 'read only titles', on the other hand, the new incoming folder mark is added to the corresponding folder whereas no new incoming title mark is given to the newly obtained title. In case that the required process is to 'read only titles', addition of the new incoming title mark to the newly obtained title undesirably slows the progress of a new incoming tour discussed later. In some services and folders, however, only a small number of titles are obtained and addition of the new incoming title mark does not significantly affect the progress of the new incoming tour. In such cases, the new incoming title mark may be given to the title.

The following describes the process of informing the user of transmission of new data from the communications host with the new incoming mark.

On the initial stage of offline display on the monitor 76 after the end of automatic communication, there are specific displays in a main menu window, the service selection window, and the folder window, in order to inform the user of the fact that new data have been transmitted through automatic communication.

In case of the main menu window, the new incoming mark retrieving element 100e of the access management unit 100 requires the data management unit 400 to retrieve folders with the new incoming folder mark among all the folders stored in the database 410. In accordance with a concrete procedure, the access management unit 100 searches for folders with the new incoming folder mark '+' out of all the folder list index files. When finding a specific folder with the new incoming folder mark, the access management unit 100 requires the user I/F unit 200 to underline the name of the service including the specific folder by a prominent color, for example, yellow, in the main menu window displayed on the monitor 76.

Figure 31:
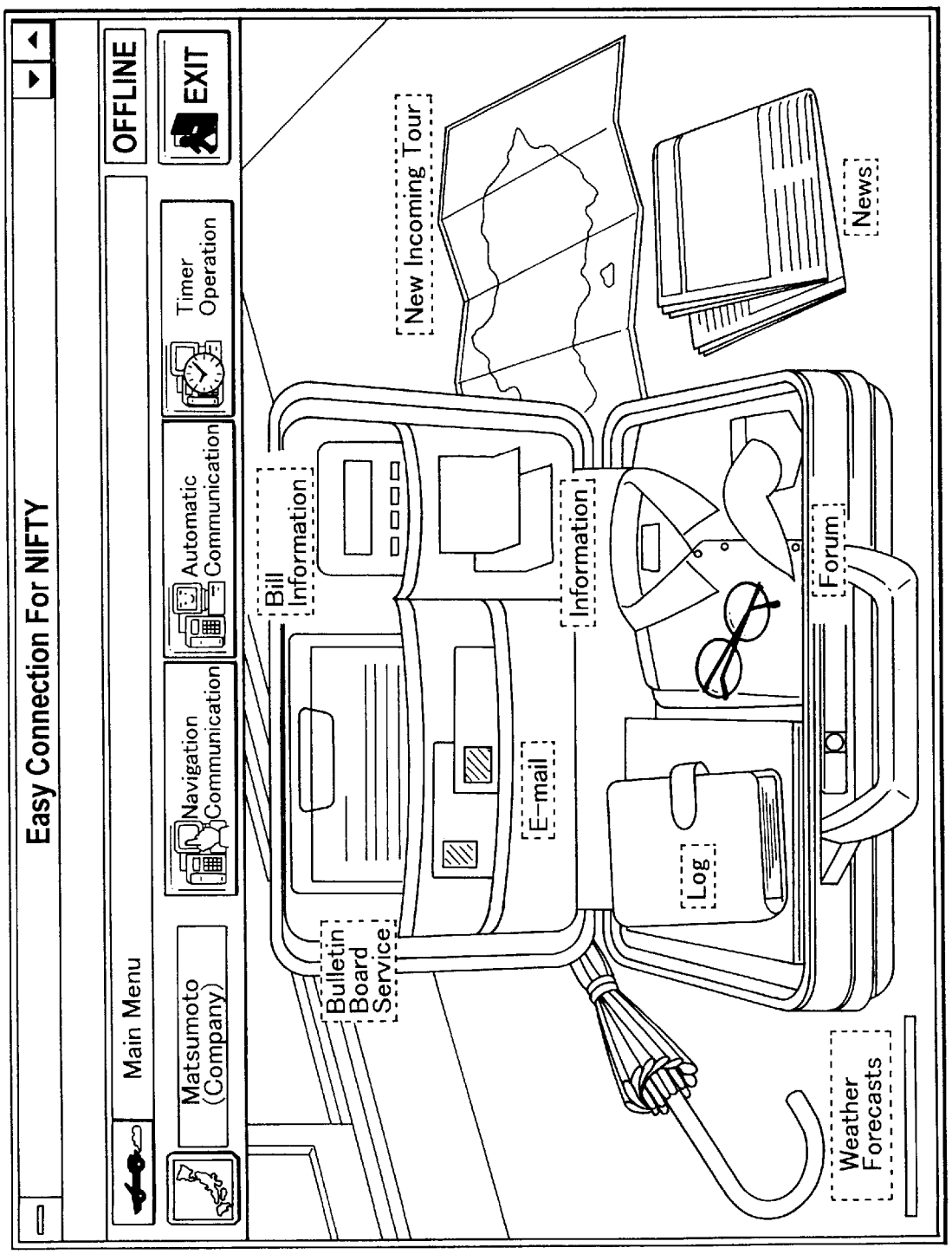
FIG. 31 shows the main menu window displayed on the monitor 76 as an example.

FIG. 31 shows the main menu window displayed on the monitor 76 as an example. The main menu window shown in FIG. 31 includes primary services supplied by the communications terminal of the embodiment as pictures. The name of the service having new data obtained through automatic communication (the service 'Weather Forecasts' expressed as the picture of umbrella in the example of FIG. 31) is underlined by a prominent color.

In case of the service selection window, the access management unit 100 retrieves folders with the new incoming folder mark among all the folders stored in the database 410. When finding a specific folder with the new incoming folder mark, the access management unit 100 gives the '+' mark to the service including the specific folder in the list of services SL displayed on the left side of the service selection window and gives the '+' mark to the specific folder in the list of folders FL displayed on the right side of the service selection window as shown in FIG. 3.

In case of the folder window, the access management unit 100 retrieves titles with the new incoming title mark among all the titles stored in the database 410. In accordance with a concrete procedure, the access management unit 100 searches for titles with the new incoming title mark '+' out of the index file regarding the specific folder with the new incoming folder mark. When finding a specific title with the new incoming title mark, the access management unit 100 gives the '+' mark to the specific title in the folder window displayed on the monitor 76.

In this manner, on a first display on the monitor 76 after the end of automatic communication, the user can readily check which services, which folders, and which titles have new data obtained through automatic communication.

1-5-5) New Incoming Tour

The following describes a new incoming tour. The new incoming tour is a function of sequentially displaying data which have newly obtained through automatic communication and have not yet been read by the user (new incoming data) on the monitor 76 off line after the end of automatic communication. Namely the new incoming tour automatically visits only the new incoming data.

Figure 32:
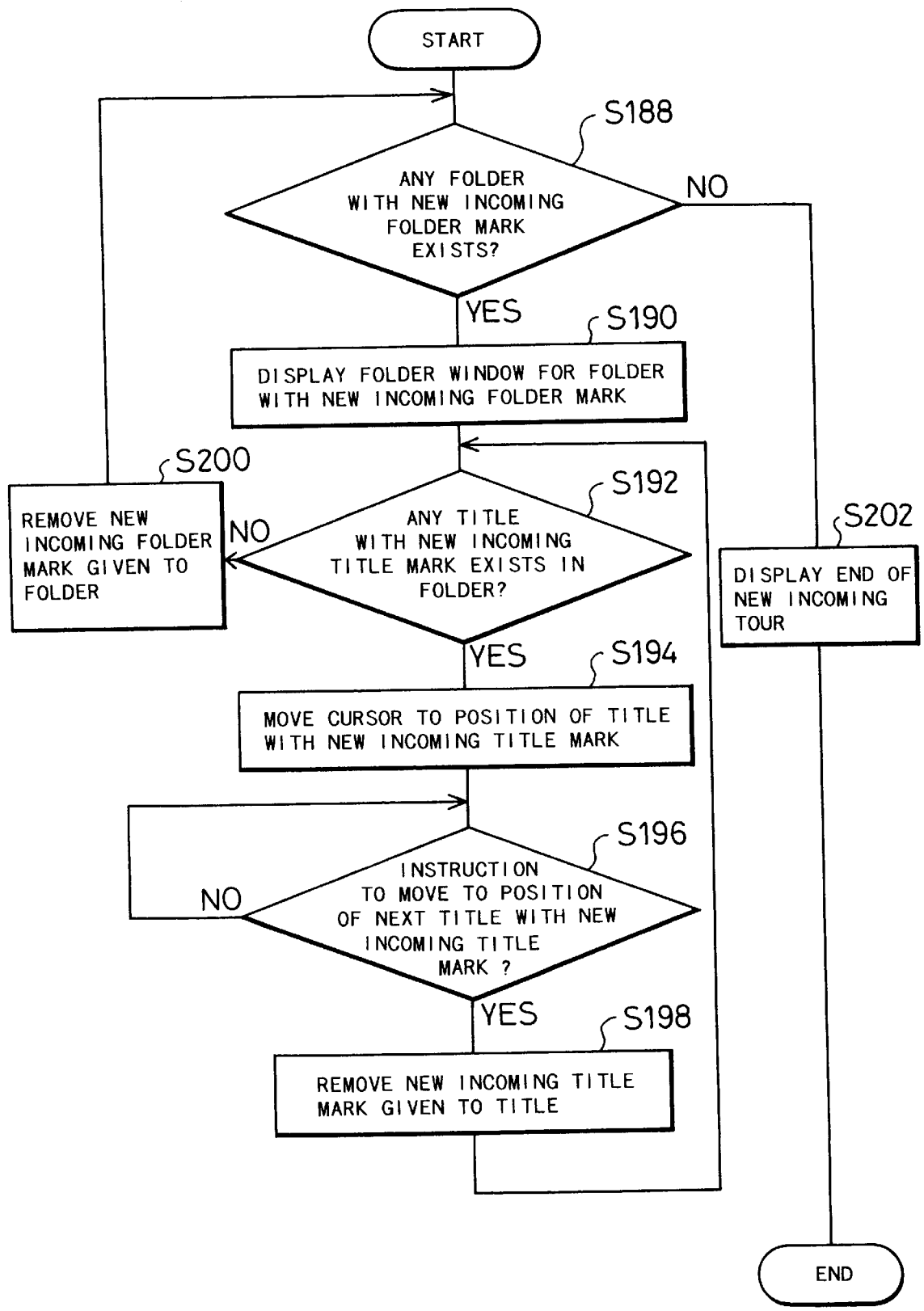
FIG. 32 is a flowchart showing a new incoming tour routine.

FIG. 32 is a flowchart showing a new incoming tour routine. When the user instructs a new incoming tour through operation of the keyboard 72 and the mouse 73, the access management unit 100 starts the routine of FIG. 32. The new incoming tour is carried out only for the services including folders with the new incoming folder mark in the sequence of appearance in the list of services SL displayed on the left side of the service selection window of FIG. 3.

The access management unit 100 first reads a folder list index file, which is related to a service including a folder with the new incoming folder mark, from the database 410 and determines whether or not a folder with the new incoming folder mark exists in the folder list index file at step S188. In case that the folder with the new incoming folder mark exists, the folder window for the folder is displayed on the monitor 76 at step S190. The access management unit 100 then reads an index file regarding the folder from the database 410 and determines whether or not a title with the new incoming title mark exists in the index file at step S192.

In case that the title with the new incoming title mark exists, the cursor moves to the position of the title in the folder window displayed on the monitor 76 at step S194. This informs the user of the title of new incoming data. At this moment, when the user gives an instruction to display text with respect to the title, the text is displayed on the monitor 76 as long as text data have already been transmitted through automatic communication.

The access management unit 100 waits until the user instructs to jump to the position of the title of next new incoming data at step S196. In response to a jumping instruction from the user, the access management unit 100 removes the new incoming title mark given to the title in the index file at step S198 and returns to step S192 to determine whether or not any other title with the new incoming title mark exists in the index file regarding the folder.

When the determination at step S192 proves that all the new incoming title marks have already been removed in the index file regarding the folder and that there are no more titles with the new incoming title mark, the access management unit 100 removes the new incoming folder mark given to the folder in the folder list index file at step S200 and returns to step S188 to determine whether or not any other folder with the new incoming folder mark exists in the folder list index file.

When no more folders with the new incoming folder mark exist in all the services including the folders with the new incoming folder mark, the access management unit 100 displays an end of new incoming tour on the monitor 76 at step S202, so as to inform the user of conclusion of the new incoming tour shown in FIG. 32.

As discussed above, the new incoming tour automatically displays the new incoming data, which have been obtained through automatic communication and have not yet been read by the user, on the monitor 76 without requiring the user to search for the new incoming data in the database 410. This significantly improves the convenience.

The above embodiment refers to the personal computer communications service as an example. The principle of the embodiment is, however, not restricted to the personal computer communications service but is applicable to other value-added network (VAN) services, such as Videotex.

2) Communications Terminal for the Internet

The above embodiment regards the communications terminal for receiving the personal computer communications service. The principle of the present invention is also applicable to the communications terminal for participating in the Internet, the latest communication medium. The communication tools available in the Internet include Electronic Mail (E-mail), Usenet, File Transfer Protocol (FTP), Telnet, and World Wide Web (WWW, the Web).

2-1) Usenet

The communications terminal of the present invention can participate in Usenet on the Internet. Usenet implies mutual communication with many and unspecified participants via the electronic bulletin board on the Internet. There are many newsgroups in Usenet. The newsgroups correspond to forums (SIGs) in the personal computer communications service, and over ten thousand newsgroups exist on the Internet.

The communications terminal participating in Usenet has the structure shown in FIG. 1 and carries out the operations similar to those discussed above in the personal computer communications service, except some difference. The following describes difference between the procedure for Usenet and that for the personal computer communications service.

Usenet is divided into thousands of newsgroups on various levels of the hierarchical structure. As an example, it is assumed that there are newsgroups 'aisoft.general', 'aisoft.comp.pc98', and 'aisoft.comp.dosv' as shown in FIG. 33(a). These newsgroups are all included in a newsgroup 'aisoft'. The newsgroup 'aisoft' includes two newsgroups 'general' and 'comp', and the newsgroup 'comp' further includes two newsgroups 'pc98' and 'dosv'.

As discussed previously, when the communications terminal goes into the forum service in the personal computer communications service, the directory 'forum' is created in the database 410. On the lower level of the directory 'forum', there are a number of directories regarding the respective forums, in which data obtained from the respective forums are sorted out and managed as shown in FIG. 4. Usenet on the Internet has a deeper hierarchical structure as mentioned above and the directory tree in the database 410 has many levels, on which data are sorted out and managed topically into the newsgroups. For example, the newsgroups shown in FIG. 33(a) build a directory tree in the database 410 as shown in FIG. 33(b).

Instead of the index file for managing titles in each forum in the personal computer communications service, an index file for managing various articles in Usenet is created and stored in each directory.

2-2) WWW (the Web)

The communications terminal of the present invention can utilize the Web on the Internet. The Web enables the user to readily retrieve information including text and graphics via a hyperlink with the keywords.

The communications terminal using the Web has the structure shown in FIG. 1 and carries out the operations similar to those discussed above in the personal computer communications service, except some difference attributable to the unique characteristics of the Web. The following describes difference between the operations with the Web and those for the personal computer communications service.

Data on the Web are constructed basically as hypertext data written in a language called HTML (HyperText Markup Language). The hypertext data consists of pages, wherein one page corresponds to one file. The hypertext data are stored as files in Web servers connected to the Internet. Image data including still pictures and moving pictures, sound data, and a variety of program data other than the hypertext data are stored in each Web server.

The communications terminal accesses each Web server on the Internet and receives hypertext data stored in the Web server. A software-based mechanism of the communications terminal called a browser enables the hypertext data to be displayed on the monitor 76. The hypertext data has specific information called a link in each page. The link relates a keyword in the page to another page. This link mechanism enables the user to immediately jump to a related page only by clicking a keyword in the page displayed on the monitor 76 with the mouse 73.

All the objects (for example, data files) on the Internet have unique addresses expressed unequivocally by URLs (Uniform Resource Locators). For example, the URL 'http://www.epson.co.jp/index.htm' refers to that the file 'index.htm' exists in the Web server 'www.epson.co.jp'. The Web addresses begin with 'http', which is a protocol generally used in the Web.

Tags enclosed in angle brackets are included in the hypertext data written in HTML. These tags are used to specify character attributes, such as underlines, the display method of images, links and so on.

FIG. 34 shows hypertext data written in HTML as an example. The method of specifying a link is described according to FIG. 34. It is assumed that the hypertext data shown in FIG. 34 are stored in the Web server 'www.epson.co.jp'.

On the m-th line in FIG. 34, the code enclosed by <A> and </A> represents a specification of the link (called an anchor in HTML). The code HREF="/epson/index/index.htm" refers to a destination of the link and instructs to display the contents of the file 'epson/index/index.htm' by a click. The code '/epson/index/index.htm' specifies a path in the Web server and refers to the location of the file in the Web server 'www.epson.co.jp'.

The code <IMGSRC="/epson/image/haruj.gif"> instructs to display the contents of the image file '/epson/image/haruj.gif'. The code <P> refers to a new paragraph.

The specification of the link may be carried out not only within the Web server but to another Web server. On the n-th line in FIG. 34, the code HREF="http://www.aisoft.co.jp/index.htm" refers to a specification of the link in an external Web server and instructs to connect to the Web server 'www.aisoft.co.jp' and display the contents of the file 'index.htm'.

2-2-1) Input of Hypertext Data

The following describes a procedure of obtaining hypertext data stored in the Web server in the embodiment. In order to access the Web server, the user generally connects with a pre-registered Internet service provider via a public communication line with the mode 92 and then communicates with the Internet via the Internet service provider.

When the user instructs a connection to the Internet through operation of the keyboard 72 and the mouse 73, the access management unit 100 telephones the Internet service provider via the communication control unit 300, in order to connect with the Internet via the provider. When the user instructs to obtain hypertext data stored in a desired Web site, the access management unit 100 requires the Web server to transmit data via the communication control unit 300.

When the user instructs to obtain the data, the user can specify the address of the desired data, the link level of the data, and the type of the data. The process of specifying the address includes the specification of the Web server like 'http://www.aisoft.co.jp. as well as a particular page in the Web server. The specification of the link level determines the level of the link to be traced, and may be numerical, such as down to the three levels, or non-numerical, such as down to the lowest levels within the specified Web server. Not only link data to a next page but also image data and sound data can be pasted in one page. A reference for transferring the file itself, such as FTP, may also be included in a page. The user can accordingly specify whether or not each particular type of data is to be received. Specification of the upper limit of data size allows input of only small-sized data.

The access management unit 100 receives the hypertext data specified as above and transmitted from the Web server via the communication control unit 300 and stores the input hypertext data into the database 410 via the data management unit 400. The access management unit 100 sorts out and arranges the input hypertext data as discussed later, prior to writing the data into the database 410.

After receiving the hypertext data from the desired Web server and writing the hypertext data into the database 410, the access management unit 100 cuts the connection to the Internet via the communication control unit 300. The access management unit 100 then reads the data from the database 410 via the data management unit 400 off line, and uses the function of the browser to display the data on the screen of the monitor 76 via the user I/F unit 200. This enables the user to browse the data in an identical manner, irrespective of the connection with or disconnection from the Internet.

The primary merit of this operation makes the time of communication substantially identical with the time of data transfer. This allows the effective use of the communication line and saves the connection fee to the Internet service provider and the communication fee for the public communication line.

Data stored in the database 410 may be transferred to another personal computer which is not connected to the communication line, for the purpose of browsing. The user can thus check and read the contents of data at any place apart from the communication line (for example, on the train).

Automatic communication may be applied to the Web service as well as the personal computer communications service discussed above. By way of example, the communications terminal may automatically be connected to the Internet at the hour preset by the timer 68 and receive the desired data.

In general, both the connection fee and the communication fee are based on the time zone, and the lowest fees are set as the late night discount. In order to save the cost, it is thus preferable to receive data not in the daytime but at late night. The connection to the Internet service provider is also easy at late night. When the user sets automatic communication at a specific hour of the late night, the communications terminal automatically receives data from a desired Web server without any manual operation of the user.

The automatic communication is typically scheduled for a particular hour of a particular day, but maybe set, for example, for a particular hour every day or for a particular hour every Monday. The user can also set different schedules for different Web servers to be connected.

2-2-2) Storage of Input Data into Database and Display of Data

The access management unit sorts out and arranges the hypertext data obtained from a desired Web server by taking into account the links of the respective pages, prior to writing the hypertext data into the database 410.

By way of example, it is assumed that the respective pages have links as shown in FIG. 35(a). The home page is linked with pages A, B, and C, which are subsequently linked with A-1, A-2, B-1, C-1, and E and further with A-3, D, and E.

The files of the respective pages are stored in a certain Web server to reflect these links. Namely the pages of and after A are registered in the Web server as shown in FIG. 35(b).

In this case, the access management unit reads the URL attached to each page of the data obtained from the Web server, and writes the input data into the database 410 while keeping the directory tree in the Web server shown in FIG. 35(b) based on the URL.

Instead of the standard procedure of writing the data into the database 410 while keeping the directory tree in the Web server, the access management unit may write the data into the database 410 in such a manner that the database 410 will be flatly structured irrespective of the directory tree. For example, all the input data may be stored in a directory '¥LOCAL' as shown in FIG. 35(c). Under the latter condition, in case that the same file name exists in a different directory in the Web server, either of the file names should be changed. For example, when the pages A-2 and A-3 have an identical file name 'A-2.html' as shown in FIG. 35(d), the name of the file to be written later should be changed, for example, to 'A-2_00.html' before storage.

Note the following points when the hypertext data obtained from the Web server are written into the database 410. In many cases, the specification of links is included in the received hypertext data as discussed above. The destination of the link is defined by the Internet address of the linked file. In order to write the hypertext data into the database 410, it is required to rewrite all the destinations of the links to the writing addresses of the linked files in the database 410.

The URL referring to the destination of the link may specify a file on a local hard disk. For example, when the drive 'C' represents the hard disk 84 in which the database 410 is stored, the file '¥Epson¥index.htm' written in the database 410 can be expressed by the URL 'file:///C|/Epson/index.htm'.

By way of example, when the hypertext data shown in FIG. 34 are written into the database 410, the code 'HREF' is replaced by the writing address of the linked file as shown in FIG. 36. Rewriting all the destinations of the links enables all the links to be stored in the database 410. When the stored links include a link to a non-accessed Web server, no rewriting is required for such a link, prior to storage.

As discussed previously, the access management unit reads the hypertext data from the database 410 via the data management unit and utilizes the function of the browser to display the data on the screen of the monitor 76 via the user I/F unit 200. The user can sequentially look at the respective pages according to the links off line, in the same manner as that carried out on line. In the example of FIG. 35(a), the access management unit first displays the home page and then jumps to the linked pages A, B, and C, and further to the subsequent linked pages. A link to a non-accessed Web server is not rewritten but remains unchanged, so that the user can look at the data on line. This structure enables the user to read the contents of data without being specifically conscious of the position of the data.

The communications terminal of this embodiment enables a display representing the general structure of data stored in the database 410 other than a display like the standard browsing window as discussed above. In this case, the general structure of the storage data may be displayed according to the directory tree in the database 410, but is generally displayed according to the actual links.

FIGS. 37(a) and 37(b) show a display on the monitor 76 when storage data in the database 410 are shown in the form of a tree. The display of FIG. 37(a) shows that the home page 'A.I.SOFT Home Page' exists on the top level and is linked to the page 'A.I.SOFT English Home Page'. Image and sound data embedded in each page can be expressed in a similar manner, like 'aisoft/image/title/gif' shown in FIG. 37(b). This enables a display representing types of data included in each page.

Figure 37:
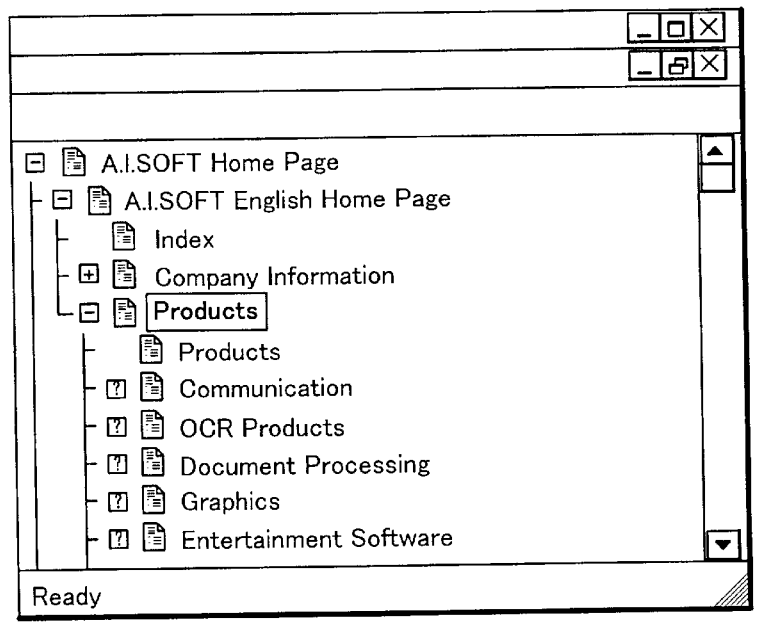
FIGS. 37(a) and 37(b) show a display on the monitor 76 when storage data in the database 410 are shown in the form of a tree.
Figure 37:
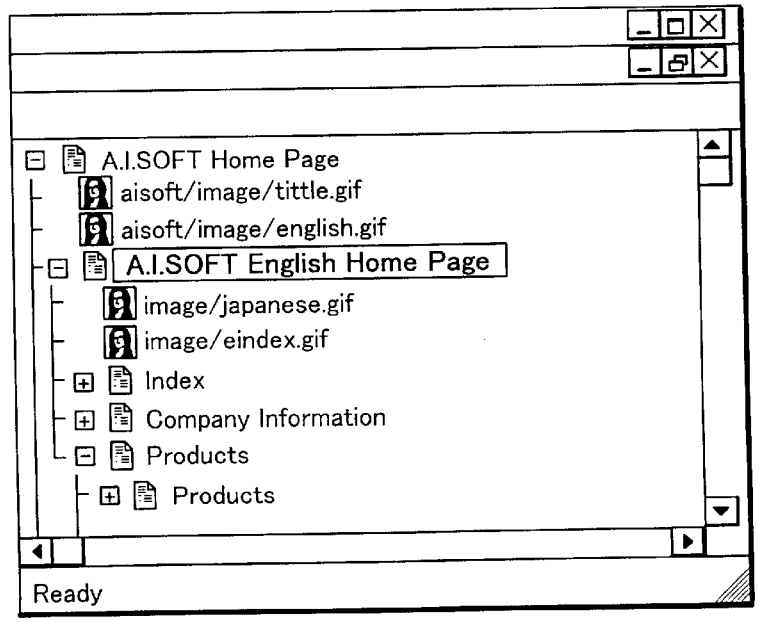

On the screen of FIG. 37, the mark '−' represents a page having no destination of a further link, whereas the mark '+' represents a page having a destination of a further link. The user sequentially clicks the page names having the '+' mark with the mouse 73, so that the page names of the destinations of the links are displayed successively.

When the user wants to browse a particular page, the user specifies the page with the mouse 73 and gives a browsing instruction. The access management unit 100 then utilizes the browsing function to display the page on the screen of the monitor 76. The user can also retrieve a page including particular series of characters or data, in order to realize the efficient browsing. The space on the left side of the screen shown in FIG. 37 can be used for commentary or memorandum, for example, with a view to managing the date and time of accesses.

The tree-like display representing the links of the respective pages stored in the database 410 enables the user to readily grasp the general structure of storage data and efficiently carry out the browsing off line.

The flat display shown in FIG. 38 may be adopted instead of the tree-like display shown in FIG. 37. Both FIGS. 38(a) and 38(b) show displays on the monitor 76 utilizing the function of the browser. On the screen of FIG. 38, each underlined portion represents a place in which the link is embedded. When the user clicks the underlined portion with the mouse 73, the display jumps to the linked page.

On the screen of FIG. 38(a), the respective pages on the immediate lower level are arranged under the title name of 'A.I.SOFT English Home Page'. Instead of the pages on the immediate lower level, all the pages on different levels may be arranged together and displayed at one time.

When the user is interested in a particular page stored on a lower level in a specific Web server, the contents of the display on the screen of the monitor 76 may be customized as shown in FIG. 38(b), in order to enable the user to readily access and look at the data of the page written in the database

410. In the example of FIG. 38(*b*), a list of only the preset page names is displayed on the screen, in order to enable the user to readily open these pages.

The contents of a page (hypertext data) supplied by a specific Web server, such as a newspaper, are updated every data to include the latest news. In case that the hypertext data are obtained from such a Web site and written into the database 410, the old hypertext data are successively overwritten by the updated hypertext data and thereby erased. The user may, however, check the contents of the hypertext data together for one week or desire to leave some of the old hypertext data. In such cases, it is desirable not to erase the old hypertext data but to store both the old and new hypertext data.

The following describes a method of realizing the function of storing and managing both the old and new hypertext data. Storage of both the old and new hypertext data can be realized by writing these data into different directories in the database 410.

Figure 39A:
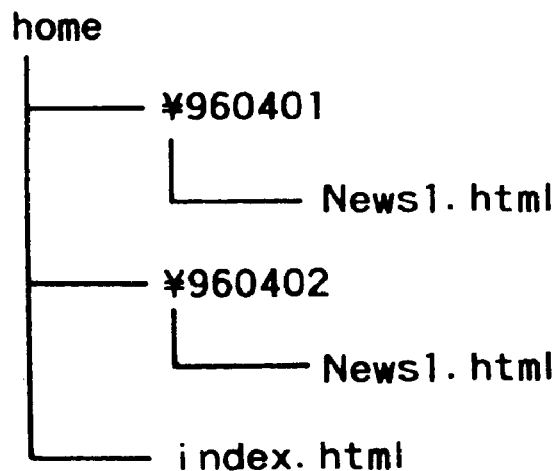
FIGS. 39(a) and 39(b) show directory structures in the database 410 as examples.
Figure 39B:
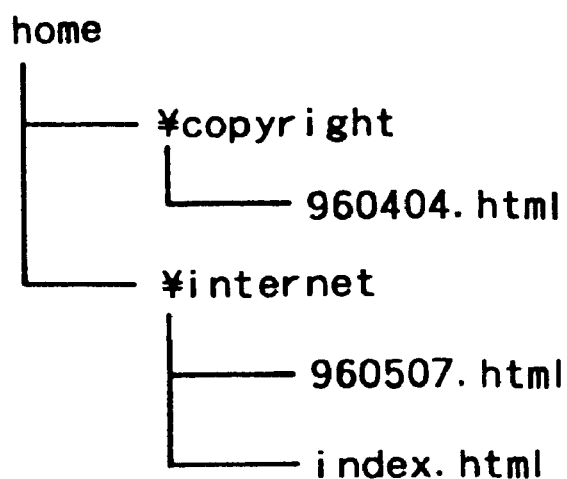

FIGS. 39(*a*) and 39(*b*) show directory structures in the database 410 as an example. For example, as shown in FIG. 39(*a*), directories of the respective dates are created in the database 410, and the input hypertext data are stored in the directories of the corresponding dates every day.

In case that the contents of almost all the pages stored in the Web server are updated every day, all the required pages in the Web server are stored into the directory of the day or the directories on the lower level in the database 410. In case that only part of the pages stored in the Web server are updated every day, data of the day are compared with the data of the previous day. When there is no change in a page that is a destination of the link, a typical procedure does not newly store the page but changes the destination of the link to the page that has been written previously.

Another possible procedure does not refer to pages obtained from a specific Web server, but classifies only pages including a preset keyword by the dates and stores the required pages into the directories of the respective dates.

Still another possible procedure classifies pages not by the dates but by the keywords as shown in FIG. 39(*b*). In this case, directories of the respective keywords are created in the database 410 and pages including the keywords are stored in the corresponding directories. This structure enables the user to browse the contents regarding a particular topic according to the time sequence.

When the hypertext data obtained from a Web server are classified and sorted out by the dates or by the keyboards and written into the database 410, an index page or hypertext data used as an index representing links to the respective dates or keywords is created independently (for example, 'index.html' shown in FIGS. 39(*a*) and 39(*b*)). The function of the browser displays the index page on the screen of the monitor 76 and enables the user to readily access the page corresponding to each day or each keyword.

The method of classifying and sorting out the received data by the dates or by the keywords and writing the classified data into the database 410 and the display of an index window that allows the classified files to be read out are applicable to the personal computer communications service discussed above, other than to the Internet communication. In this case, the data obtained from the communications host are classified and sorted out by the respective communication services supplied by the communications host as well as by the dates or keywords, and are written into the database 410. An index window including a list of dates or a list of keywords is displayed on the monitor 76. When the user specifies desired data in the index window, the data are read from the database 410 and displayed on the screen of the monitor 76.

2-2-3) Monitor of Data Update with respect to Web Server

It is assumed that the user is specifically interested in information supplied by a particular Web server on the internet (for example, information on new products given by a particular manufacturer). In case that the contents of information supplied by the particular Web server are added or changed, the user naturally desires to obtain the updated information as soon as possible.

In such a case, however, manual communication which requires the user to periodically access the particular Web server, to look at the information supplied by the Web server, and to determine whether or not the contents of information have been changed, undesirably takes time and labor. As Web servers that supply interesting information increase in number, the required operation consumes so much labor and is practically impossible.

In this embodiment, automatic communication is thus adopted to monitor a change of information supplied by the particular Web server. The function of periodic access described in the personal computer communications service is utilized for that purpose.

The automatic communication processing unit 600 registers a Web server to be monitored, which has been specified by the user, into the hard disk 84. The automatic communication processing unit 600 periodically accesses the registered Web server through automatic communication and checks whether or not data or information stored in the Web server has been changed.

An update of the desired data is checked with the function of the HTML protocol. The HTML protocol can obtain attributive information, for example, the date and time of update, attributed to body data, such as hypertext data, without reading the body data from the Web server. The date and time of latest update of the file is recommended as the date and time of update used in the HTML protocol. The automatic communication processing unit 600 compares the date and time of latest access previously stored with the date and time of latest update and thereby determines whether or not the data stored in the Web server has been updated.

In case that the hypertext data obtained from the Web server does not include the attributive information representing the date and time of update, the automatic communication processing unit 600 calculates a check sum from the received hypertext data and stores the value of the check sum. On each access to the Web server, the automatic communication processing unit 600 receives data from the Web server, calculates a check sum, and compares the calculated check sum with the stored value, thus determining whether or not the data has been updated.

The check for an update of the data is typically carried out by each page. A possible application may check a change in particular portion of a page as well as a change in data of a linked page.

The communications terminal that can monitor an update of data stored in a particular Web server will be described later in detail as another embodiment.

3) Data-Update Monitor Server

Although the communications terminal can monitor an update of the data stored in a particular Web server as discussed above, a data-update monitor server may be connected to the Internet and used specifically for the purpose.

3-1) Structure of Data-Update Monitor Server of Second Embodiment

Figure 40:
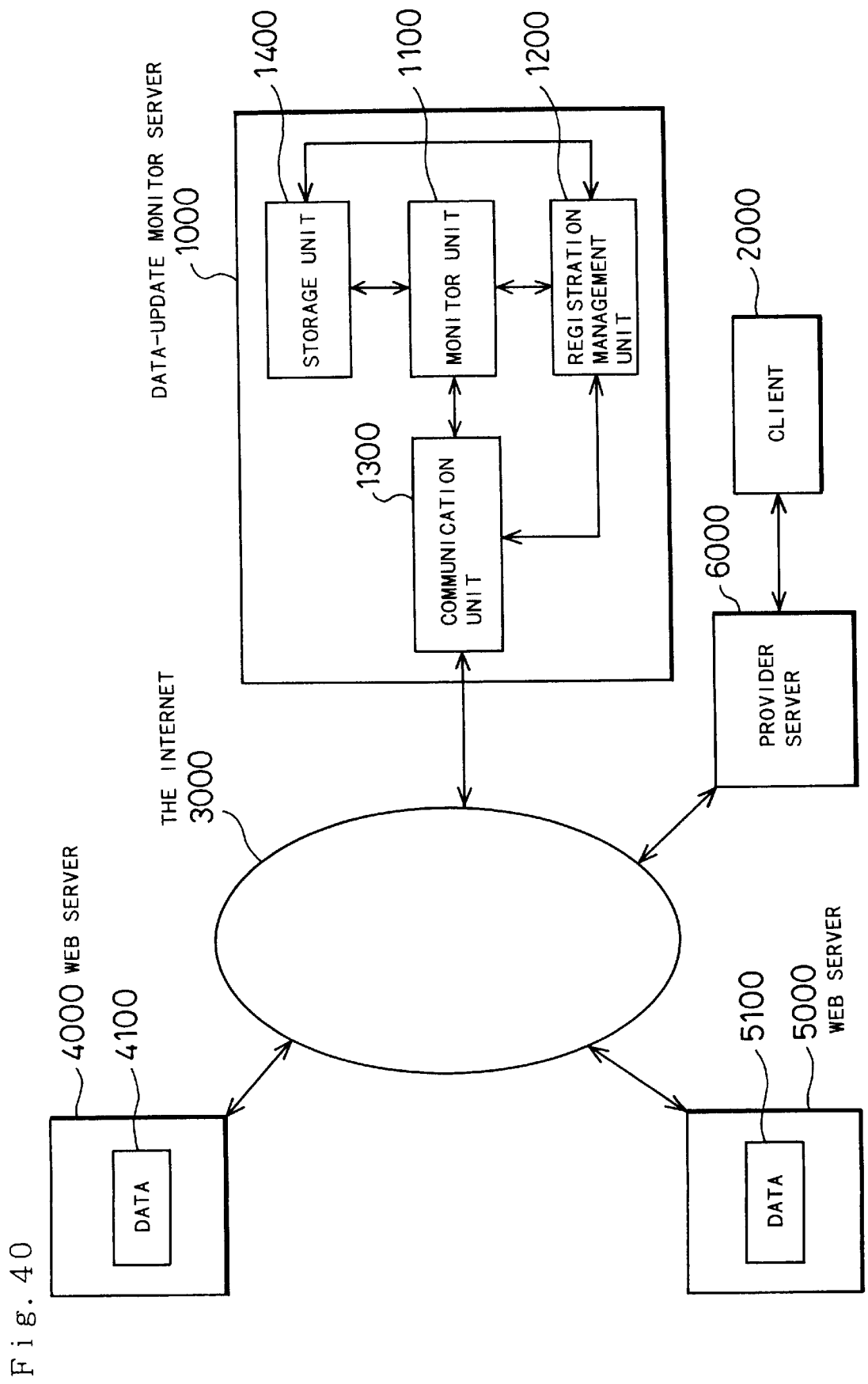
FIG. 40 is a block diagram illustrating structure of a data-update monitor server as a second embodiment according to the present invention.

FIG. 40 is a block diagram illustrating structure of a data-update monitor server 1000 as a second embodiment according to the present invention. Referring to FIG. 40, the data-update monitor server 1000 as well as other Web servers 4000 and 5000 are connected to the Internet 3000. A client 2000 constructed as the communications terminal is connected to the Internet 3000 via a provider server 6000. Namely the data-update monitor server 1000 and the client 2000 are mutually connected to each other via the Internet 3000.

The data-update monitor server 1000 includes a monitor unit 1100 for monitoring an update of data 4100 and 5100 stored in the Web servers 4000 and 5000, a registration management unit 1200 for registering URLs representing addresses of data to be monitored, a communication unit 1300 for communicating with the client 2000 and the Web servers 4000 and 5000 via the Internet 3000, and a storage unit 1400 for storing information on registered addresses and data obtained from the Web servers 4000 and 5000. The data 4100 and 5100, such as hypertext data, are stored in the Web servers 4000 and 5000, respectively.

The data-update monitor server 1000 is constructed as the computer shown in FIG. 2, and the respective blocks in the data-update monitor server 1000 shown in FIG. 40 include portions realized by the hardware and those realized by the software.

The software has been stored in the form of applications programs in the hard disk 84 shown in FIG. 2. When the user gives an instruction of activation, the operating system is activated to read required applications programs from the hard disk 84 to the main memory 25. This realizes the data-update monitor server 1000 shown in FIG. 40, wherein the hardware and the software are integrated with each other.

In case that the applications programs are recorded in a CD-ROM 85 shown in FIG. 2, the applications programs are read from the CD-ROM 85 inserted into the CD-ROM drive 83 and transferred to the main memory 25. In case that the applications programs are recorded in a floppy disk 81 shown in FIG. 2, the applications programs are read from the floppy disk 81 inserted into the floppy disk drive 82 and transferred to the main memory 25. The applications programs may also be read from another portable recording medium or carriable recording medium, such as a magnetic optical disc, and transferred to the main memory 25.

In case that the applications programs are stored in a program supply server 9000 shown in FIG. 2, the user gains an access to the program supply server 9000 via a communication line 93 with the modem 92. The applications programs are then transmitted from the program supply server 9000 and transferred to the main memory 25. Available examples of the communication line 93 include wired lines, such as telephone lines and network lines, as well as wireless lines using communications satellites.

3-2) Operation of Data-Update Monitor Server of Second Embodiment

The following briefly describes the operation of the data-update monitor server of the second embodiment.

The user instructs the client 2000 for a user registration in the data-update monitor server 1000. The instruction is transmitted to the data-update monitor server 1000 via the provider server 6000 and the Internet 3000 and input into the registration management unit 1200 via the communication unit 1300 in the data-update monitor server 1000. The registration management unit 1200 implements the user registration in response to the instruction given by the user.

The user then instructs the client 2000 to register an URL representing the address at which the data to be monitored are stored (hereinafter referred to as monitor URL) in the data-update monitor server 1000. The registration management unit 1200 registers the monitor URL in response to the instruction given by the user. The registered information is written into the storage unit 1400.

After the registration of the monitor URL, the communication unit 1500 accesses the Web server defined by the monitor URL through the Internet 3000. For example, when the data 4100 are to be monitored, the communication unit 1500 accesses the Web server 4000 according to the monitor URL. The monitor unit 1100 checks whether or not the data 4100 stored in the Web server 4000 have been updated, and stores the result of the update check in the storage unit 1400. The monitor unit 1100 periodically carries out the update check for all the registered monitor URLS.

When the user wants to know an update of data, the user asks the data-update monitor server 1000 via the client 2000 whether or not the data have been updated. The registration management unit 1200 reads the result of the update check with respect to the data stored in the monitor URL registered by the user, from the storage unit 1400 and transmits the result to the client 2000 to inform the user of the result. The registration management unit 1200 has been informed of the date and time of latest access, on which the client 2000 accessed the monitored Web server and obtained data from the Web server, and transmits the latest result of the update check after the date and time of latest access to the client 2000.

When the user confirms an update of the data based on the result of the update check, the user connects the client 2000 to the Internet 3000 via the provider server 6000 and accesses the Web server, which stores the updated data, through the Internet 3000 according to the requirements. The client 2000 then obtains desired data from the Web server.

In this manner, the user accesses the data-update monitor server 1000 to be informed of whether or not the data have been updated. This structure saves the labor for manually checking the presence of updated data and shortens the required communication time, thereby enabling an efficient monitor of the desired data.

The registration management unit 1200 can transfer the result of the update check with respect to the specified data to the user by an e-mail at any time other than the time when the user accesses the data-update monitor server 1000. The data-update monitor server 1000 itself may access the client 2000 via a public communication line to transfer the result of the update check.

The monitor unit 1100 periodically checks the update of data and stores the latest result of the update check in the storage unit 1400. In response to an inquiry from the user, the monitor unit 1100 can immediately transfer the result of the update check to the user without accessing the Web server being monitored.

Although only one client is shown in the block diagram of FIG. 40, a number of clients exist in the actual state. Namely a number of users utilize the same data-update monitor server 1000. It is accordingly well expected that a plurality of users desire to monitor data stored in the same particular Web server. In this case, the monitor unit 1100 can check the update of data for the plurality of users only by one access to the particular Web server. This significantly improves the efficiency of monitoring.

On an access to the Web server, the monitor unit 1100 may obtain the data itself being monitored and store the data into the storage unit 1400. In this structure, the registration management unit 1200 may transmit the data to the client 2000 in response to a requirement of data transmission from the user via the client 2000. This structure enables the user to readily obtain the data stored in the Web server via the data-update monitor server 1000.

When obtaining the data itself being monitored from the Web server, the monitor unit 1100 may classify and sort out the received data by the dates or by the keywords as shown in FIG. 39 and store the classified data into the storage unit 1400. In this structure, the registration management unit 1200 may create an index page including links to the respective dates or keywords and transmit both the classified data and the index page to the client 2000 in response to a requirement of data transmission from the user via the client 2000. In accordance with another preferable application, the registration management unit 1200 may transmit only the index page first, and, when the user checks the index page and requires transmission of data, transmit the required data extracted from the classified data In accordance with another possible application, the registration management unit 1200 may edit the data in a desired format and transmit the data in the format required by the user. The operation of editing the data in a desired format, for example, enables the linked data to be expanded to character information and image information for a flat display. In accordance with a concrete procedure, for example, the registration management unit 1200 receives latest pieces of news from the Web servers managed by various newspapers and edits the news according to a specific date or specific field to create an electronic newspaper. The user is accordingly not required to surf the respective Web servers, but can read desired information in a readable format only by accessing the data-update monitor server 1000. Providing a variety of conditions for retrieving data and a variety of display formats further enhances the convenience to a number of users.

As mentioned above, the data-update monitor server 1000 may transmit the data to the client 2000 by an e-mail. The e-mail having a smaller amount of transferred data is especially effective when the line capacity is restricted, for example, in portable computers wirelessly connected to the network. It is also preferable to provide a specific edit form, which omits image data and reduces the amount of transmitted data, for the portable computers. In accordance with another possible application, the data-update monitor server 1000 accesses the client 2000 to activate a printer connected with the client 2000 and print out the data. The data-update monitor server 1000 may directly telephone the user through a public communication line to send data by facsimile.

In accordance with one preferable application, while the storage unit 1400 stores the data obtained from the Web server, in response to the confirmation of an update of the desired data, the monitor unit 1100 obtains updated data from the Web server and replaces the old data stored in the storage unit 1400 by the updated data. This structure enables transmission of the latest data to the user in response to a user's requirement.

In accordance with another preferable application, while the storage unit 1400 stores the data obtained from the Web server, in response to the confirmation of an update of the desired data, the monitor unit 1100 obtains updated data from the Web server, compares the updated data with the old data stored in the storage unit 1400, detects updated points among the data, and stores the result of detection in the storage unit 1400. In case that the user inquires the updated points, the registration management unit 1200 may read the result of detection from the storage unit 1400 and inform the client 2000 of the result.

In this embodiment, there are two available methods by the difference in the form of data management as discussed below.

(1) In case that the monitor URL for each user is managed by the data-update monitor server 1000

In this case, the monitor URL for each user is managed not by each client 2000 but by the data-update monitor server 1000. While the client 2000 is not required to store the monitor URL specified by the user, the data-update monitor server 1000 is required to store the monitor URL. Although this structure increases the amount of data stored in the data-update monitor server 1000, the user can be informed of an update of the desired data by an e-mail.

(2) In case that the monitor URL for each user is managed by each client 2000

In this case, the data-update monitor server 1000 only manages the user and the monitor URL but does not carry out one-to-one mapping of the monitor URLs onto the users. Each user accordingly stores the monitor URL in a local database (local DB) in the client 2000. The user should inform the monitor URL stored in the local DB to the data-update monitor server 1000 before inquiring an update of the desired data of the data-update monitor server 1000. The data stored in the client 2000 may also be used as the management data required when the client 2000 obtains data from the Web server. This structure reduces both the amount of data stored in the client 2000 and the amount of management data stored in the data-update monitor server 1000.

The following describes the outlines of management data and transactions between the data-update monitor server 1000 and the client 2000 in the respective cases.

FIGS. 41(*a*) through 41(*c*) show the outlines of management data in case that the monitor URL for each user is managed by the data-update monitor server 1000 (in the case (1)).

Referring to FIG. 41, the data-update monitor server 1000 has two user management tables A, B and monitor URL data. An user ID and a password are stored in the user management table A as shown in FIG. 41(*a*). An user ID, a monitor URL of the user, attributes, and the date and time of latest access when the client accessed the Web server being monitored are stored in the user management table B as shown in FIG. 42(*b*). The attributes represent attributive information that determines whether only the data stored in the monitor URL are to be monitored or data linked with the data in the monitor URL are also to be monitored.

The monitor URL data includes an URL in which the data to be monitored are stored, the date and time of latest check when the data-update monitor server 1000 checked an update of the data last time, a status representing the current state (for example, the data has been changed, the data has been deleted, or during a retry after an error), the number of errors, and the date and time of latest update of the data being monitored. The number of errors represents the number of unsuccessful accesses for monitoring. When the data-update monitor server 1000 tries an access at predetermined time intervals and fails the access a preset or greater number of times, it determines that the target URL has already been deleted.

The monitor URL data exists for each registered monitor URL.

FIGS. 42(*a*) through 42(*c*) show the outlines of transactions between the data-update monitor server 1000 and the client 2000 in case that the monitor URL for each user is managed by the data-update monitor server 1000 (in the case (1)). FIGS. 42(*a*), 42(*b*) , and 42(*c*) respectively denote a transaction at the time of registration of the user, a transaction at the time of registration of the monitor URL, and a transaction at the time of inquiry of an update of the data. The time goes from the top to the bottom in each drawing.

Referring to FIG. 42(*a*), at the time of registration of the user, the client 2000 sends the name of the user and a registration password or a serial number, and the data-update monitor server 1000 identifies the registration password or the serial number and issues an user ID and a password. The registration password and the serial number are used when the services are restricted to specified users. They are not required when the services are open to the public.

Referring to FIG. 42(*b*), at the time of registration of the monitor URL, the client 2000 sends the name of the user, the password, and the monitor URL, and the data-update monitor server 1000 carries out a registration and returns a status to the client 2000.

Referring to FIG. 42(*c*), at the time of inquiry of an update of the data, the client 2000 sends the user ID and the password and asks whether or not the data has been updated. The data-update monitor server 1000 obtains the registered monitor URL and the date and time of latest access according to the user ID, determines whether or not the data stored in the monitor URL has been updated after the date and time of latest access based on the pre-stored result of survey, and sends the result of the update check as a list of update URLs to the client 2000. The client 2000 stores the list of update URLs.

The client 2000 then accesses the Web server to obtain the updated data from the Web server, and transmits the monitor URL of the obtained data (that is, information on the monitor URL from which the client 2000 obtained data) and the date and time when the client 2000 obtained the data as well as the user ID and the password to the data-update monitor server 1000. The data-update monitor server 1000 updates the user data based on the transmitted information.

FIGS. 43(*a*), 43(*b*) and 44 show the outlines of management data in case that the monitor URL for each user is managed by each client 2000 (in the case (2)). FIGS. 43(*a*) and 43(*b*) show management data managed by the data-update monitor server 1000. FIG. 44 show management data managed by the client 2000.

Referring to FIG. 43, the data-update monitor server 1000 has a user management table and monitor URL data. Like in the user management table A shown in FIG. 41(*a*), an user ID and a password are stored in the user management table as shown in FIG. 43(*a*). Like in the monitor URL data shown in FIG. 41(*c*), an URL, the date and time of latest check, a status, and the number of errors, and the date and time of latest update are included in the monitor URL data as shown in FIG. 43(*b*).

The client 2000 has monitor URL data as shown in FIG. 44. The monitor URL data managed by the client 2000 has essentially a similar structure to that of the monitor URL data managed by the data-update monitor server 1000, except that the former does not have the number of errors representing the number of unsuccessful accesses in the course of the monitor check but includes the date and time of latest access when the client 2000 accessed the Web server last time. The monitor URL data can be utilized in common at the time of inquiry of an update of the data and at the time of obtaining data from the Web server.

FIGS. 45(*a*) and 45(*b*) show the outlines of transactions between the data-update monitor server 1000 and the client 2000 in case that the monitor URL for each user is managed by each client 2000 (in the case (2)). FIGS. 45(*a*) and 45(*b*) respectively denote a transaction at the time of registration of the monitor URL and a transaction at the time of inquiry of an update of the data. The time goes from the top to the bottom in each drawing. The transaction at the time of registration of the user is identical with that of FIG. 42(*a*) and is thus omitted from the illustration.

Referring to FIG. 45(*a*), at the time of registration of the monitor URL, the client 2000 sends the name of the user, the password, and the monitor URL, and the data-update monitor server 1000 carries out a registration and returns a status to the client 2000. The client 2000 also stores the registration in the local DB.

Referring to FIG. 45(*b*), at the time of inquiry of an update of the data, the client 2000 sends the user ID, the password, a list of monitor URLs, and a list of the date and time of latest access and asks whether or not the data has been updated. This is because the data-update monitor server 1000 does not manage the monitor URL for each user or the date and time of latest access. The data-update monitor server 1000 determines whether or not the data stored in the monitor URL has been updated after the date and time of latest access based on the pre-stored result of survey, and sends the result of the update check as a list of update URLs to the client 2000. The client 2000 strictly stores the list of update URLs in the local DB. The client 2000 then access the Web server to obtain updated data from the Web server.

As discussed above, in the structure of the second embodiment, the data-update monitor server 1000 runs on the Internet 3000. The user can thus be informed of whether or not the data have been updated only by accessing the data-update monitor server 1000 via the client 2000. This realizes an efficient monitor of the desired data.

The data-update monitor server that can monitor an update of data stored in a particular Web server will be described later in detail as another embodiment.

The above embodiment refers to the Internet communication. The principle of the embodiment is, however, not restricted to the Internet communication but is also applicable to other services on the network, such as WAN (wide area network) and LAN (local area network).

4) Another Embodiment of Communications Terminal that can monitor an update of data FIG. 46 is a block diagram illustrating structure of a communications terminal 700 as a third embodiment according to the present invention. FIG. 47 is a block diagram illustrating structure of an agent execution unit 702 shown in FIG. 46. The communications terminal 700 of this embodiment is suitable for the Web on the Internet communication and can monitor an update of data stored in a particular Web server on the Internet.

4-1) Structure of Communications Terminal of Third Embodiment

Referring to FIG. 46, the communications terminal 700 includes an agent execution unit 702, a data management unit 704, a new incoming information database 706, a reference data storage unit 708, an agent management unit 710, a user I/F unit 712, a monitor 713, a schedule management unit 714, a keyboard 715, a network access unit 716, a mouse 717, and a server access unit 718. The communications terminal 700 is connected to the Internet via a provider server 750. A plurality of Web servers including a Web server 900 are connected to the Internet. A data-update monitor server 800 is also connected to the Internet via a Web server 850.

The communications terminal 700 of this embodiment is constructed as the computer shown in FIG. 2, and the respective blocks in the communications terminal 700 shown in FIG. 46 include portions realized by the hardware and those realized by the software.

The software has been stored in the form of applications programs in the hard disk 84 shown in FIG. 2. When the user gives an instruction of activation, the operating system is activated to read required applications programs from the hard disk 84 to the main memory 25. This realizes the communications terminal 700 shown in FIG. 46, wherein the hardware and the software are integrated with each other.

In case that the applications programs are recorded in a CD-ROM 85 shown in FIG. 2, the applications programs are read from the CD-ROM 85 inserted into the CD-ROM drive 83 and transferred to the main memory 25. In case that the applications programs are recorded in a floppy disk 81 shown in FIG. 2, the applications programs are read from the floppy disk 81 inserted into the floppy disk drive 82 and transferred to the main memory 25. The applications programs may also be read from another portable recording medium or carriable recording medium, such as a magnetic optical disc, and transferred to the main memory 25.

In case that the applications programs are stored in a program supply server 9000 shown in FIG. 2, the user gains an access to the program supply server 9000 via a communication line 93 with the modem 92. The applications programs are then transmitted from the program supply server 9000 and transferred to the main memory 25. Available examples of the communication line 93 include wired lines, such as telephone lines and network lines, as well as wireless lines using communications satellites.

In the communications terminal 700, the agent execution unit 702 carries out a predetermined agent among a plurality of agents previously registered. The agent represents a type of man-machine interface and includes a status recognition, evaluation according to a certain measure of value, and execution added to an object. The data management unit 704 writes and reads data into and from the new incoming information database 706 and the reference data storage unit 708. The new incoming information database 706 stores new incoming information data (discussed later) as well as agent data, URL data and so on. The reference data storage unit 708 stores reference data discussed later. The agent management unit 710 registers each agent, changes the contents of the agent data, and reads the agent data via the data management unit 704. The user I/F unit 712 receives an instruction given by the user via the keyboard 715 or the mouser 717 and displays new incoming information (discussed later) on the screen of the monitor 713. The schedule management unit 714 manages the time, for example, when a data-update monitor operation (discussed later) is carried out periodically. The network access unit 716 accesses a Web server on the Internet. The server access unit 718 accesses the data-update monitor server 800 via the network access unit 716 while the data-update monitor server 800 carries out the data-update monitor operation as discussed later.

Referring to FIG. 47, the agent execution unit 702 includes an agent execution and management element 720, a Web server access element 722, an update detection element 724, a difference analyzer engine 726, an HTML analyzer engine 728, and a clipping engine 730.

The agent execution and management element 720 controls executions of the other elements included in the agent execution unit 702. The agent execution and management element 720 includes a writing element 720a and a reading element 720b. The Web server access element 722 accesses a Web server and obtains body data (discussed later) from the Web server. The Web server access element 722 includes a link destination body data-obtaining element 722a. The update detection element 724 checks whether or not update-monitor target data (discussed later) have been updated. The difference analyzer engine 726 compares the update-monitor target data with the reference data to obtain difference data. The HTML analyzer engine 728 analyzes the difference data and extracts title information and link information discussed later. The clipping engine 730 carries out a clipping operation discussed later.

4-2) New Incoming Information

Among a variety of information supplied by the Web servers on the Internet (that is, information accessible by the communications terminal), there is particular information which the user is specifically interested in. The user naturally desires to monitor update of such data periodically, in order to be well informed of addition and change of the contents as soon as possible. A typical example of the particular information, which the user is interested in, is new incoming information supplied by manufactures, for example, 'What's new'.

The following describes such new incoming information and the characteristics of the data. Each piece of new incoming information generally includes title information representing the title of the new incoming information and body information representing details of the new incoming information. Each piece of title information and the corresponding body information are linked with each other by link information. Plural pieces of title information are generally itemized in an index page. Each piece of body information is generally written in one page, although plural pieces of body information may be written in one page according to the requirements. The index page, on which plural pieces of title information are written, is stored as index page data consisting of HTML data in the Web server. Each page including each piece of body information is also stored as body data consisting of HTML data in the Web server.

FIG. 48 shows an index page, on which plural pieces of title information are written, as an example. The image shown in FIG. 48 represents index page data (HTML data) displayed on the screen by the function of the browser in a general communications terminal. In the example of FIG. 48, plural pieces of title information are written with the dates of their registration in the index page.

FIG. 49 shows the contents of HTML data (index page data) representing the index page shown in FIG. 48. In the index page data shown in FIG. 49, each piece of title data representing title information includes link information representing the address (that is, URL) of the body data linked with the title information. For example, the underlined title data in FIG. 49 includes the link information "HREF=".../ainews/news/dxplorer.htm"" representing the address of the body data corresponding to the title information "Release 'DiskXplorer for Windows'". This shows that the body data are stored as HTML data having the file name "dxplorer.htm" in the Web server.

When the user clicks the underlined title information "Release 'DiskXplorer for Windows'" with the mouse on the screen shown in FIG. 48 in the general communications terminal, the body data are obtained from the specific address in the Web server expressed by the link information, and the body information is displayed on the screen based on the body data.

FIG. 50 shows a page, on which body information linked with the title information "Release 'DiskXplorer for Windows'" shown in FIG. 48 is written. The image shown in FIG. 50 represents body data (HTML data) displayed on the screen by the function of the browser.

FIG. 51 shows the relationship between index page data and plural pieces of body data stored in a Web server. Among the variety of data stored in the Web server, index page data WNP includes plural pieces of title data αa, βb, . .. as shown in FIG. 51. Each piece of title data includes title information and link information; for example, the title data αa includes title information α and link information a. Each piece of title information is accordingly linked with body data specified by the corresponding link information; for example, the title information α is linked with body data A specified by the corresponding link information a.

4-3) Outline of Operations of Communications Terminal of Third Embodiment

The following describes typical operations of the communications terminal of the third embodiment. It is assumed that the user desires to monitor update of new incoming information shown in FIG. 48 and that the index page data WNP and the body data A, B, . . . shown in FIG. 51 are stored in the Web server 900 shown in FIG. 46.

4-3-1) In case that new incoming information is obtained for the first time

The communications terminal 700 carries out the following operation, in order to obtain the new incoming information supplied by the Web server 900 for the first time. The user gives the URL of the index page data WNP that is a target of update monitoring (update-monitor target data) to the communications terminal 700. Hereinafter the URL of the update-monitor target data may be referred to as the target URL. The communications terminal 700 accesses the Web server 900 based on the target URL and requires the Web server 900 to transmit the index page data WNP stored therein.

The communications terminal 700 receives the index page data WNP from the Web server 900, checks the date of publication when the title information included in each piece of title data in the index page data WNP was open in the Web server 900, and selects only the new title information after a particular date specified by the user. In case that each piece of title data includes the date of registration of the title information as shown in FIG. 49, the date of publication of the title information is determined by referring to the date of registration. In case that the title data does not include such information representing the date, the communications terminal 700 reads the body data linked with the title information based on the link information included in the piece of title data and determines the date of publication of the title information by referring to the date of update of the body data (or the date of creation of the body data).

The communications terminal 700 obtains the title information after the desired date, the link information corresponding to the respective pieces of title information, and the body data based on the respective pieces of link information, carries out a clipping operation (discussed later), and stores these data as new incoming information data with respect to the target URL into the new incoming information database 706 shown in FIG. 46. In the example of FIG. 51, it is assumed that the title information α through δ were open after the desired date and that all the title information after s were open before the desired date, among the plural pieces of title information included in the index page data WNP. In this case, the title information α through δ, the corresponding link information a through d, and the body data A through D linked with the title information α through δ are stored as new incoming information data with respect to the target URL in the new incoming information database 706, whereas all the residual information is destroyed.

FIG. 52 shows new incoming information data stored in the new incoming information database 706 shown in FIG. 46 as an example. The target new incoming information data WN includes plural sets of title information, link information, and body data that are arranged sequentially as shown in FIG. 52. Numbers are allocated to the respective sets of information as information IDs. The number 1 is allocated to the set of information having the oldest date of publication. The drawing of FIG. 52 conceptually shows the new incoming information data and is different from the actual data structure.

The communications terminal 700 stores the new incoming information data WN into the new incoming information database 706, while storing the index page data WNP shown in FIG. 51 as the reference data into the reference data storage unit 708.

4-3-2) In case that new incoming information is obtained for the second or subsequent time The communications terminal 700 carries out the following operation, in order to obtain the new incoming information supplied by the Web server 900 for the second or subsequent time. The communications terminal 700 accesses the Web server 900 based on the target URL, checks whether or not the index page data WNP stored therein have been updated, and receives the index page data WNP from the Web server 900 if updated.

The communications terminal 700 then compares the input index page data WNP with the reference data stored in the reference data storage unit 708 (that is, the index page data WNP obtained in the previous access) and specifies a portion of the input data that does not coincide with the reference data as difference data.

FIG. 53 shows the relationship between updated index page data and body data stored in the Web server. In case that a new piece of title data ωz was added after the time of the previous input of new incoming information and the index page data WNP has been updated as shown in FIG. 53, the communications terminal 700 compares the updated index page data WNP with the index page data WNP of FIG. 51 (that is, the reference data) stored in the reference data storage unit 708, and specifies a non-coincident portion, that is, the newly added title data ωz, as the difference data.

The communications terminal 700 subsequently analyzes the title data ωz specified as the difference data to receive the title information ω, the corresponding link information z, and the body data Z based on the link information z shown in FIG. 53, carries out a clipping operation (discussed later), and stores these information into the new incoming information database 706 shown in FIG. 46.

FIG. 54 shows updated new incoming information data stored in the new incoming information database 706 shown in FIG. 46 as an example. Referring to FIG. 54, a set of information including the title information ω, the link information z, and the body data Z is newly added to the new incoming information data WN with respect to the target URL stored in the new incoming information database 706. A new number 5 is allocated to the new set of information as the information ID. The drawing of FIG. 54 conceptually shows the new incoming information data and is different from the actual data structure.

The communications terminal 700 stores the clipped information into the new incoming information database 706, while storing the index page data WNP shown in FIG. 53 as the next reference data into the reference data storage unit 708.

As discussed above, the communications terminal 700 of the embodiment monitors update of new incoming information supplied by a Web server, specifies difference data, and obtains the updated new incoming information in case that the data have been updated.

4-4) Agent Data

In the communications terminal 700 of this embodiment, an agent is registered for each target URL. The agent execution unit 702 shown in FIG. 46 primarily carries out the agent for each target URL, thereby monitoring update of data stored in each target URL. Each piece of agent data representing the setting information of each agent has the contents shown in FIG. 55 and is stored in the new incoming information database 706. The agent management unit 710 registers each agent and changes the setting information via the data management unit 704.

FIG. 55 shows the contents of agent data used in the third embodiment. In the table of FIG. 55, the first column denotes the attributes of the database, the second column the names, and the third column the meanings. In the first column, I represents creation of an index and P represent a primary key.

The following describes the contents of the respective items.

The agent ID is a number unequivocally determined for each agent.

The invalid flag shows whether or not the data-update monitor operation is to be carried out.

The name of the agent shows the name given to the agent.

The CS type shows whether the data-update monitor operation was carried out by the communications terminal 700 itself functioning as a local (client) or by the data-update monitor server 800 (described later).

The type of monitor shows whether the data-update monitor operation obtains new incoming information or only carries out the update check.

The check frequency ID represents the frequency of execution of the data-update monitor operation. For example, 0: every hour (once an hour), 1: every day (once a day), 2: every week (once a week), and 3: every month (once a month).

The frequency of the check (day, week, month) represents the information on the day of the week and the date.

The frequency of the check (for display) expresses the frequency of the check as a series of characters for the display of a property.

The date and time of latest check represents the date and time when the agent was carried out last time.

The final status represents the status when the agent was carried out last time. When an error or a time-out error occurs in the course of the update check, for example, error information is written as the final status.

The URL-ID represents an ID allocated to the target URL.

The series of URL characters implies a series of characters (http://.....) representing the target URL.

4-5) URL Data

Information related to the target URL is also stored as URL data in the new incoming information database 706. Each piece of URL data has the contents shown in FIG. 56. In this embodiment, the target URLs are one-to-one mapped onto the agents, so that the URL data are also one-to-one mapped onto the agents.

FIG. 56 shows the contents of URL data used in the third embodiment. The respective columns in FIG. 56 are identical with those in FIG. 55.

The following describes the contents of the respective items. The items identical with those described in FIG. 55 have the same contents and are thus not specifically described here.

The date and time of latest update represents the date and time when the update-monitor target data were updated last time. It may not correspond to the date and time when the communications terminal 700 actually obtained the target data, but represents the date and time of update obtained with the HTTP protocol from the Web server. In case that the Web server does not supply the date and time of update of the target data, it corresponds to the date and time when the communications terminal 700 actually obtained the update-monitor target data.

The latest information ID represents an ID allocated to the up-to-date information received by the communications terminal 700. This is used when the data-update monitor server 800 carries out the data-update monitor operation as discussed later.

The name of the user and the password are used for accessing the Web server. Some Web servers require the name of the user and the password for the input of the update-monitor target data.

The path name of the contents represents a path name to the reference data stored in the reference data storage unit 708. The reference data are stored in a specific directory, and the path name consists of a path from a basic directory to the specific directory and the file name of the reference data.

The analysis information is used to analyze the update-monitor target data and obtain each piece of title data from the target data.

4-6) New Incoming Information Table

The new incoming information data shown in FIGS. 52 and 54 are stored in a new incoming information table having the contents shown in FIG. 57 in the new incoming information database 706.

FIG. 57 shows the contents of a new incoming information table used in the third embodiment. The respective columns in FIG. 57 are identical with those in FIG. 55.

The following describes the contents of the respective items

The latest information ID represents a unique ID allocated to the up-to-date information (each set of title information and body information).

The date and time of input represents the date and time obtained the new incoming information.

The agent ID represents an ID allocated to the agent that carries out the operation for obtaining the new incoming information.

The name of the agent represents the name of the agent that carries out the operation for obtaining the new incoming information. Although the name of the agent can be obtained from the agent ID, a series of characters representing the name of the agent are stored for high-speed processing.

The series of URL characters implies a series of characters (http://.....) representing the target URL. Although the series of URL characters can be obtained from the URL ID, they are stored for high-speed processing.

The URL title represents <TITLE> of a page stored in the target URL (for example, an index page).

The folder ID represents an ID allocated to the specific folder in which new incoming information is classified.

The name of the folder represents the name of the specific folder. Although the name of the folder can be obtained from the folder ID, a series of characters representing the name of the folder are stored for high-speed processing.

The title represents a title given to each piece of new incoming information. The input title information is stored here.

The link destination URL represents an URL linked with the title of the piece of new incoming information. The link information input with the title information is stored here. When no link information exists, NULL is stored.

The read flag shows whether or not the user has read the contents of each piece of new incoming information; 0: read and 1: unread. The read flag is set to 1 when the new incoming information is obtained, and reset to 0 when the user reads the contents.

The CS type shows whether the new incoming information was obtained by the communications terminal 700 itself functioning as a local (client) or by the data-update monitor server 800.

The information ID represents an ID sequentially allocated to each piece of new incoming information in the new incoming information data for each target URL. For example, the information IDs are numbers allocated to the respective pieces of new incoming information (the respective sets of title information and body information) in the new incoming information data regarding a certain target URL, as shown in FIGS. 52 and 54. The number 1 is allocated to the set of information having the oldest date of publication. The information ID is used when the data-update monitor server 800 carries out the data-update monitor operation discussed later.

The contents of information represents the contents of each piece of new incoming information. The input body data (HTML data) are stored here. No body data may be obtained according to the type of the new incoming information. In such a case, the series of URL characters (that is, the link information) for the body data are stored here.

Other than the agent data, the URL data, and the new incoming information table, a folder table is also stored in the new incoming information database 706. The name and ID of the folder used for the subsequent clipping operation and a retrieving condition (clipping condition) including keywords set for each folder are stored in the folder table. A folder for clipping operation is generally specified for each agent.

4-7) Details of Operations of Communications Terminal of Third Embodiment

The following describes the detailed operations of the communications terminal 700 of this embodiment. FIG. 58 is a flowchart showing a typical processing routine executed by the communications terminal 700 shown in FIG. 46. When the program enters the routine of FIG. 58, the agent management unit 710 selects one piece of agent data to be processed (target agent data) among the agent data stored in the new incoming information database 706 via the data management unit 704 at step S220, and transfers the target agent data to the agent execution unit 702. The agent execution and management element 720 in the agent execution unit 702 extracts information on the frequency of the check from the input agent data, sees whether it is time to carry out the data-update monitor operation based on the information, and determines whether or not the data-update monitor operation is to be carried out at step S222. In case that the data-update monitor operation is not required, the program proceeds to step S234. In case that the data-update monitor operation is required, on the contrary, the program proceeds to step S224.

At step S224, the agent execution and management element 720 extracts information on the CS type from the input agent data, and determines, based on the information, whether the data-update monitor operation is carried out by the communications terminal 700 itself working as a local (that is, a client) or by the data-update monitor server 800. When the data-update monitor server 800 is selected, the program proceeds to step S232 to carry out a data-update monitor server-counter process described later. When the communications terminal 700 is selected, on the other hand, the program proceeds to step S226.

At step S226, the agent execution and management element 720 extracts information on the monitor type from the input agent data, and determines, based on the information, whether the data-update monitor operation should obtain new incoming information or carry out only the update check. When the processing of only the update check is selected, the program proceeds to step S230, at which the update detection element 724 in the agent execution unit 702 carries out an operation for update check discussed later. When the processing of obtaining new incoming information is selected, the program proceeds to step S228, at which the respective elements in the agent execution unit 702 carry out an operation for obtaining new incoming information discussed later.

The agent management unit 710 then determines whether or not any other pieces of agent data to be processed (target agent data) still exist in the new incoming information database 706 at step S234. When no target agent data exists, the program exits from this routine. When any target agent data remains, on the other hand, the program returns to step S220 and repeats the above processing.

4-7-1) Operation for Obtaining New Incoming Information

FIG. 59 is a flowchart showing details of the operation for obtaining new incoming information carried out at step S228 in the flowchart of FIG. 58. When the program enters the routine of FIG. 59, the agent execution and management element 720 in the agent execution unit 702 first reads URL data regarding a target URL corresponding to the agent in execution out of the URL data stored in the new incoming information database 706 via the data management unit 704. The agent execution and management element 720 then extracts information on the time and date of latest update of the update-monitor target data and information on the path name to the reference data from the read-out URL data, accesses the reference data storage unit 708 based on the information of the path name, and reads the reference data from the reference data storage unit 708 at step S240.

In case that no reference data is stored in the reference data storage unit 708, the program proceeds to step S262. A typical example of such a case, in which no reference data exists in the reference data storage unit 708, denotes the case in which new incoming information is obtained for the first time.

The network access unit 716 accesses a Web server based on the target URL, and the update detection element 724 in the agent execution unit 702 checks whether or not the update-monitor target data in the Web server have been updated via the network access unit 716 at step S244. In accordance with a concrete procedure, the update detection element 724 utilizes the date and time of latest update as an IF-Modified-Since header and issues a GET method to the Web server. In case that the update-monitor target data have been updated, the network access unit 716 automatically receives the updated update-monitor target data from the Web server at step S246. In case that the update-monitor target data have not been updated, on the contrary, the program does not obtain any update-monitor target data and exits from the routine of FIG. 59.

The header may not include information on the date and time of latest update. In such a case, the agent execution unit 702 obtains the update-monitor target data from the Web server and compares the contents of the obtained update-monitor target data with the contents of the reference data. When any change is found in the contents, it is assumed that the data have been updated. In this state, the date and time when the comparison was carried out is regarded as the date and time of latest update.

The agent execution and management element 720 extracts analysis information from the URL data regarding the target URL at step S248, and transmits the analysis information to the HTML analyzer engine 728.

The difference analyzer engine 726 compares the update-monitor target data (HTML data) transmitted from the Web server with the reference data (HTML data) regarding the target URL and read from the reference data storage unit 708, and specifies a portion of the update-monitor target data that does not coincide with the reference data as difference data at step S250. The difference data accordingly corresponds to an updated portion of the data.

By way of example, in response to a command for difference analysis, the difference analyzer engine 726 deletes IMG tags, which represent links to image data, from both the HTML data in order to eliminate image data segments, determines a difference between the HTML data, and outputs the contents of the difference.

The command for difference analysis is defined in advance for each target URL and stored in the new incoming information database 706. No such commands may, however, be pre-defined for some target URLs. In this case, a command generally applicable to all the HTML data is used to obtain difference data.

The HTML analyzer engine 728 analyzes the difference data based on the analysis information, and extracts title information and link information (URL of the link destination) of the new incoming information from the difference data at step S252. Some target URLs may not have any analysis information. In such a case, information generally applicable to all the HTML data is used for analysis.

The link destination body data-obtaining element 722*a* in the Web server access element 722 accesses the Web server based on the extracted link information via the network access unit 716, and obtains body data (HTML data) of the new incoming information from the URL of the link destination at step S254. In case that plural pieces of body data are included in the HTML data stored in the URL of the link destination, only the required piece of body data is extracted and obtained based on the analysis information.

When the link destination is not in the Web server in which the update-monitor target data are stored, but in another specific Web server, it is required to access the specific Web server in order to obtain body data from the link destination. In this case, the link destination body data-obtaining element 722*a* may not obtain body data from the link destination.

The clipping engine 730 carries out a clipping operation for every folder specified for the agent in execution at step S256. In accordance with a concrete procedure, the clipping engine 730 takes a retrieving condition (clipping condition), which has been set in advance for each specified folder, out of the folder table in the new incoming information database 706 via the data management unit 704, and determines whether or not each piece of new incoming information (that is, each set of title information and body information) satisfies the retrieving condition. By way of example, when the retrieving condition set for a particular folder is 'the Internet and Intranet', the clipping engine 730 determines whether or not the title information or the body information (body data) of each piece of new incoming information includes both the keywords 'the Internet' and 'Intranet'.

In case that there is any piece of new incoming information that satisfies the retrieving condition, the writing element 720*a* of the agent execution and management element 720 stores the satisfying piece of new incoming information as new incoming information data into the new incoming information table in the new incoming information database 706 via the data management unit 704 at step S258. Here it is naturally expected that all the pieces of new incoming information that satisfy the retrieving condition belong to the folder corresponding to the retrieving condition. The writing element 720*a* accordingly adds the name of the corresponding folder as additional information to the new incoming information as shown in FIG. 57.

The clipping operation may include a thesaurus retrieval that searches for synonyms of the keywords as well as the keyword retrieval.

The writing element 720*a* of the agent execution and management element 720 deletes the old reference data regarding the target URL from the reference data storage unit 708 and stores the update-monitor target data obtained at step S246 as new reference data into the reference data storage unit 708 via the data management unit 704 at step S260. After conclusion of this processing, the program exits from the routine of FIG. 59.

As discussed above, in case that the update-monitor target data have been updated, the structure of the embodiment specifies difference data representing an updated portion and obtains body data linked with the difference data.

In this embodiment, only text data are obtained as the new incoming information and stored in the new incoming information database 706. The principle of the present invention is, however, not restricted to the structure of the embodiment. Image data, sound data, scripts, and programs may also be obtained as new incoming information.

In this embodiment, link data (body data) are obtained based on the link information included in the difference data. In case that the obtained link data further includes link information, an additional piece of link data linked by the link information may be obtained together. In case that links exist on a plurality of levels, all the pieces of link data down to a preset level may be obtained together.

In this embodiment, the target URL is one-to-one mapped onto the agent. The principle of the present invention is, however, not restricted to this structure. One target URL may be mapped onto a plurality of agents or a plurality of target URLs may be mapped onto one agent.

Although the communications terminal 700 functioning as a client is connected to the Internet via the provider server 750 in this embodiment, the communications terminal 700 may be connected to the Internet not via any provider server but directly.

Referring back to the flowchart of FIG. 59, when no reference data regarding the target URL corresponding to the agent in execution exists in the reference data storage unit 708 at step S240, the program proceeds to step S262, at which the Web server access element 722 accesses the Web server based on the target URL via the network access unit 716 and obtains update-monitor target data.

The agent execution and management unit 720 then reads URL data regarding the target URL from the new incoming information database 706 via the data management unit 704, extracts analysis information from the URL data at step S264, and transmits the analysis information to the HTML analyzer engine 728.

The HTML analyzer engine 728 analyzes the obtained update-monitor target data based on the analysis information and extracts title information and link information of the new incoming information from the update-monitor target data at step S266. The link destination body data-obtaining element 722a in the Web server access element 722 accesses the Web server based on the extracted link information via the network access unit 716, and obtains body data of the new incoming information from the URL of the link destination at step S268. As discussed previously, the link destination body data-obtaining element 722a obtains only the pieces of new incoming information on or after the date of publication specified by the user.

The program then proceeds to step S256 and carries out the clipping operation and the subsequent processes discussed above.

4-7-2) Display of New Incoming Information

On conclusion of the series of processes shown in the flowcharts of FIGS. 58 and 59, the latest new incoming information is stored as new incoming information data regarding each target URL in the new incoming information database 706. When the user I/F unit 712 receives an instruction from the user through the operation of the keyboard 715 and the mouse 717 to display new incoming information regarding a particular target URL, the reading element 720b of the agent execution and management element 720 reads new incoming information data regarding the particular target URL from the new incoming information database 706 via the data management unit 704, and requires the user I/F unit 712 to display the desired new incoming information on the screen of the monitor 713. In accordance with one preferable application, the reading element 720b reads plural pieces of title information from the new incoming information database 706 while sorting out these title information, and displays only the read-out pieces of title information as a title information tree on the screen of the monitor 713. The user clicks the mouse 717 to select a desired piece of title information among the plural pieces of title information displayed on the monitor 713. The reading element 729b then reads body data corresponding to the selected piece of title information from the new incoming information database 706 based on the link information attached to the selected piece of title information, and displays the body information corresponding to the body data on the screen of the monitor 713.

FIG. 60 shows new incoming information displayed on the screen of the monitor 713 as an example. In the left-side portion on the screen, plural pieces of title information are sorted out by the categories and displayed as a title information tree by the reading element 720b. In the right-side portion on the screen, the body information corresponding to the title information "Release 'DiskXplorer for Windows'" selected by the user is displayed. Available categories for sorting out title information include 'date', 'URL', 'URL title', and 'folder' as discussed in the new incoming information table of FIG. 57.

FIG. 61 shows a title information tree as an example. In the example of FIG. 61, the first level of the tree is classification by the 'date' (for example, 1996/11/14, 1996/11/15), the second level of the tree by the 'folder' (for example, the Internet, the multimedia), and the third level by the 'URL title' (for example, the home page of X, the home page of Y). For example, title information A and B shown in FIG. 61 are sorted out and displayed on the screen of the monitor 713 by a reduction retrieval. In accordance with a concrete procedure, the reading element 720b carries out retrieval to extract pieces of title information having the 'date' of "1996/11/15" among all the pieces of title information stored in the new incoming information table in the new incoming information database 706, then to extract pieces of title information having the 'folder' of "the Internet" among the extracted pieces of title information on the first level, and further to extract pieces of title information having the 'URL title' of the "home page of X" among the extracted pieces of title information on the second level. The user can freely set the categories for classification on each level of the tree.

4-7-3) Operation for Update Check

FIG. 62 is a flowchart showing details of the operation for update check carried out at step S230 in the flowchart of FIG. 58. When the program enters the routine of FIG. 62, the agent execution and management element 720 reads URL data regarding a target URL corresponding to the agent in execution out of the URL data stored in the new incoming information database 706 via the data management unit 704, and extracts information on the date and time of latest update of the update-monitor target data from the read-out URL data. The network access unit 716 accesses a Web server based on the target URL, and the update detection element 724 checks whether or not the update-monitor target data in the Web server have been updated, based on the information on the date and time of latest update at step S270.

In case that the update-monitor target data have been updated, the update detection element 724 receives the date and time of update from the Web server, and changes the date and time of latest update in the URL data regarding the target URL in the new incoming information database 706 via the data management unit 704 at step S272. The update detection element 724 then creates specific information showing that the update-monitor target data have been updated at step S274, and stores the specific information as a new piece of title information into the new incoming information table in the new incoming information database 706 at step S276. In case that the update-monitor target data have not been updated, on the other hand, the program exits from the routine of FIG. 62.

In case that the data-update monitor operation does not obtain new incoming information but carries out only the update check, the time and date of latest update of the update-monitor target data is changed in the new incoming information database 706 while the new piece of title information showing that the update-monitor target data have been updated is added to the new incoming information data. In the process of displaying the new incoming information based on the new incoming information data, this new piece of title information showing that the update-monitor target data have been updated is displayed together with other pieces of title information on the screen of the monitor 713.

In case that the update-monitor target data have been updated, the updated update-monitor target data as well as the new piece of title information showing that the update-monitor target data have been updated may be stored in the new incoming information table in the new incoming information database 706. In this case, the network access unit 716 obtains the updated update-monitor target data from the Web server while the update detection element 724 receives the date and time of update of the update-monitor target data from the Web server. The specific title information showing that the update-monitor target data have been updated and the updated update-monitor target data are stored respectively as the new piece of title information and body data in the new incoming information table in the new incoming information database 706. At this moment, link information that links the body data with the title information is also stored in the new incoming information table. When the user selects the specific title information showing that the update-monitor target data have been updated among the new incoming information displayed on the screen of the monitor 713, the contents of the updated update-monitor target data (index page) are displayed as body information related to the selected title information.

5) Another Embodiment of Data-Update Monitor Server

FIG. 63 is a block diagram illustrating structure of a data-update monitor server 800 as a fourth embodiment according to the present invention. FIG. 64 is a block diagram illustrating structure of the agent execution unit 802 shown in FIG. 63. The data-update monitor server 800 of this embodiment can monitor an update of data stored in a particular Web server on the Internet. In the fourth embodiment, the data-update monitor server 800 carries out a data-update monitor operation, instead of the communications terminal functioning as a client.

5-1) Structure of Data-Update Monitor Server of Fourth Embodiment

Referring to FIG. 63, the data-update monitor server 800 includes an agent execution unit 802, a data management unit 804, a new incoming information database 806, a reference data storage unit 808, an agent management unit 810, a user I/F unit 812, a monitor 813, a schedule management unit 814, a keyboard 815, a network access unit 816, a mouse 817, a request processing unit 818, a clipping engine 830, and a data processing engine 840. The request processing unit 818 is connected to the Internet via a Web server 850, whereas the network access unit 816 is directly connected to the Internet. The constituents in FIG. 64 which are identical with the constituents in FIG. 46 are expressed as the like numerals. The client 700 shown in FIG. 63 corresponds to the communications terminal 700 shown in FIG. 46.

Referring to FIG. 64, the agent execution unit 802 includes an agent execution and management element 820, a Web server access element 822, an update detection element 824, a difference analyzer engine 826, and an HTML analyzer engine 828. The agent execution and management element 820 has a writing element 820a and a reading element 820b. The Web server access element 822 includes a link destination body data-obtaining element 822a.

The data-update monitor server 800 of this embodiment is constructed as the computer shown in FIG. 2, and the respective blocks in the data-update monitor server 800 shown in FIG. 63 include portions realized by the hardware and those realized by the software.

The software has been stored in the form of applications programs in the hard disk 84 shown in FIG. 2. When the user gives an instruction of activation, the operating system is activated to read required applications programs from the hard disk 84 to the main memory 25. This realizes the data-update monitor server 800 shown in FIG. 63, wherein the hardware and the software are integrated with each other.

In case that the applications programs are recorded in a CD-ROM 85 shown in FIG. 2, the applications programs are read from the CD-ROM 85 inserted into the CD-ROM drive 83 and transferred to the main memory 25. In case that the applications programs are recorded in a floppy disk 81 shown in FIG. 2, the applications programs are read from the floppy disk 81 inserted into the floppy disk drive 82 and transferred to the main memory 25. The applications programs may also be read from another portable recording medium or carriable recording medium, such as a magnetic optical disc, and transferred to the main memory 25.

In case that the applications programs are stored in a program supply server 9000 shown in FIG. 2, the user gains an access to the program supply server 9000 via a communication line 93 with the modem 92. The applications programs are then transmitted from the program supply server 9000 and transferred to the main memory 25. Available examples of the communication line 93 include wired lines, such as telephone lines and network lines, as well as wireless lines using communications satellites.

The data-update monitor server 800 of the fourth embodiment shown in FIGS. 63 and 64 has a similar structure to that of the communications terminal 700 of the third embodiment shown in FIGS. 46 and 47. The only difference is that the server access unit 718 is replaced by the request processing unit 818, that the clipping engine 830 is not included in the agent execution unit 802 but is arranged between the agent execution unit 802 and the request processing unit 818, and that the data processing engine 840 is newly added and arranged between the agent execution unit 802 and the request processing unit 818.

The following describes typical processes when the data-update monitor operation is executed by the data-update monitor server 800 shown in FIG. 63 instead of by the communications terminal or client 700 shown in FIG. 46.

5-2) Operation of Communications Terminal as Client

FIG. 65 is a flowchart showing a processing routine of data-update monitor server-counter process carried out at step S232 in the flowchart of FIG. 58. As discussed previously, in the communications terminal 700 shown in FIG. 46, when the information on the CS type extracted from the agent data represents execution of the data-update monitor operation by the data-update monitor server 800 (at step S224 in the flowchart of FIG. 58), the processing routine of FIG. 65 starts as the data-update monitor server-counter process (at step S232).

The agent execution and management element 720 creates request data and sends the request data to the server access unit 718. The server access unit 718 then transmits the request data as an HTTP (hypertext transfer protocol) request to the data-update monitor server 800 via the network access unit 716 at step S280.

FIG. 66 shows the contents of request data transmitted from the communications terminal or client to the data-update monitor server. In the table of FIG. 66, the first column denotes the names in HTTP, the second column the names, and the third column the meanings.

The following describes the contents of the respective items.

The user ID and the password represent an user ID and a password allocated to each user for accessing the data-update monitor server 800. These are registered in advance in the data-update monitor server 800.

The URL to be checked is a series of characters representing a target URL, for which the user requests the data-update monitor operation.

The type of processing represents a type of the processing executed by the data-update monitor server 800 (operation for obtaining new incoming information or operation for only update check)

The latest information ID represents an ID allocated to the latest piece of new incoming information among the new incoming information in the new incoming information data obtained for the target URL.

The date and time of latest input represents the date and time when the new incoming information for the target URL was obtained last time.

The date and time of latest check represents the date and time when the target URL was checked last time.

The number of folders represents the number of folders specified for the agent in execution.

The folder information includes an ID and a keyword (that is, a retrieving condition) of each folder.

When the communications terminal 700 functioning as a client is not a personal computer but a personal digital assistant (PDA) or a printer, either of them having communication function, as discussed later, the type of client represents information on the model and the version of the PDA or the printer.

When the client is a printer, the processing information 1 represents information of the size, quality, and direction of printing sheets used in the printer.

When the client is a printer, the processing information 2 represents the contents of an instruction for color correction process carried out by the data-update monitor server 800.

When the client is a printer, the processing information 3 represents the contents of an instruction for binary coding process carried out by the data-update monitor server 800.

When the client is a PDA, the positional information represents information on the position at which the PDA exists. More concretely, the positional information shows in what city or town the user is with the PDA.

When the client is a printer or a PDA, information on the resolution of images and the number of colors for display may be included other than the above information.

The request data accordingly has the contents like 'The target URL is AAA. The client has already obtained the new incoming information up to the information ID No. BBB (that is, the latest information ID). The number of folders is CCC. The folder information (that is, the retrieving condition) for the first folder is DDD. The folder information (that is, the retrieving condition) for the second folder is EEE. The type of the client is FFF, and the processing information is GGG . . . '

5-3) Operation of Data-Update Monitor Server

The request data transmitted from the communications terminal 700 functioning as a client are input into the data-update monitor server 800 via the Web server 850 connected to the Internet. The Web server 850 is a general Web server and can receive request data from the client. More concretely, an access to a particular URL in the Web server 850 is regarded as a request to the data-update monitor server 800. In response to the request, the request processing unit 818 in the data-update monitor server 800 is activated.

FIG. 67 is a flowchart showing a primary processing routine executed by the data-update monitor server 800 shown in FIG. 63. When the data-update monitor server 800 receives the request data transmitted from the communications terminal 700, the request processing unit 818 processes the request data and informs the agent execution unit 802 of the contents of the request data. When the program enters the routine of FIG. 67, at step S290, the respective elements in the agent execution unit 802 carry out the operation for obtaining new incoming information, based on the request data, according to a processing routine which is similar to the routine carried out by the communications terminal 700 and shown in the flowchart of FIG. 59. In case of the data-update monitor server 800, no clipping operation is carried out in the process of storing new incoming information into the new incoming information database, but all the obtained pieces of new incoming information are stored into the new incoming information database 806. This is because the retrieving condition for the clipping operation varies with the client (that is, the user). The data-update monitor server 800 accordingly carries out the clipping operation in the process of transmitting new incoming information to each client.

In case that the update-monitor target data regarding the target URL have been updated, the operation for obtaining new incoming information for the target URL enables the updated new incoming information to be stored into the new incoming information database 806. The contents of the new incoming information database 806 accordingly reflect the update of the data.

The agent execution and management element 820 in the agent execution unit 802 extracts the latest information ID from the transmitted request data and reads one piece of new incoming information having an information ID greater than the latest information ID out of the new incoming information data for the target URL stored in the new incoming information database 806 at step S292. The communications terminal or client 700 has already obtained the pieces of new incoming information having the number identical with or smaller than the latest information ID and desires to obtain the other pieces of new incoming information which the client 700 has not yet obtained. The new incoming information is read out in the sequence of the information ID; that is, the piece of information having the smallest number is read out first.

The request processing unit 818 extracts folder information from the transmitted request data and transfers the folder information to the clipping engine 830. The clipping engine 830 carries out a clipping operation for the read-out piece of new incoming information based on the folder information at step S294. In accordance with a concrete procedure, the clipping engine 830 checks whether or not the read-out piece of new incoming information satisfies a retrieving condition (clipping condition) included in the folder information. In case that the new incoming information does not meet the retrieving condition, there is no need of transmitting the piece of new incoming information to the communications terminal 700 and the program proceeds to step S298.

In case that the new incoming information meets the retrieving condition, on the other hand, the request processing unit 818 converts the piece of new incoming information into HTML data and transmits the HTML data to the communications terminal or client 700 via the Web server 850 at step S296.

The agent execution and management element 820 of the agent execution unit 802 determines whether or not any other piece of new incoming information having an information ID greater than the latest information ID still exists in the new incoming information data for the target URL stored in the new incoming information database 806 at step S298. When another piece of new incoming information exists, the program returns to step S290 and repeats the above processes. When no other piece of new incoming information exists, on the other hand, the program exits from the routine of FIG. 67. The information ID allocated to the piece of new incoming information which was read out last is a latest check information ID described below.

FIG. 68 shows the contents of new incoming information transmission data transmitted from the data-update monitor server to the communications terminal or client. In the table of FIG. 68, the first column denotes the names, and the second column the meanings.

The following describes the contents of the respective items.

The status represents the resulting state when the data-update monitor server carried out the data-update monitor operation.

The date and time of latest update represents the date and time when the update-monitor target data regarding the target URL were updated last time.

The latest check information ID represents an information ID allocated to the piece of new incoming information for the target URL read last from the new incoming information database 806.

The input Information ID represents an information ID allocated to an obtained piece of new incoming information.

The type of information shows whether the piece of new incoming information is obtained from the difference data or the page data.

The title represents title information included in the piece of new incoming information. More specifically, the title represents title data (HTML data) including link information as well as title information.

The folder ID represents an ID allocated to the folder matching with the retrieving condition for the piece of new incoming information.

The link destination body information represents body information included in the piece of new incoming information. When no body information is included, link information representing the address of body information is transmitted.

The items after the date and time of latest update are transmitted only when the status represents an update of data. The items after the input information ID are repeated for each obtained piece of new incoming information.

The new incoming information transmission data accordingly has the contents like 'The result of the data-update monitor operation is AAA. The new incoming information up to the information ID No. BBB (that is, the latest check information ID) has been checked this time. There are CCC pieces of new incoming information that satisfy the retrieving conditions of the folders. The first piece of new incoming information is DDD that satisfies the retrieving condition of the folder ID No. EEE. The second piece of new incoming information is FFF that satisfies the retrieving condition of the folder ID No. GGG . . . '

5-4) Operation of Communications Terminal as Client

The new incoming information transmission data transmitted from the data-update monitor server 800 are input into the communications terminal or client 700 via the provider server 750 connected to the Internet.

Referring back to the flowchart of FIG. 65, the communications terminal 700 receives the new incoming information transmission data transmitted from the data-update monitor server 800 at step S282, and the agent execution unit 702 extracts new incoming information from the new incoming information transmission data and stores the extracted new incoming information into the new incoming information database 706 via the data management unit 704 at step S284. The program then exits from the routine of FIG. 65.

As discussed above, in the fourth embodiment, the data-update monitor server carries out the data-update monitor operation, instead of the communications terminal functioning as a client. The client is thus not required to check an update of the update-monitor target data and obtain the new incoming information directly from the Web server. This significantly saves the labor of the user operating the client and also shortens the communication time.

Although both the title information and the corresponding body information are transmitted as new incoming information to the client in this embodiment, only the title information may be transmitted to the client.

In this embodiment, the communications terminal or client 700 transmits the folder information (for example, retrieving condition), which is required for the clipping operation in the data-update monitor server 800, in the form of request data every time to the data-update monitor server 800. In accordance with another possible application, the folder information for each user may be registered in advance in the data-update monitor server 800, and the data-update monitor server 800 reads out the pre-registered folder information according to the requirements.

5-5) Execution Timing of Data-Update Monitor Operation

In this embodiment, the data-update monitor server 800 carries out the data-update monitor operation for the target URL including the operation for obtaining new incoming information, in response to request data transmitted from the client. In accordance with another preferable application, irrespective of transmission of the request data from the client, the batch wise data-update monitor operation may be carried out for all the target URLs on a preset time. For example, the data-update monitor operation can be carried out with a high efficiency at late night, when the network line is not busy. The schedule management unit 814 manages such periodic execution of the data-update monitor operation.

6) Use of Data-Update Monitor Server on Intranet

In the above embodiment, the data-update monitor server 800 is used on the Internet as shown in FIG. 63. The data-update monitor server may also be utilized on the Intranet built in the WAN or LAN as shown in FIG. 69.

FIG. 69 shows an exemplified connection of the data-update monitor server on the Intranet. In the example of FIG. 69, the Intranet is built in a Company LAN. A plurality of in-company clients 1700 and 1710 and an in-company Web server 1900 are connected to the Intranet. The Intranet is further connected to the Internet via a fire wall 2100.

Connection of a data-update monitor server 1800 having the structure shown in FIG. 63 to the Company Intranet gives the following advantages.

Reducing traffics from the Intranet to the outside

In case that the data-update monitor server 1800 is not connected to the Company Intranet, the respective in-company clients 1700 and 1710 should independently access Web servers 2200 and 2210, which store update-monitor target data, on the Internet and check whether or not the update-monitor target data have been updated. This increases the number of accesses from the Intranet to the outside and thereby enhances traffics to the outside. In case that the data-monitor update server 1800 is connected to the Company Intranet, on the other hand, the respective in-company clients 1700 and 1710 are only required to access the data-update monitor server 1800 in the Intranet to check whether or not any new incoming information exists in the update-monitor target data. This effectively reduces the traffics from the Intranet to the outside.

Enabling update monitor for in-company data in in-company Web server

In-company data registered in the in-company Web server 1900 maybe set as the update-monitor target data. This enables new incoming information regarding the in-company data to be supplied to the respective in-company clients.

Utilizing as infrastructure of information distribution

When the network administrator in the Company Intranet directly registers information to be distributed in the company as new incoming information in the data-update monitor server 1800, the registered information is automatically distributed in the company. This constructs an efficient information distribution system. In accordance with a concrete procedure, the writing element 820a of the agent execution and management element 820 writes and registers information, which has been input through operation of the keyboard 815 and the mouse 817 and is to be distributed, into the new incoming information database 806 as new incoming information. The reading element 820b of the agent execution and management element 820 then reads out the information, which has been registered as the new incoming information and is to be distributed. The request processing unit 818 transmits the information to the respective in-company clients 1700 and 1710 via the Company Intranet.

These advantages are not characteristic of the Company Intranet but are common in general Intranet.

7) Data Processing In Data-Update Monitor Server

In the above embodiment shown in FIG. 63, the communications terminal or client 700 is realized by the personal computer. As mentioned previously, however, the PDA or the printer having the function of communication may be used as a client.

FIG. 70 shows an exemplified connection of a PDA and a printer used as clients to the data-update monitor server 800 shown in FIG. 63. In the example of FIG. 70, a printer 1850 and a PDA 1910 are respectively provided with the function of communication for connecting with the Internet. The printer 1850 is directly connected to the Internet, while the PDA 1910 is connected to the Internet via a provider server 1950.

Referring to FIG. 70, when the PDA 1910 or the printer 1850 is used as a client, the request data transmitted from the client to the data-update monitor server 800 includes specific information, such as the 'type of client' and 'processing information', as discussed above with the table of FIG. 66. When the data-update monitor server 800 receives the transmitted request data, the request processing unit 818 extracts the specific information from the request data and transfers the extracted specific information to the data processing engine 840. The data processing engine 840 carries out predetermined processes for the new incoming information transmission data based on the specific information transmitted from the request processing unit 818, prior to transmitting the new incoming information transmission data to the client. The predetermined processes vary with the type of the client.

The request processing unit 818 keeps some information that is not transmitted from the client, among all the required pieces of information for the processes carried out by the data processing engine 840. The request processing unit 818 sends such information to the data processing engine 840 according to the requirements.

FIG. 71 is a block diagram illustrating structure of the data processing engine 840 shown in FIG. 63. Referring to FIG. 71, the data processing engine 840 includes a processing management unit 842, a printer driver unit 844, and a PDA driver unit 846.

The printer drive unit 844 includes a rendering element 844a, a color correction element 844b, a color conversion element 844c, a binary coding element 844d, and a data compression element 844e. The PDA driver unit 846 includes a color subtracting and skipping element 846a, a format transform element 846b, and a data compression element 846c.

Although the data processing engine 840 includes only one printer driver unit 844 and one PDA driver unit 846 in the example of FIG. 71, a plurality of printer driver units and a plurality of PDA driver units may be included to correspond to the respective models of the printers and PDAs that are possible used as clients.

By way of example, it is assumed that the PDA 1910 is a client. The processing management unit 842 of the data processing engine 840 recognizes that the client is a PDA, based on the information on 'type of client' transmitted from the request processing unit 818, and activates the PDA driver unit 846.

The color subtracting and skipping element 846a in the PDA driver unit 846 carries out a color subtracting process and a skipping process of pixel information for the image data among the new incoming information transmission data, in order to reduce the amount of data transmitted to the PDA 1910.

The format transform element 846b then carries out the following format transform process for the new incoming information transmission data. The PDA 1910 is generally provided with a small display screen and has a little storage capacity and a relatively poor processing ability. Data are accordingly shaped to have the number of columns that enables the user to read the data on the screen of the PDA 1910 without a transverse scroll. In order to reduce the amount of data transmitted to the PDA 1910, the data are summarized prior to the transmission.

The data compression element 846c then carries out a data compression process for the new incoming information transmission data, and thereby compresses the data itself (for example, HTML data itself). The processing by the data compression element 846c may be carried out only if necessary.

As another example, it is assumed that the printer 1850 is a client. The processing management unit 842 of the data processing engine 840 recognizes that the client is a printer, based on the information on 'type of client' transmitted from the request processing unit 818, and activates the printer driver unit 844.

The rendering element 844a of the printer driver unit 844 converts the new incoming information transmission data to bit-map image data of R (red), G (green), and B (blue), and carries out a skipping process and an interpolating process of data according to the requirements. The rendering element 844a also transforms the format based on the 'processing information 1' (that is, information on printing sheets, such as the size) transferred from the request processing unit 818.

The color correction element 844b then carries out a color correction process, such as γ correction, for the bit-map image data obtained from the rendering element 844a, based on the 'processing information 2' (that is, the contents of an instruction for color correction process) transferred from the request processing unit 818. The processing by the color correction element 844b may be carried out only if necessary.

The color conversion element 844c subsequently carries out the following color conversion process according to the type of the printer based on the information on 'type of client'. When the printer 1850 is a color printer, the color conversion element 844c converts the color image data of R, G, and B to color image data of C (cyan), M (magenta), Y (yellow), and K (black) or to color image data of C (cyan), M (magenta), and Y (yellow). When the printer 1850 is a monochrome printer, on the other hand, the color conversion element 844c converts the color image data of R, G, and B to monochromatic image data.

The binary coding element 844d then carries out a binary coding process, such as a dither process or an error diffusion process, for the multi-digit image data obtained from the color conversion element 844c, based on the 'processing information 3' (that is, the contents of an instruction for binary coding process) transferred from the request processing unit 818, and thereby creates binary image data.

The data compression element 844e then carries out a data compression process for the binary image data, and thereby compresses the data itself. The processing by the data compression element 844e may be carried out only if necessary.

The printer driver unit 844 may carry out a process for inserting a new page mark according to the requirements, in order to prevent a piece of information is divided into plural pages.

When the printer 1850 is a client, the color conversion process, the binary coding process, and the data compression process discussed above significantly reduce the amount of data transmitted from the data-update monitor server 800 to the printer 1850. The data-update monitor server 800 having the high processing ability performs the complicated processes, such as the color conversion process and the binary coding process. The printer 1850 accordingly requires a CPU having only a relatively poor processing ability. The printer 1850 also requires an image memory of a small capacity, for example, a memory for storing two lines of image data. This simplifies the structure and saves the cost.

The request processing unit 818 of the data-update monitor server 800 transmits the new incoming information transmission data processed in the above manner to the Internet via the Web server 850. The printer 1850 or the PDA 1910 directly receives the transmitted new incoming information transmission data. The printer 1950 transfers the input new incoming information transmission data to a printer engine, in order to print characters and images on a printing sheet. The PDA 1910 displays information on the screen, based on the input new incoming information transmission data.

In the above example, the data-update monitor server 800 directly transmits the processed new incoming information transmission data to the printer 1850 or the PDA 1910 through the Internet. In accordance with another preferable application, the processed new incoming information transmission data may be transmitted from the data-update monitor server 800 to a printer server 1600 or a PDA server 1720 connected to the Internet via a Web server 1650 or 1750 and then from the server 1600 or 1720 to the client, that is, the printer 1850 or the PDA 1910 through the Internet.

As discussed above with the drawing of FIG. 66, when the PDA is a client, the request data transmitted from the client includes 'positional information'. The positional information represents information on the position where the PDA (client) exists. The data-update monitor server 800 may utilize the positional information of the PDA and carry out the following process in the clipping engine 830.

The request processing unit 818 extracts the positional information from the request data transmitted from the client and transfers the positional information to the clipping engine 830. The clipping engine 830 retrieves specific information related to the input positional information among the new incoming information read from the new incoming information database 806, and transfers the specific information to the request processing unit 818. The request processing unit 818 transmits the specific information to the PDA 1910 (client) via the Web server 850.

The specific information related to the positional information is, for example, news obtained from a Web server, such as a newspaper. It is assumed that new incoming information obtained from Web servers of newspapers in the whole state including local newspapers is stored in the new incoming information database 806. When the user of the PDA visits a district and the PDA sends the positional information of the district as request data to the data-update monitor server 800, the data-update monitor server 800 transmits local news obtained from Web servers of local newspapers. This immediately informs the user of the news in the district.

8) Mail Distribution System

FIG. 72 is a block diagram illustrating structure of a mail distribution system utilizing the data-update monitor server as a fifth embodiment according to the present invention. Referring to FIG. 72, the mail distribution system of the fifth embodiment includes a data-update monitor server 800 and a mail distribution server 1500. The data-update monitor server 800 has the structure shown in FIG. 63. The mail distribution server 1500 can send e-mail on the Internet.

The mail distribution server 1500 includes a user management unit 1502, a distribution control unit 1504, a mail distribution unit 1506, a request processing unit 1508, a new incoming information-obtaining unit 1510, a user data storage unit 1512, and a schedule management unit 1514. The request processing unit 1508 is connected to the Internet via a Web server 1550, whereas the mail distribution unit 1506 and the new incoming information-obtaining unit 1510 are directly connected to the Internet.

Information on the respective users who utilize the mail distribution system is stored in the user data storage unit 1512 in the mail distribution server 1500. The information on users includes a user ID, a password, and a mail address of each user, target URLs which each user has specified for the data-update monitor operation, and folder information used for the clipping operation. The user management unit 1502 manages the users, obtains new incoming information, and sends mail based on these pieces of information.

When the user wants to change the pre-registered target URL or folder information, the user activates the communications terminal 700 that is a client connected to the Internet to access the mail distribution server 1500 and transmit a request. When the mail distribution server 1500 receives a request from the client 700, the request processing unit 1508 processes the request and transfers the contents of the request to the user management unit 1502. The user management unit 1502 changes the information on the user stored in the user data storage unit 1512, based on the contents of the request.

In the mail distribution server 1500, under the time management by the schedule management unit 1514, the new incoming information-obtaining unit 1510 periodically accesses the data-update monitor server 800 and obtains new incoming information regarding each target URL registered in the user data storage unit 1512 from the data-update monitor server 800. The data-update monitor server 800 converts the new incoming information from the HTML data to text data and sends the text data to the mail distribution server 1500.

The new incoming information-obtaining unit 1510 transfers the obtained new incoming information to the distribution control unit 1504. The distribution control unit 1504 requires the mail distribution unit 1506 to periodically send the new incoming information to the respective clients including the client 700 by e-mail. The distribution control unit 1504 may carry out a clipping operation corresponding to each user, prior to distribution of new incoming information.

This structure enables the new incoming information of the target URL which the user has specified for monitoring data update to be periodically sent to the user. The user is accordingly not required to access the data-update monitor server 800 and obtain new incoming information. This saves the time and labor of the user.

Although the new incoming information is distributed by e-mail in this embodiment, the distribution may be by telephone, facsimile, wire broadcasting, or satellite broadcasting.

The present invention is not restricted to the above embodiments or applications, but there may be many modifications, changes, and alterations without departing from the scope or spirit of the main characteristics of the present invention.

For example, in the third through the fifth embodiments discussed above, the update-monitor target data are new incoming information like 'What's new'. The principle of the present invention is not restricted to the new incoming information but is applicable to various types of information.

It should be clearly understood that the above embodiments are only illustrative and not restrictive in any sense. The scope and spirit of the present invention are limited only by the terms of the appended claims.

The entire disclosure of Japanese Patent Application No. 8-132822 filed on Apr. 30, 1996 and Japanese Patent Application No. 8-353960 filed on Dec. 17, 1996 including specification, claims, drawings and summary are incorporated herein by reference in its entirety.

What is claimed is:

1. A communications terminal connected to a server, in which specific data are stored, via a network, said communications terminal comprising:

storage means for storing at least part of the specific data as storage data;

access means for accessing said server and receiving at least part of the specific data; and difference data specifying means for specifying a non-coincident portion of the received data, which does not coincide with the storage data stored in said storage means, as difference data.

2. A communications terminal in accordance with claim 1, said communications terminal further comprising:

writing means for writing specific information included in the specified difference data, as well as attributive information related to the specific information, into said storage means.

3. A communications terminal in accordance with claim 2, said communications terminal further comprising:

reading means for sorting out and reading out the specific information written in said storage means, based on the attributive information related to the specific information; and display means for displaying the specific information sorted out and read out by said reading means.

4. A communications terminal in accordance with claim 3, wherein said writing means comprises identification information addition means for adding identification information, which identifies a new piece of information, to the specific information in the process of writing the specific information included in the difference data into said storage means.

5. A communications terminal in accordance with claim 4, said communications terminal further comprising:

identification information retrieving means for retrieving the specific information with the identification information added thereto, among all pieces of information written in said storage means, wherein said display means comprises means for, when the retrieved specific information is included in pieces of information to be displayed, displaying the retrieved specific information to be distinguishable from information without the identification information.

6. A communications terminal in accordance with claim 4, said communications terminal further comprising:

input means for inputting an instruction to display new pieces of information; and identification information retrieving means for retrieving the specific information with the identification information added thereto, among all pieces of information written in said storage means, based on the input instruction, wherein said display means displays the retrieved specific information.

7. A communications terminal in accordance with claim 1, said communications terminal further comprising:

update checking means for carrying out an update check of the specific data when said access means accesses said server, wherein said access means receives at least part of the specific data when said update checking means determines that the specific data have been updated as a result of the update check.

8. A communications terminal in accordance with claim 1, wherein said access means accesses said server, based on information representing an address of the specific data.

9. A communications terminal in accordance with claim 1, wherein said access means comprises link data receiving means for, when link data related to the specified difference data exists, accessing a particular server, in which the link data are stored, via said network and receiving the link data from said particular server, based on information representing an address of the link data and being included in the specified difference data.

10. A communications terminal in accordance with claim 1, wherein said access means comprises link data receiving means for, when link data related to the specified difference data exists, accessing a particular server, in which the link data are stored, via said network and receiving the link data from said particular server, based on information representing an address of the link data and being included in the specified difference data, said communications terminal further comprising:

writing means for writing specific information included in the specified difference data, as well as information expressed by the link data received with respect to the difference data, into said storage means; and display means for displaying the specific information included in the difference data and the information expressed by the link data, which are both written in said storage means.

11. A communications terminal in accordance with claim 1, said communications terminal further comprising:

information retrieving means for retrieving particular information that satisfies a specified condition, among specific information included in the specified difference data; and writing means for writing the retrieved particular information into said storage means.

12. A communications terminal in accordance with claim 1, wherein said difference data specifying means determines coincidence of each portion of the received data with the storage data, based on determination of whether or not attributive information included in the received data coincides with attributive information included in the storage data.

13. A communications terminal in accordance with claim 3, wherein said reading means sorts out and reads out the specific information written in said storage means, according to keywords included in the specific information.

14. A communications terminal in accordance with claim 1, said communications terminal further comprising:

writing means for sorting out specific information included in the specified difference data, according to a specified criterion and writing the sorted-out specific information into said storage means.

15. A communications terminal in accordance with claim 14, wherein said storage means has a directory tree corresponding to a data storage structure in said server, said writing means sorting out the specific information included in the difference data corresponding to the data storage structure in said server, and writing the sorted-out specific information into corresponding directories in said storage means.

16. A communications terminal in accordance with claim 3, wherein said reading means sorts out and reads out the specific information written in said storage means, for every communication service supplied by said server.

17. A communications terminal in accordance with claim 3, wherein said reading means sorts out and reads out the specific information written in said storage means, according to addresses of the specific information in said server.

18. A communications terminal in accordance with claim 3, wherein said reading means sorts out and reads out the specific information written in said storage means, according to at least either one of a date and a time when the specific information is received.

19. A communications terminal connected to a server, which can supply communication services, via a network, said communications terminal comprising:

storage means for storing information;

access means for accessing said server and receiving information transferred from said server;

writing means for writing the received information into said storage means;

input means for inputting an instruction to participate in a particular communication service;

particular communication service start requiring means for requiring said server to start the particular communication service, based on the input instruction;

particular communication service stop requiring means for, when said access means receives title information with respect to the particular communication service transferred from said server and said writing means writes the title information into said storage means, requiring said server to stop the particular communication service;

reading means for reading the title information from said storage means; and display means for displaying the title information read from said storage means.

20. A communications terminal in accordance with claim 19, wherein said particular communication service start requiring means comprises:

means for, when an instruction is given through said input means to transfer text information corresponding to a specific piece of title information, which is selected among the title information displayed on said display means, requiring said server to start the specific communication service again, said writing means comprising:

means for, when said access means receives title information with respect to the particular communication service newly transferred from said server, writing a non-coincident portion of the newly received title information, which does not coincide with the title information stored in said storage means, into said storage means, said communications terminal further comprising:

text information transfer requiring means for, when said the non-coincident portion is written into said storage means, changing attributive information included in the specific piece of title information and requiring said server to transfer text information corresponding to the specific piece of title information based on the changed attributive information.

21. A communications terminal connected to a server, which can supply a plurality of communication services, via a network, said communications terminal comprising:

storage means for storing requirements with respect to the plurality of communication services, which are possibly given to said server;

reading means for reading the requirements from said storage means;

sorting-out means for sorting out the requirements read from said storage means according to the plurality of communication services; and transfer means for transferring the sorted out requirements to said server.

22. A communications terminal in accordance with claim 21, wherein said sorting-out means comprises means for, when identical requirements exist, unifying the identical requirements into one requirement.

23. A communications terminal connected to a server via a network, said communications terminal comprising:

storage means for storing information;

access means for accessing said server and receiving information transferred from said server; and writing means for sorting out the received information according to a specified criterion and writing the sorted-out information into said storage means, in the course of access.

24. A communications terminal connected to a server via a network, said communications terminal comprising:

storage means for storing information;

access means for accessing said server and receiving information transferred from said server;

writing means for writing the received information into said storage means;

reading means for reading the written information from said storage means; and transfer requiring means for, when a certain piece of information which said reading means tries to read out does not exist in said storage means, requiring said server to transfer the certain piece of information.

* * * * *